July 27, 1954

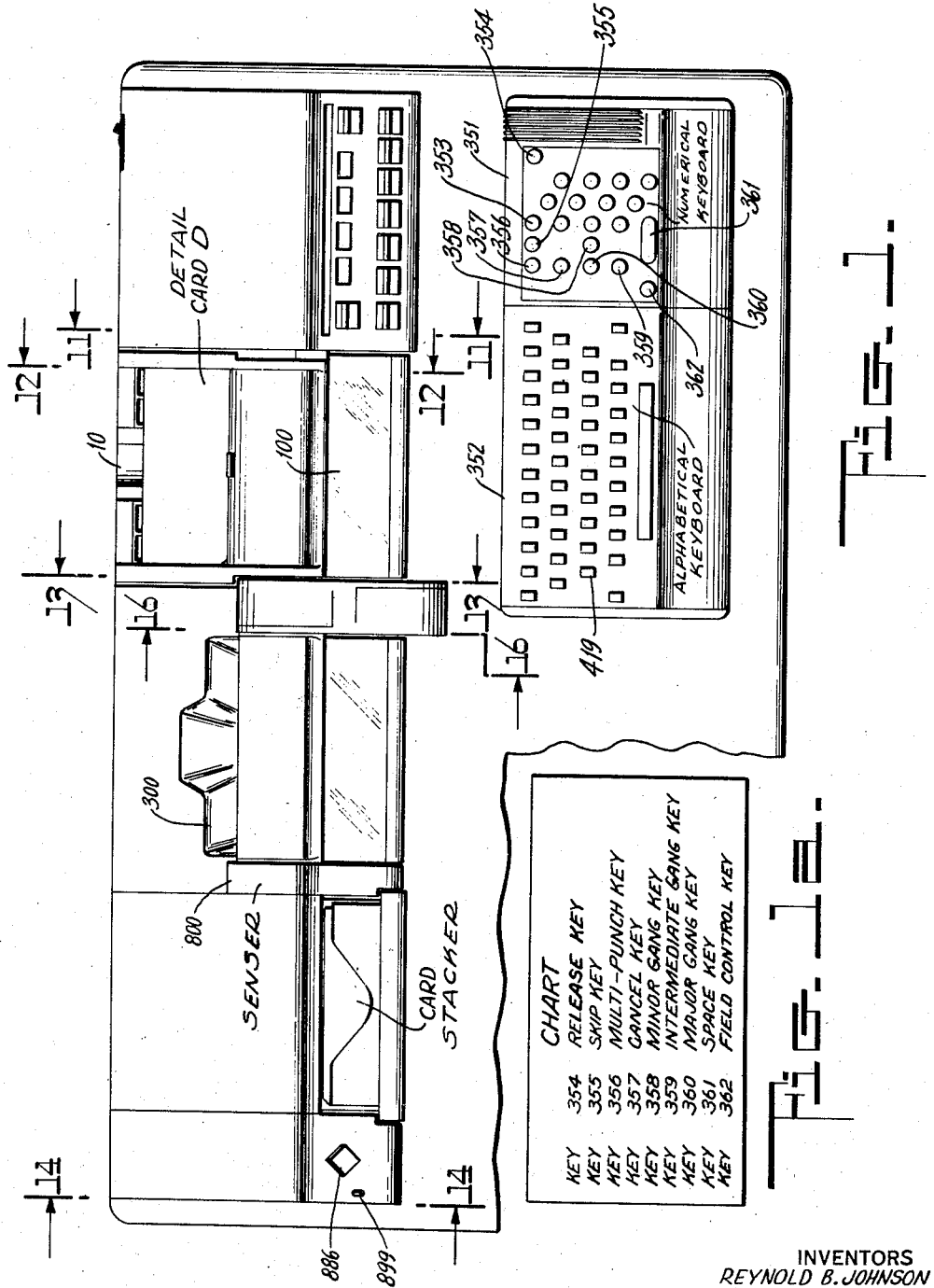

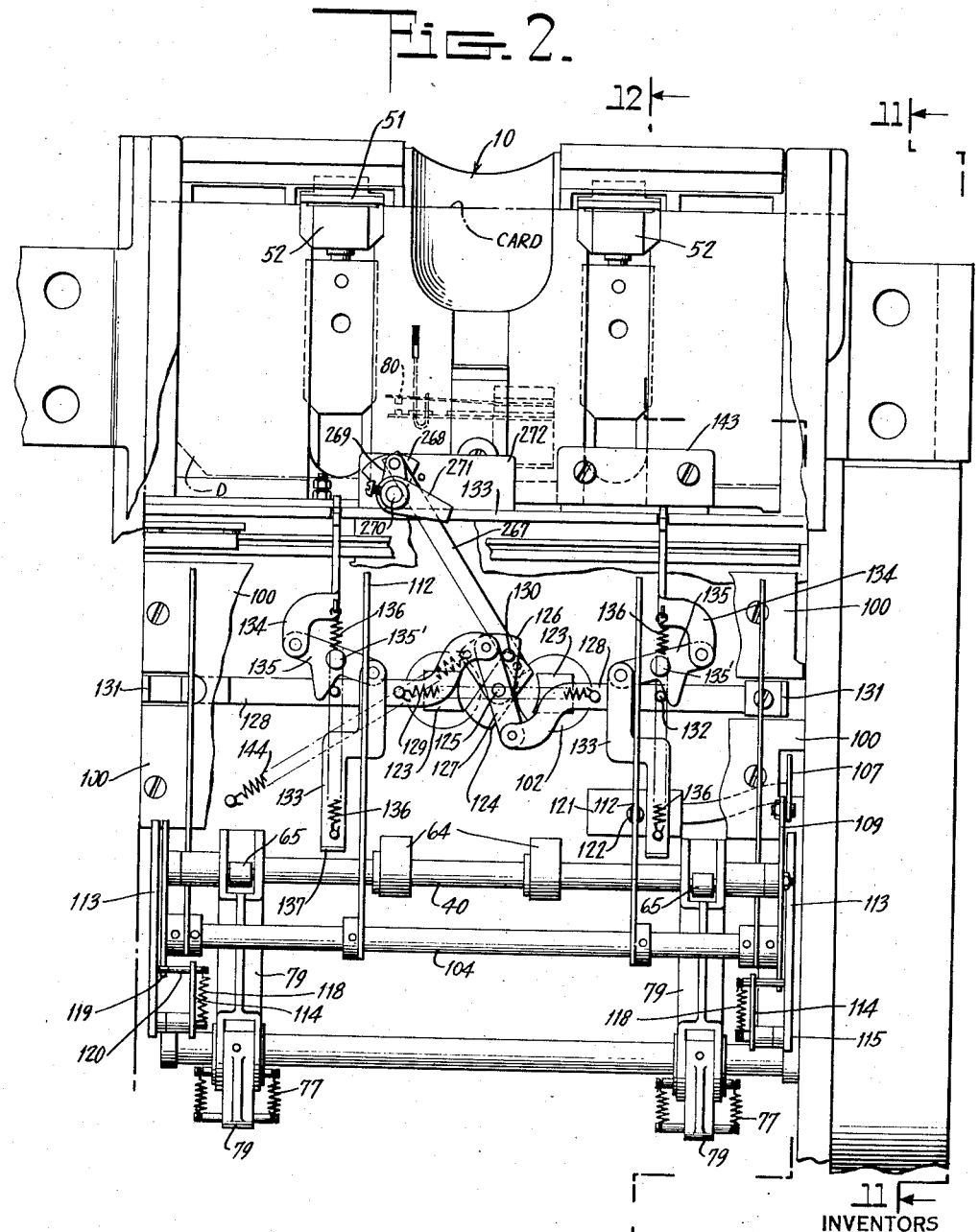

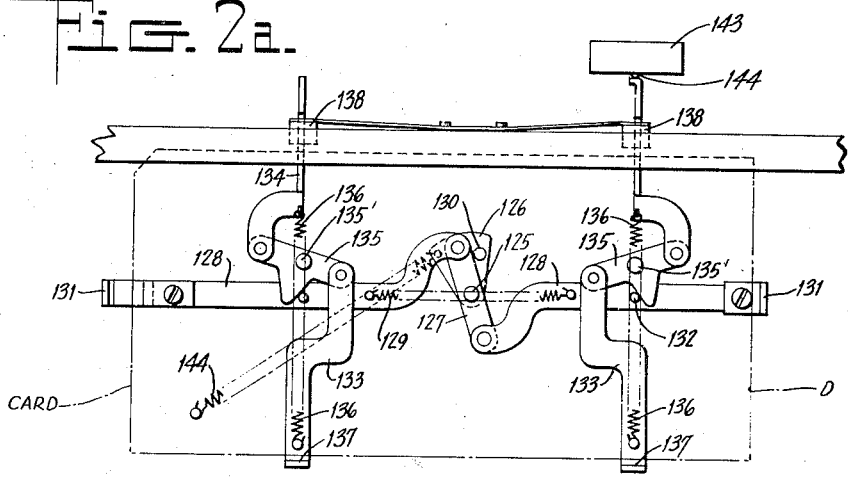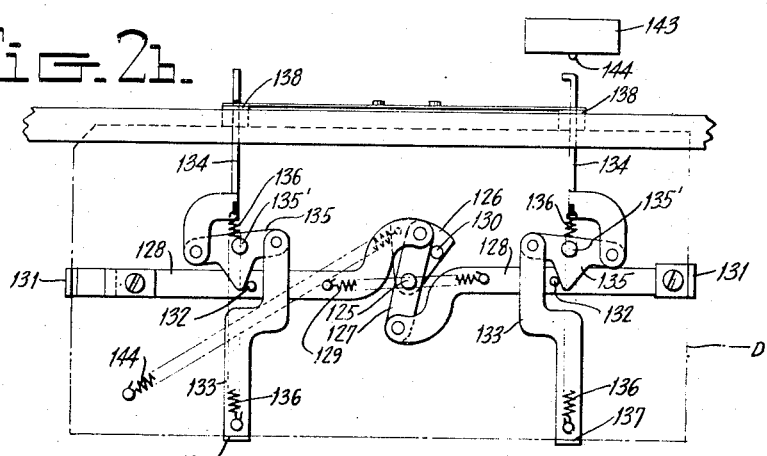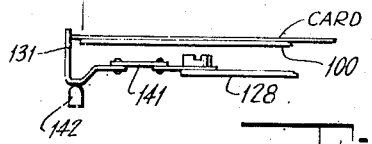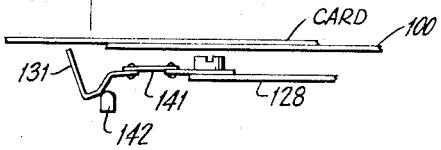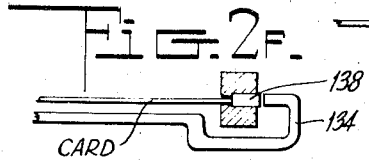

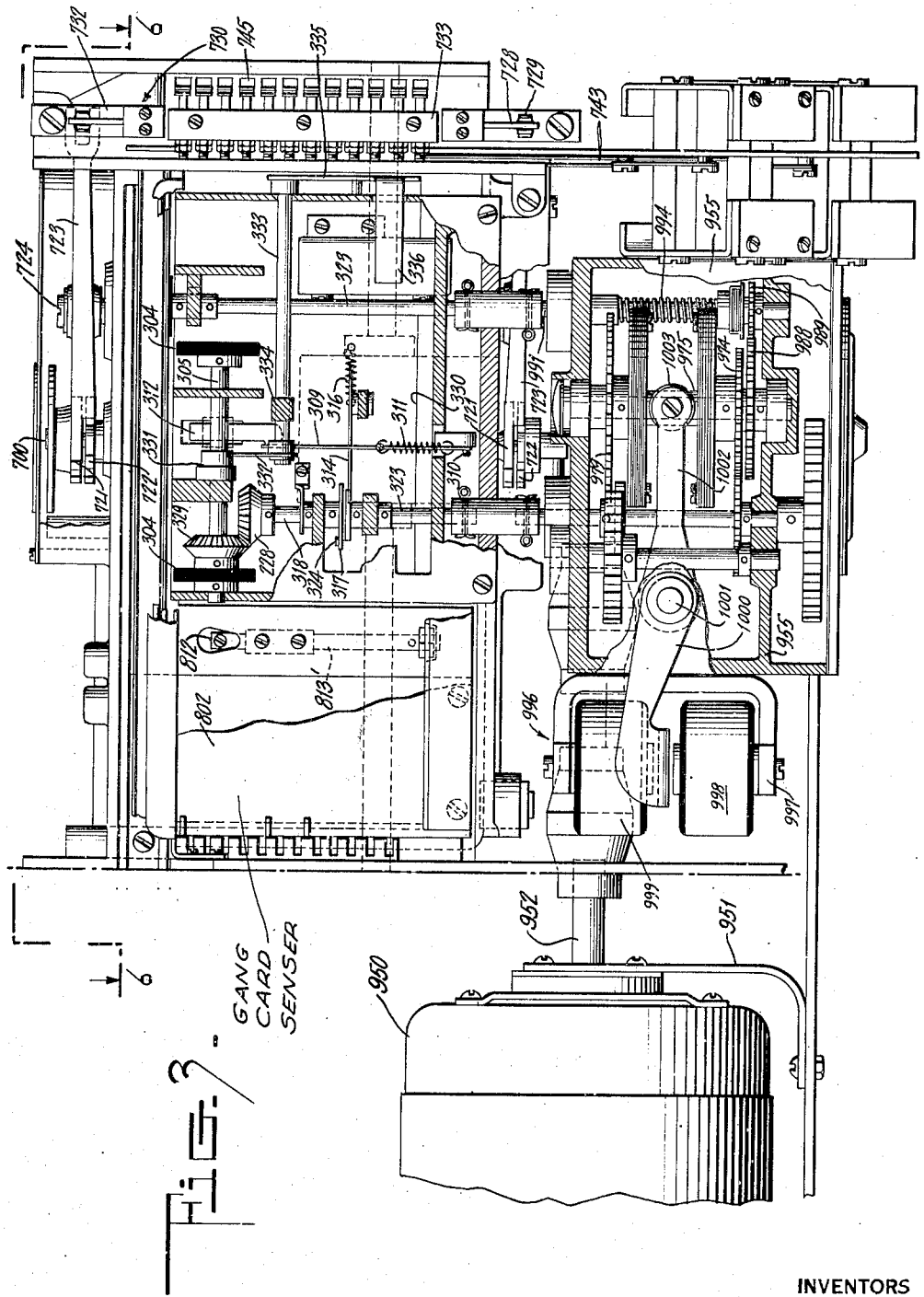

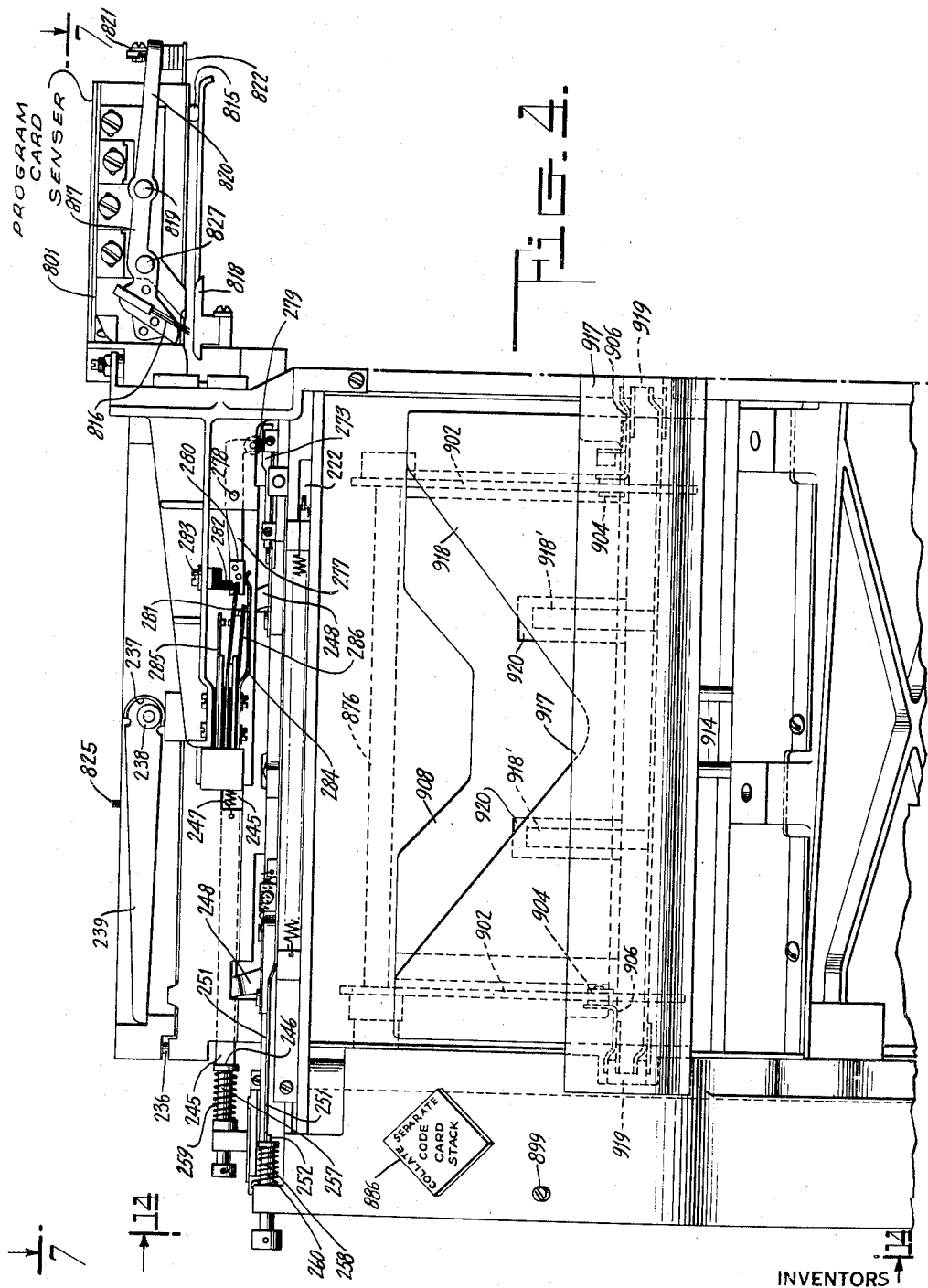

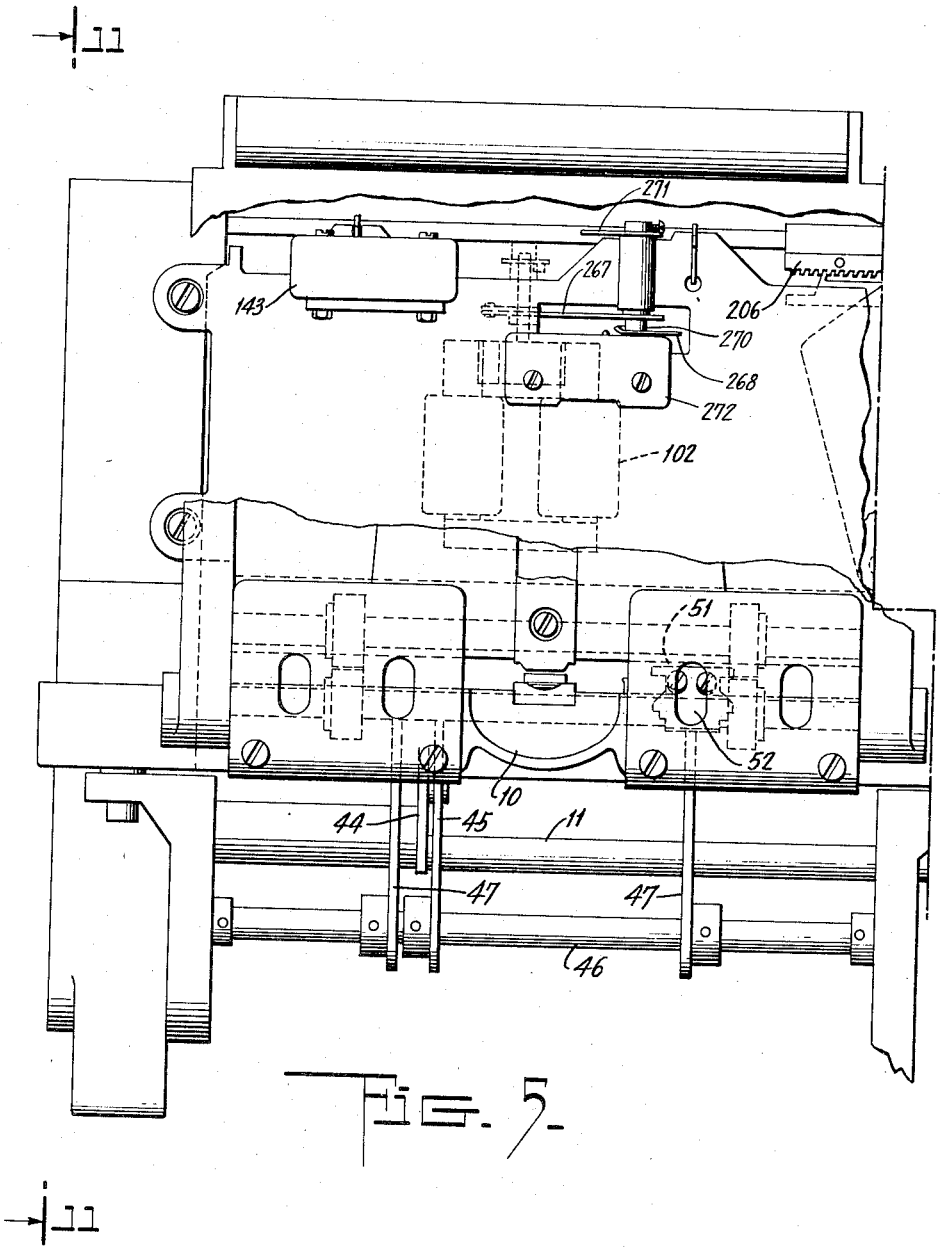

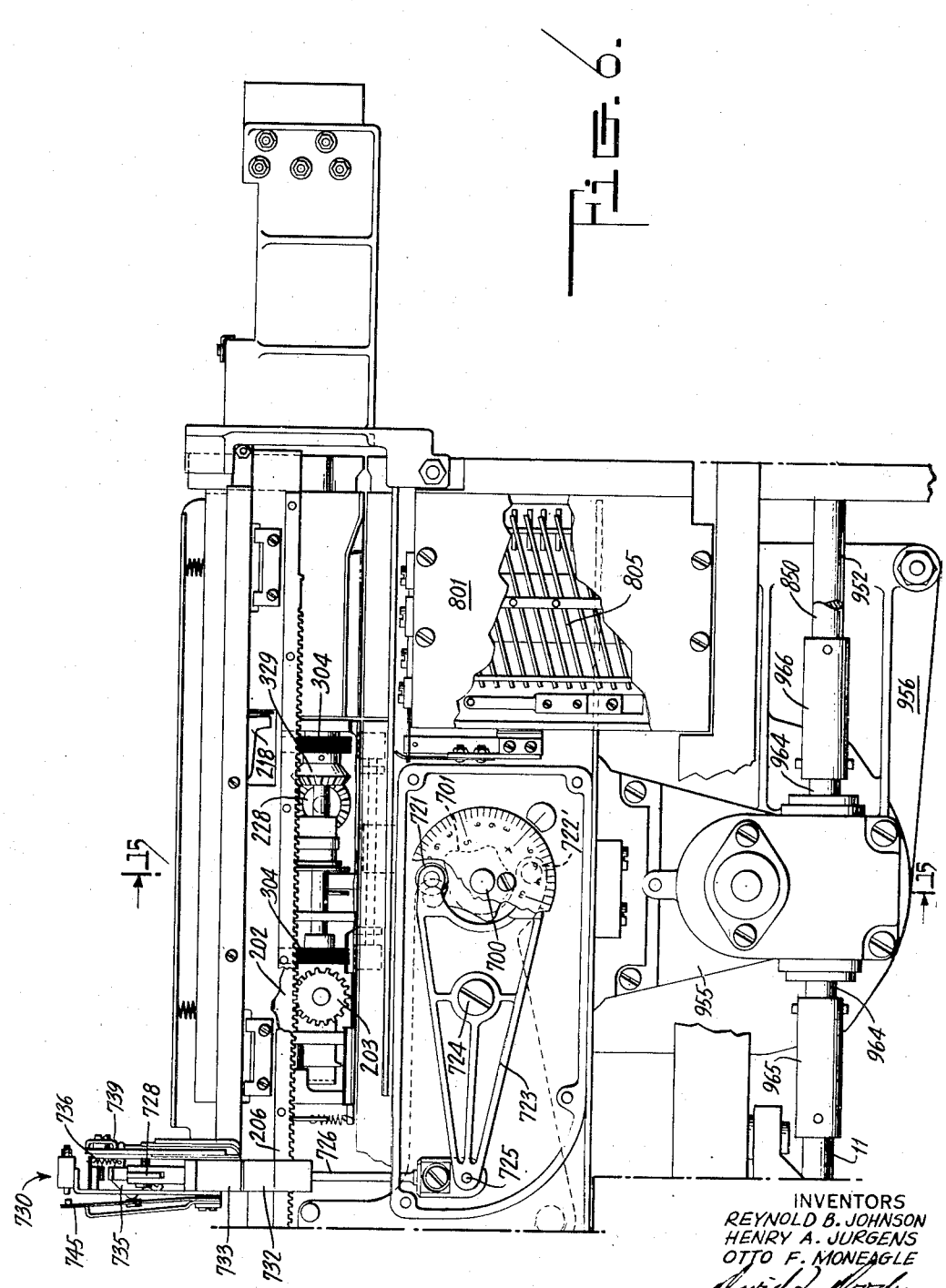

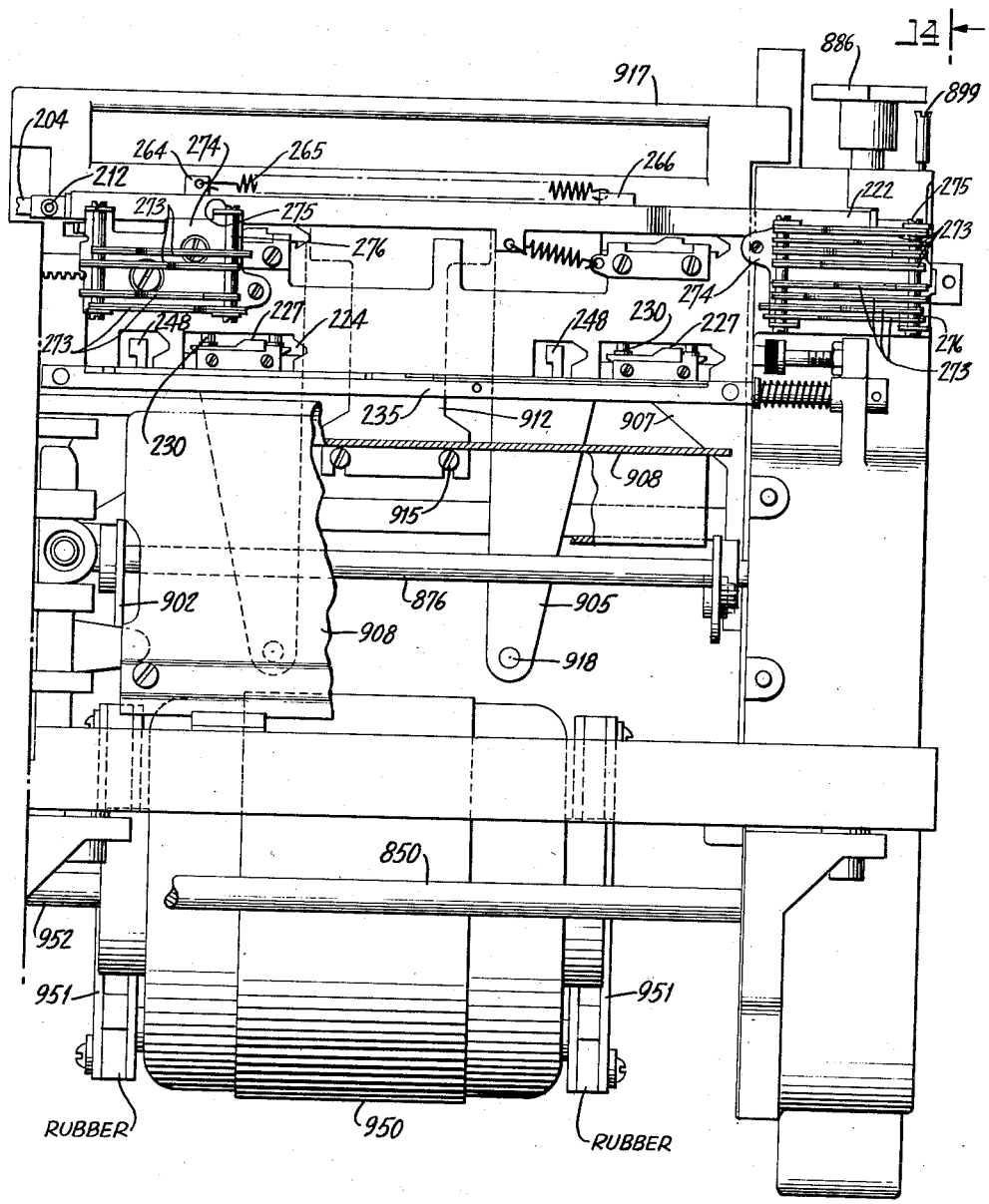

R. B. JOHNSON ET AL 2,684,719

STORAGE KEY PUNCH

Filed Aug. 19, 1950

INVENTORS
REYNOLD B. JOHNSON
HENRY A. JURGENS
OTTO F. MONEAGLE

ATTORNEY

July 27, 1954  R. B. JOHNSON ET AL  2,684,719
STORAGE KEY PUNCH

Filed Aug. 19, 1950                                    49 Sheets-Sheet 10

INVENTORS
REYNOLD B. JOHNSON
HENRY A. JURGENS
OTTO F. MONEAGLE
ATTORNEY

July 27, 1954

R. B. JOHNSON ET AL 2,684,719

STORAGE KEY PUNCH

Filed Aug. 19, 1950

INVENTORS
REYNOLD B. JOHNSON
HENRY A. JURGENS
OTTO F. MONEAGLE

ATTORNEY

July 27, 1954

R. B. JOHNSON ET AL 2,684,719

STORAGE KEY PUNCH

Filed Aug. 19, 1950

INVENTORS
REYNOLD B. JOHNSON
HENRY A. JURGENS
OTTO F. MONEAGLE

ATTORNEY

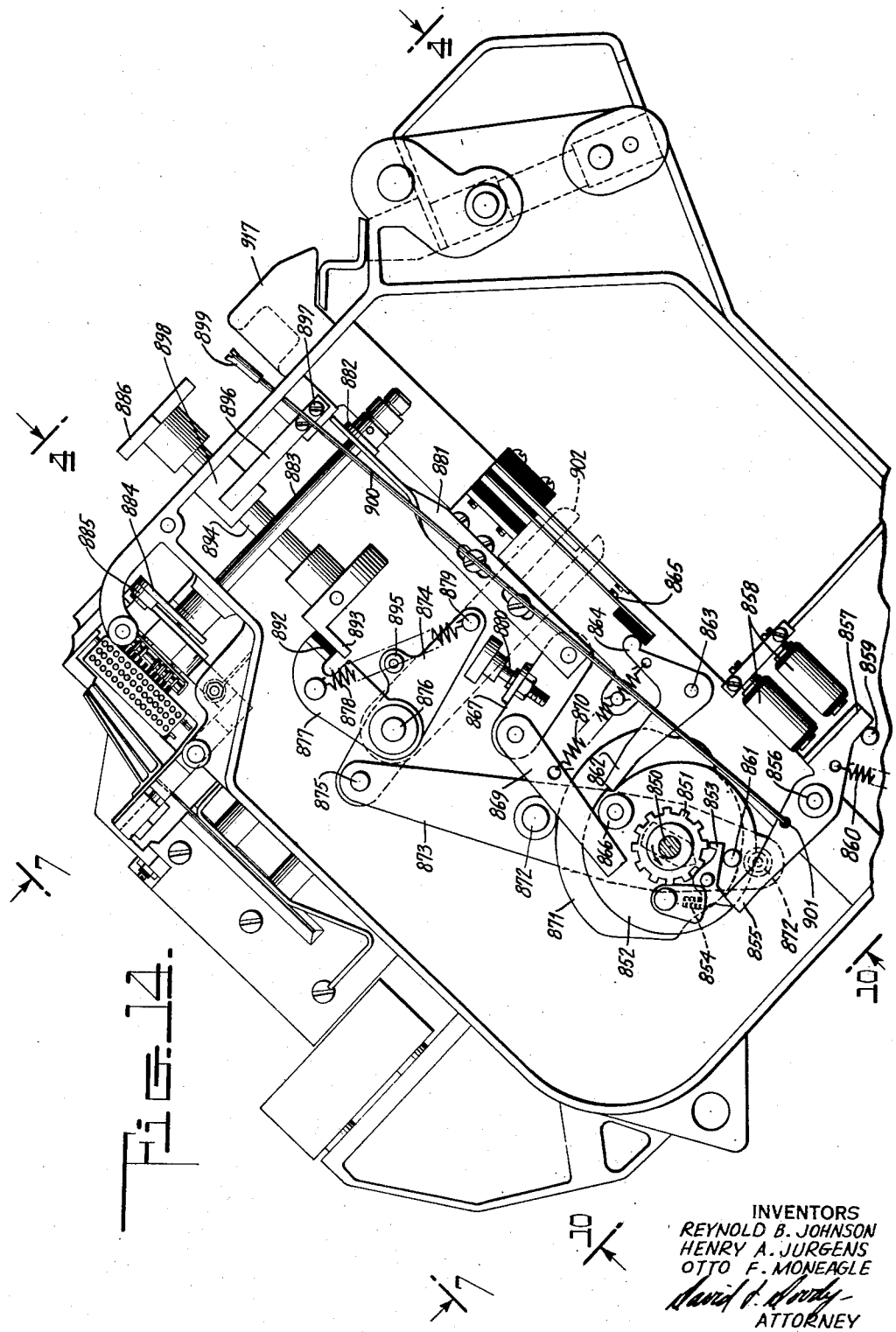

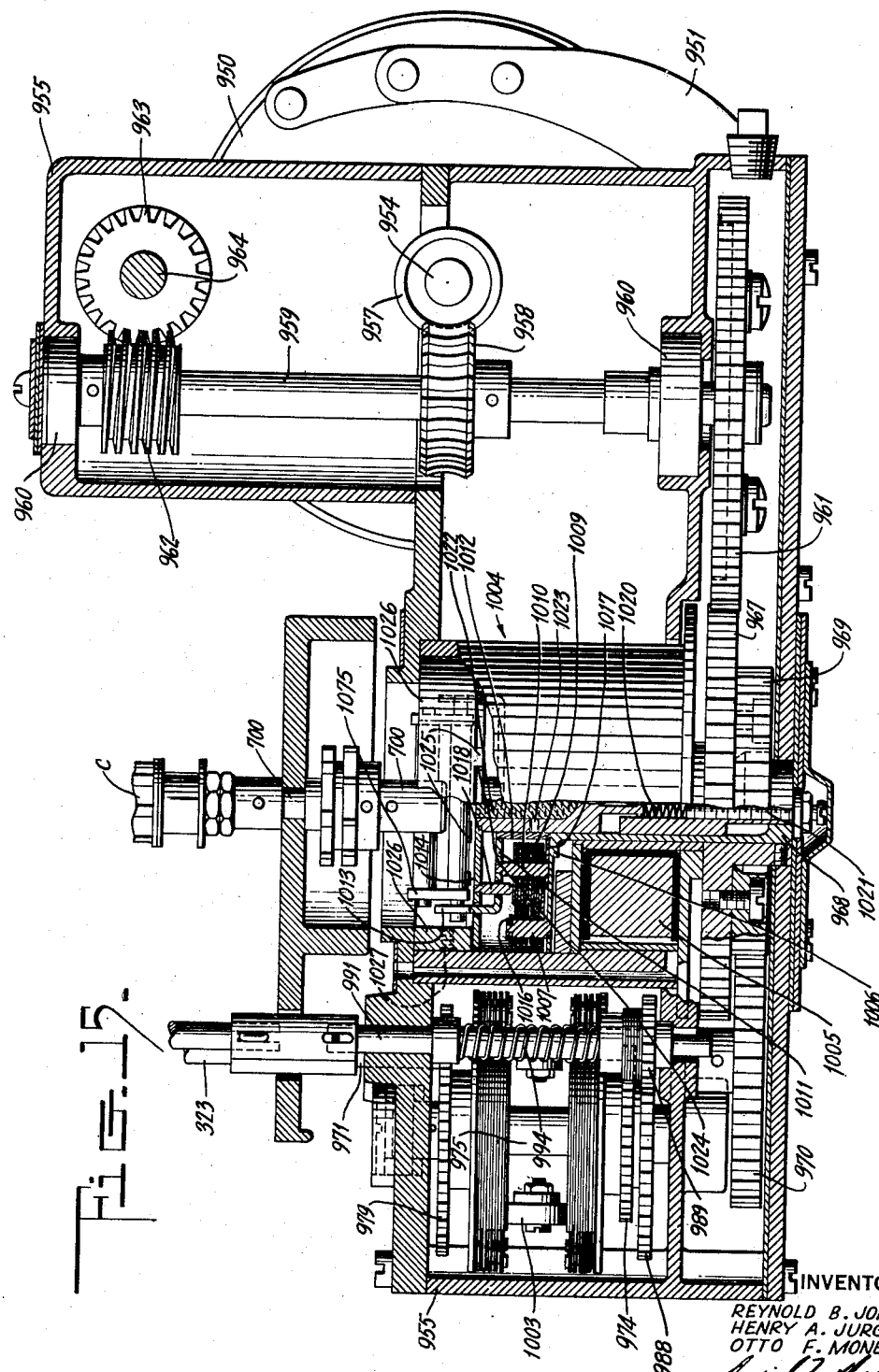

July 27, 1954
R. B. JOHNSON ET AL
2,684,719
STORAGE KEY PUNCH
Filed Aug. 19, 1950
49 Sheets-Sheet 17
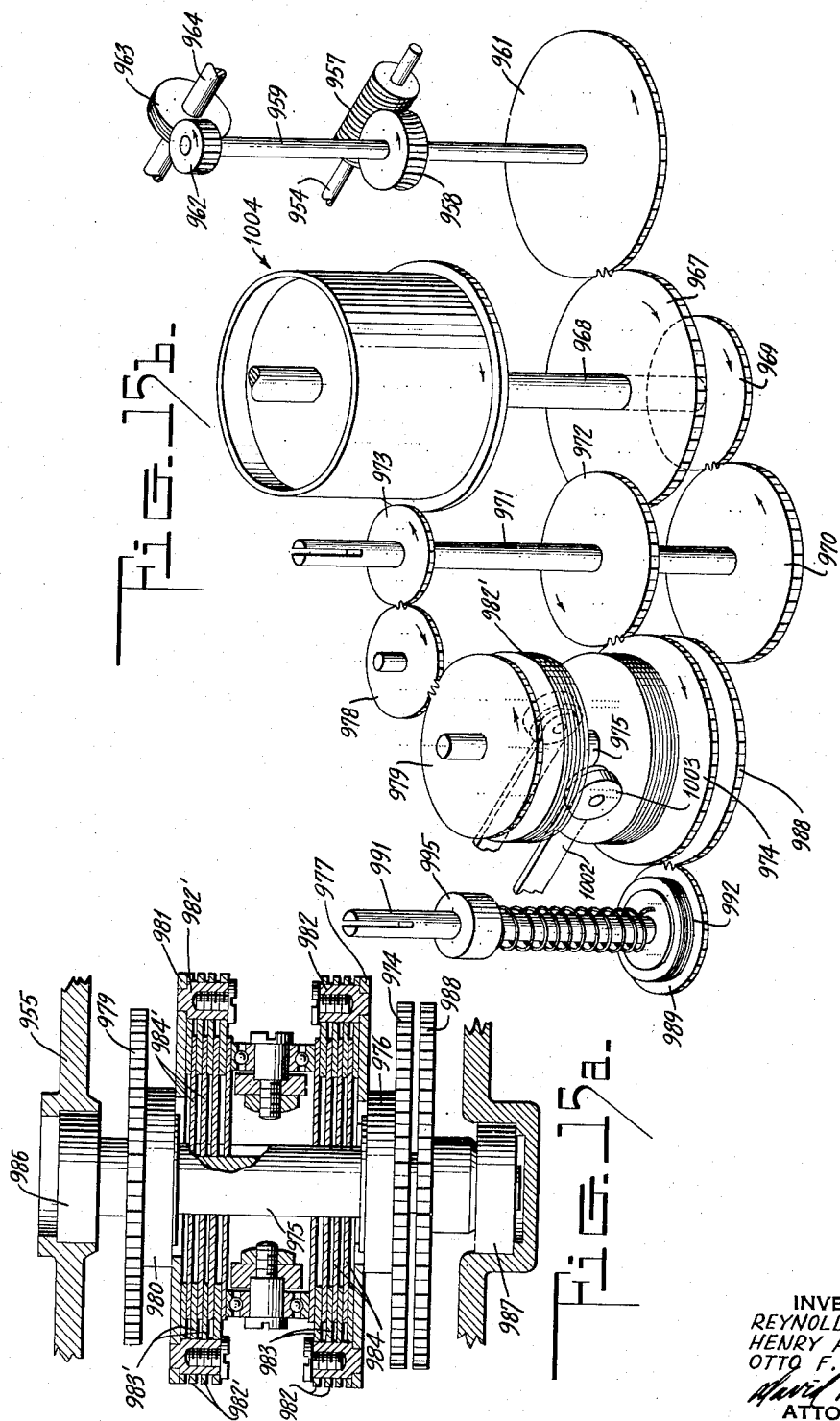
INVENTORS
REYNOLD B. JOHNSON
HENRY A. JURGENS
OTTO F. MONEAGLE
ATTORNEY July 27, 1954
R. B. JOHNSON ET AL
2,684,719
STORAGE KEY PUNCH
Filed Aug. 19, 1950
49 Sheets-Sheet 18
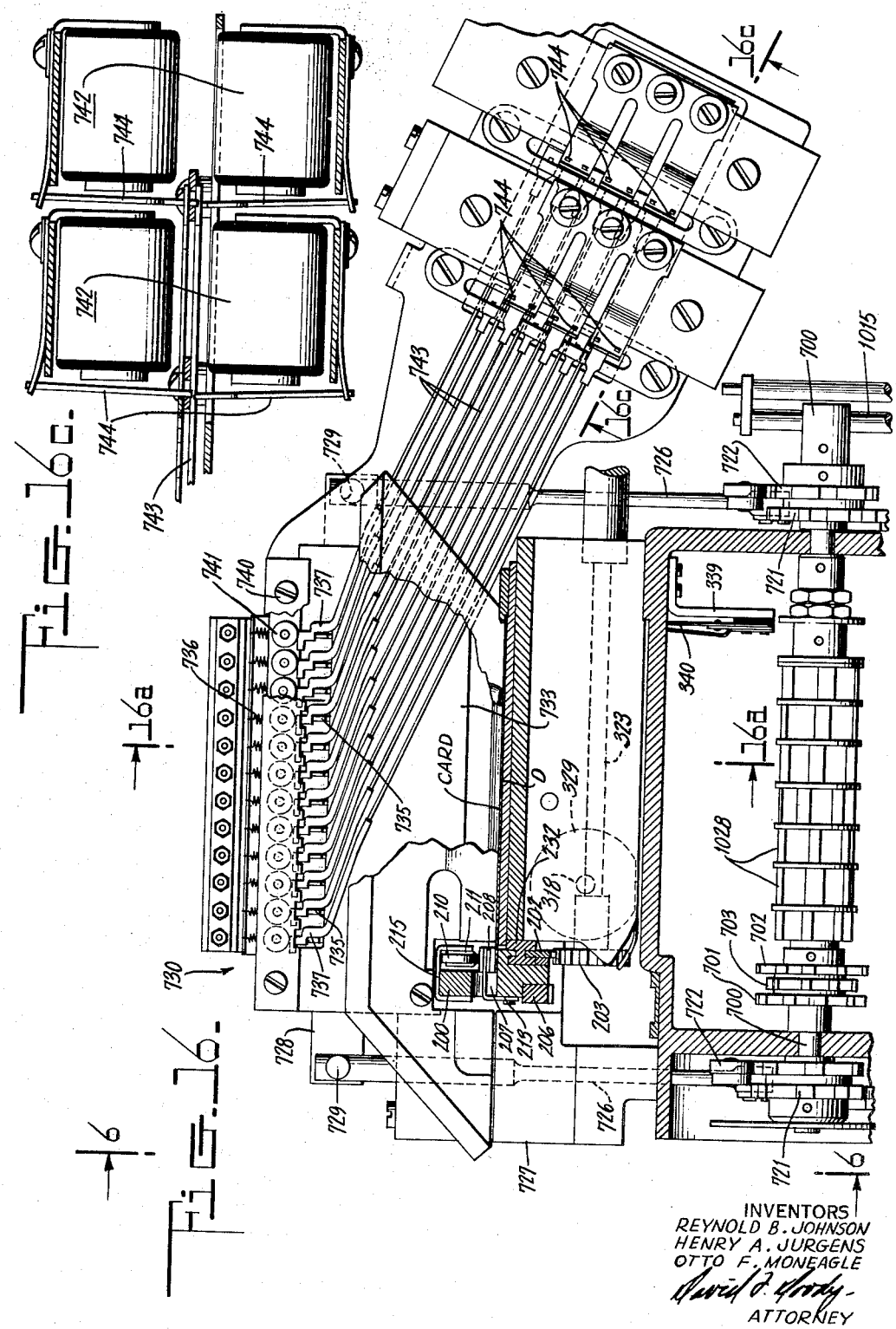
INVENTORS
REYNOLD B. JOHNSON
HENRY A. JURGENS
OTTO F. MONEAGLE
ATTORNEY

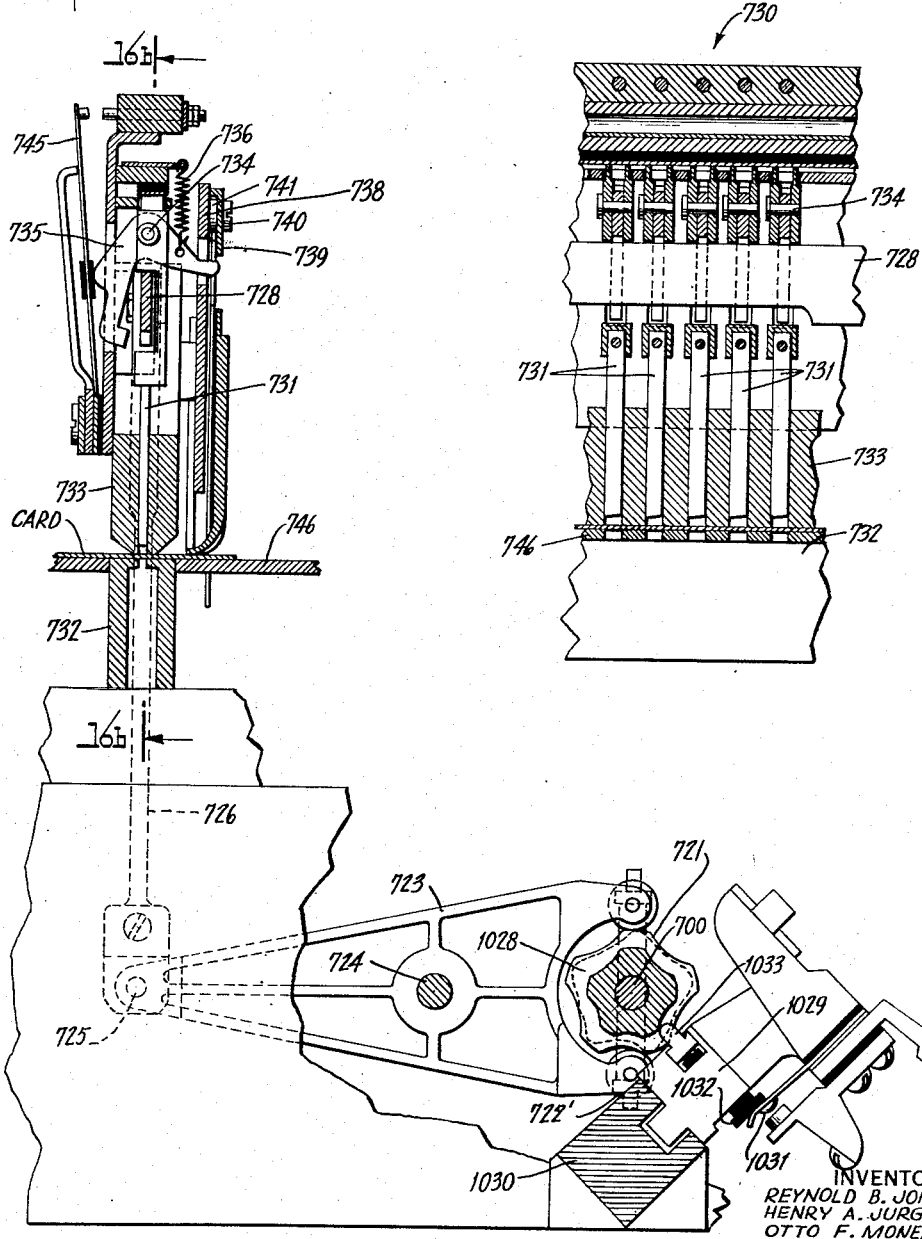

July 27, 1954
R. B. JOHNSON ET AL
2,684,719
STORAGE KEY PUNCH
Filed Aug. 19, 1950
49 Sheets-Sheet 20
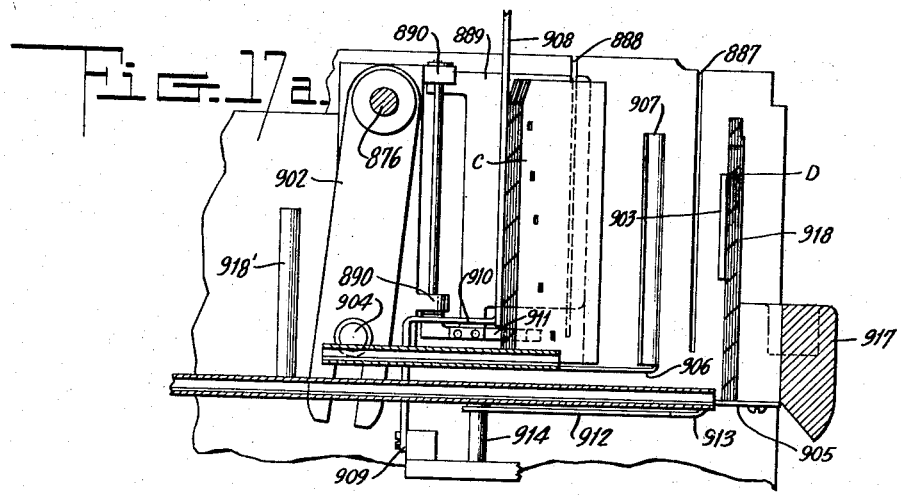
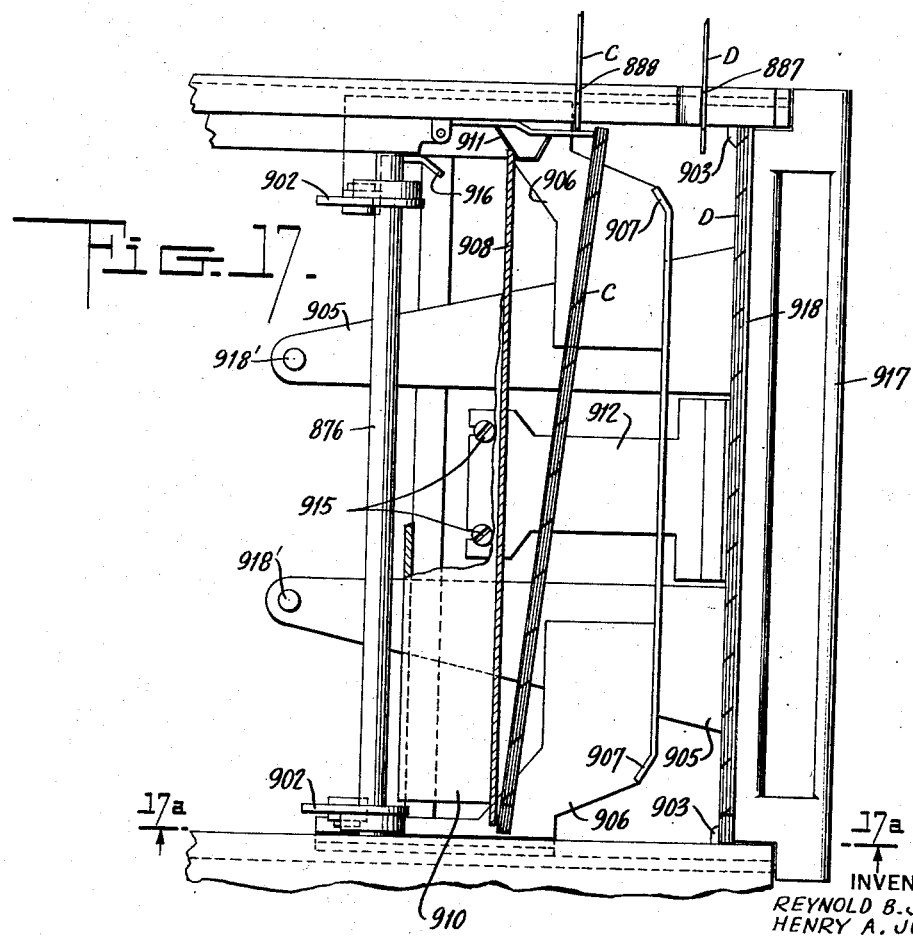
INVENTORS
REYNOLD B. JOHNSON
HENRY A. JURGENS
OTTO F. MONEAGLE
ATTORNEY July 27, 1954
R. B. JOHNSON ET AL
2,684,719
STORAGE KEY PUNCH
Filed Aug. 19, 1950
49 Sheets-Sheet 21
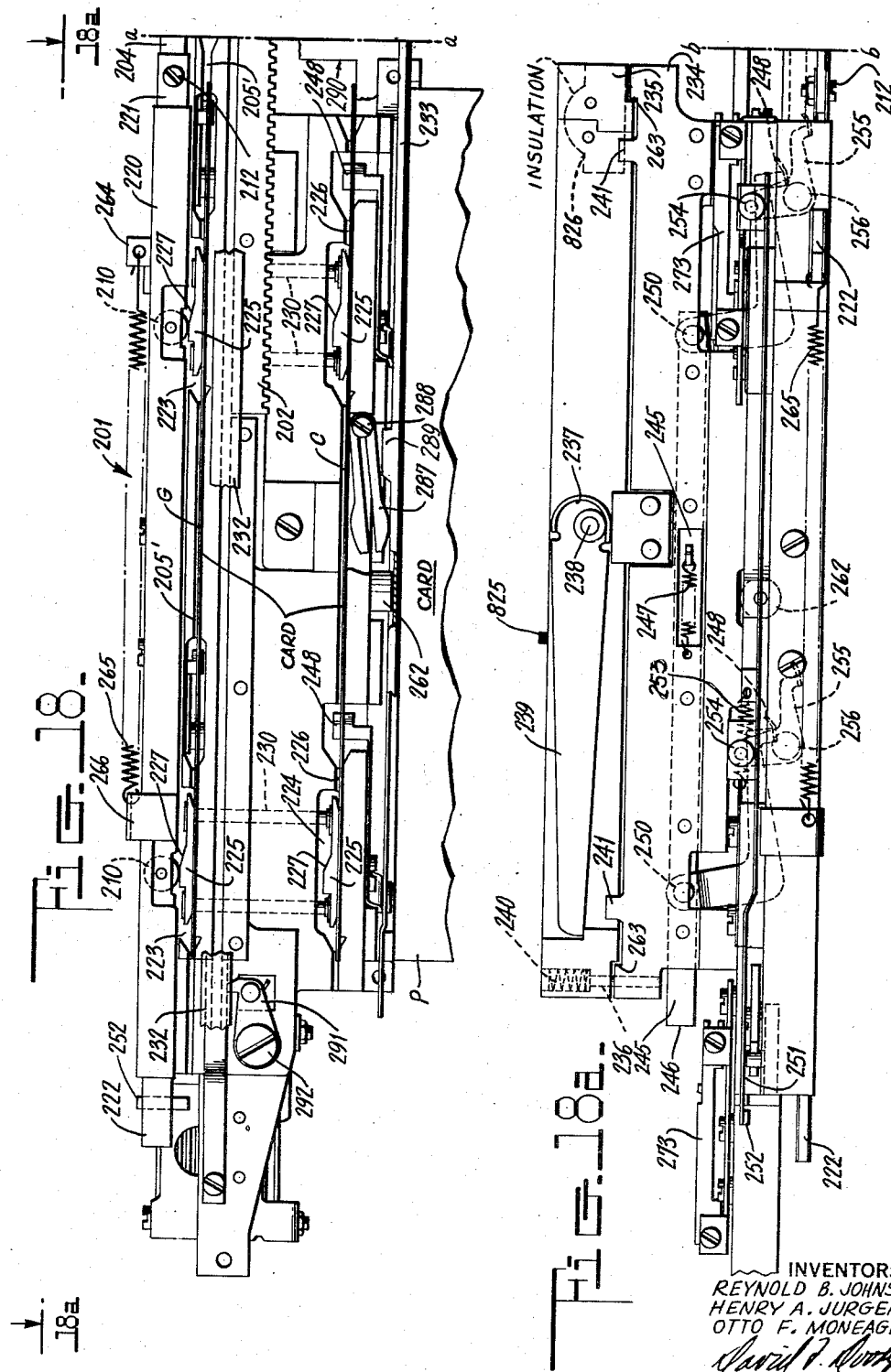
INVENTORS
REYNOLD B. JOHNSON
HENRY A. JURGENS
OTTO F. MONEAGLE
ATTORNEY

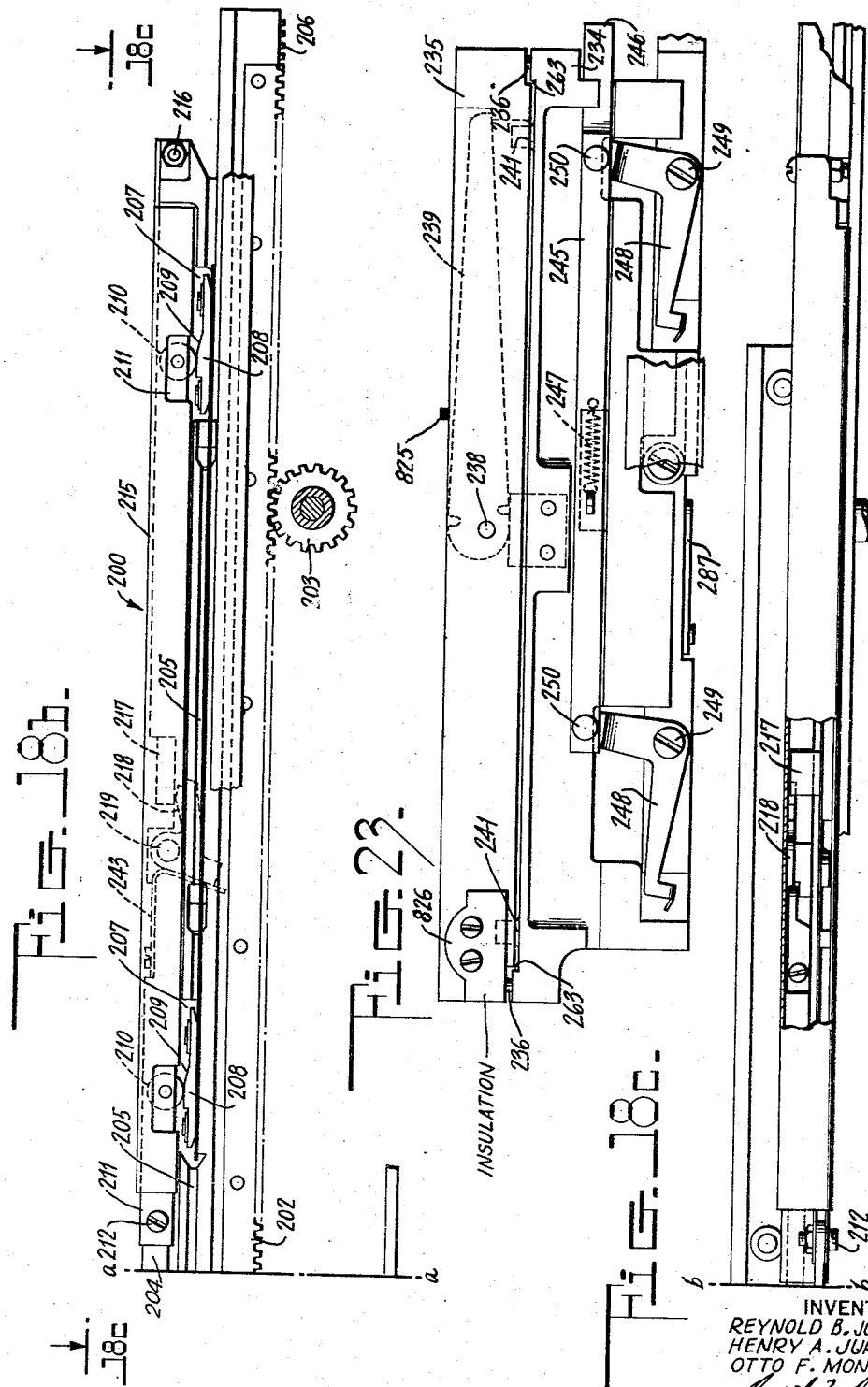

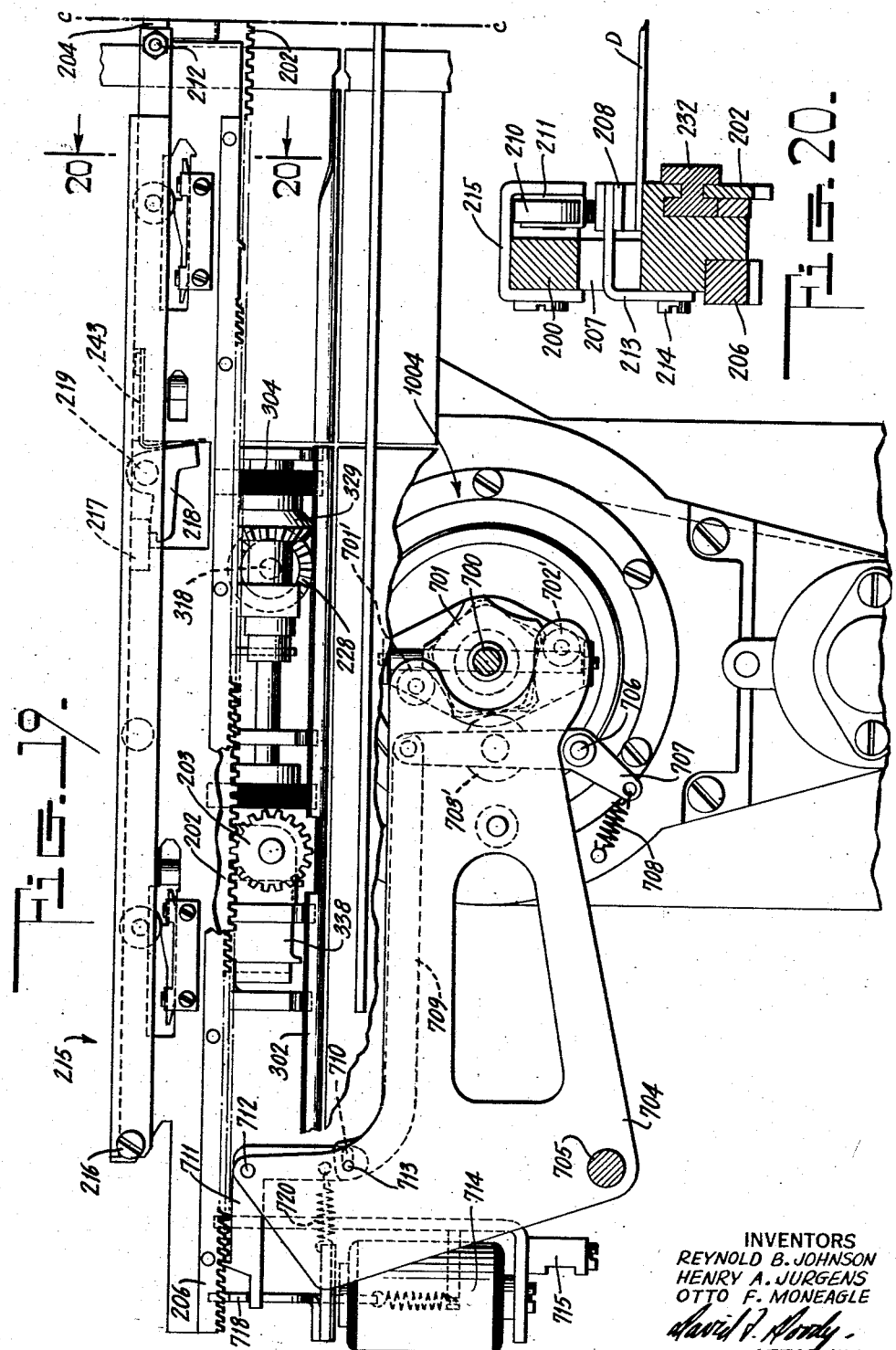

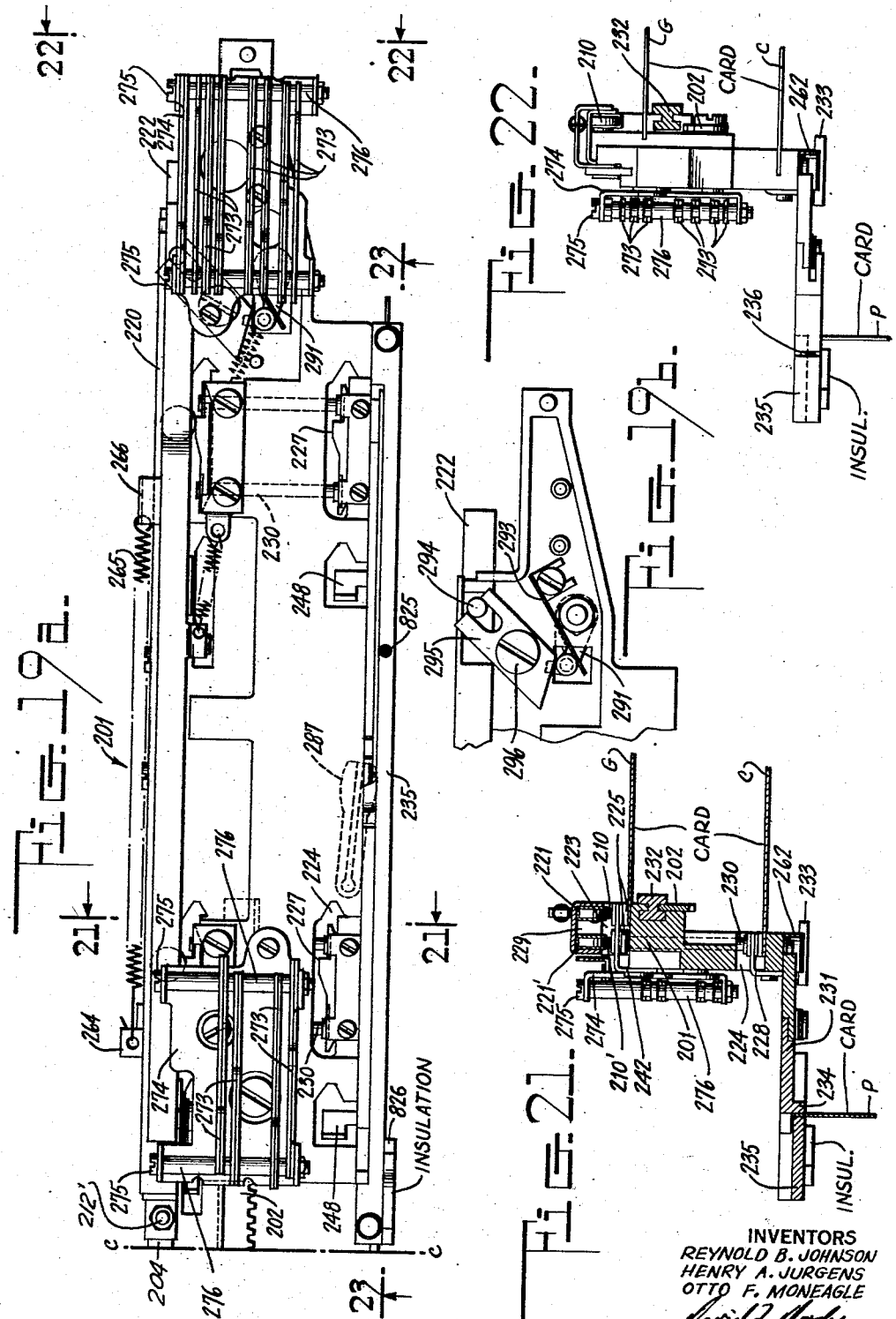

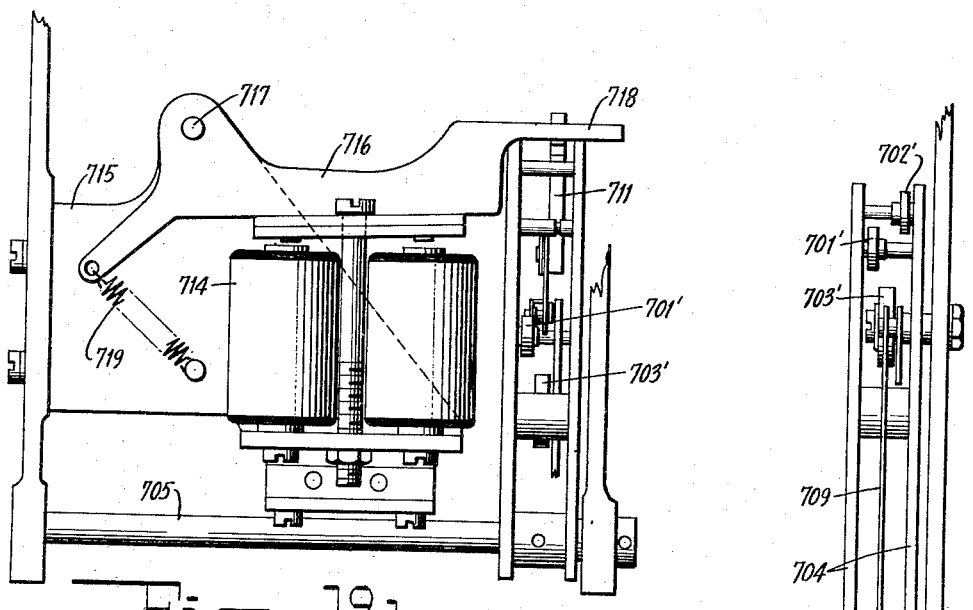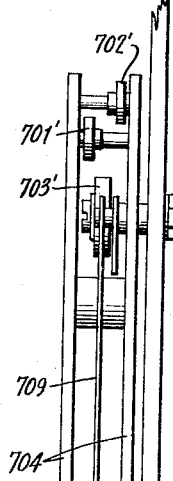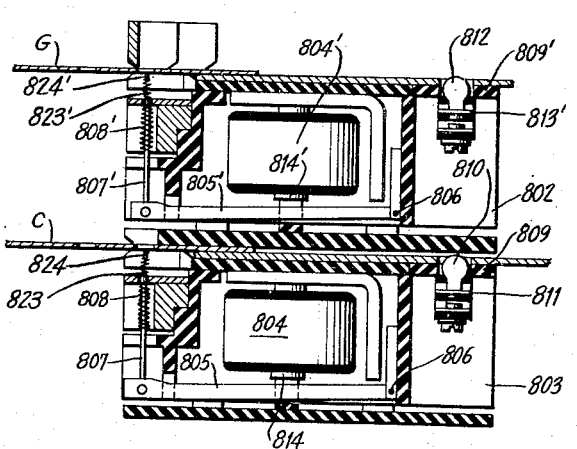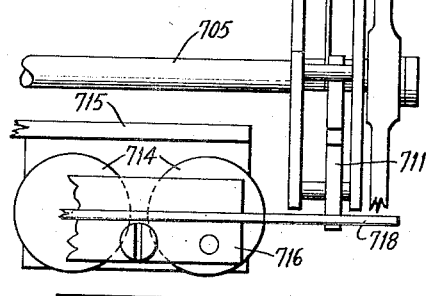

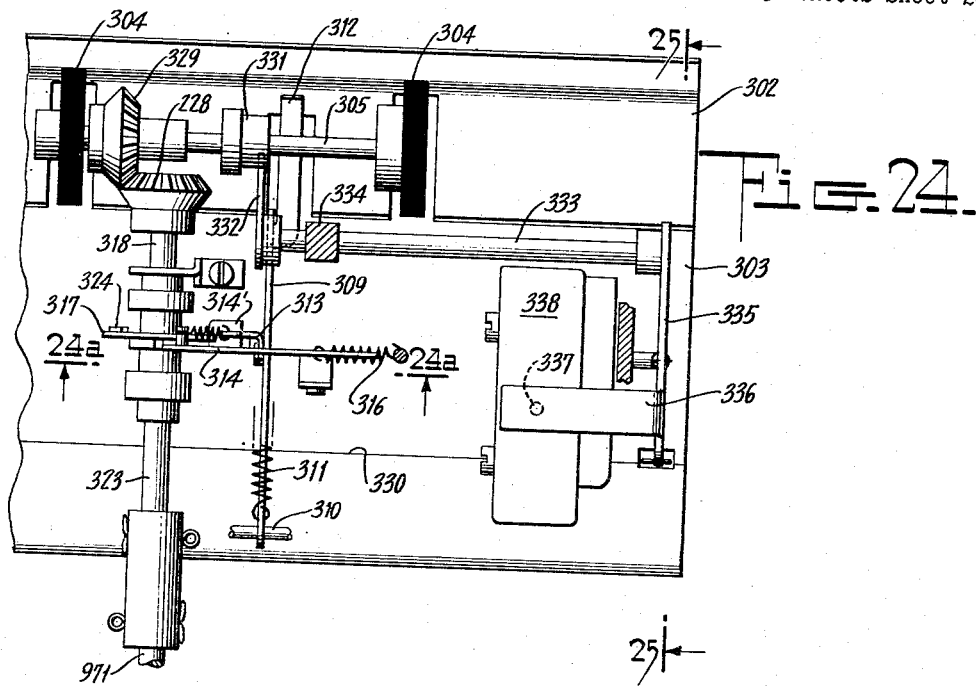
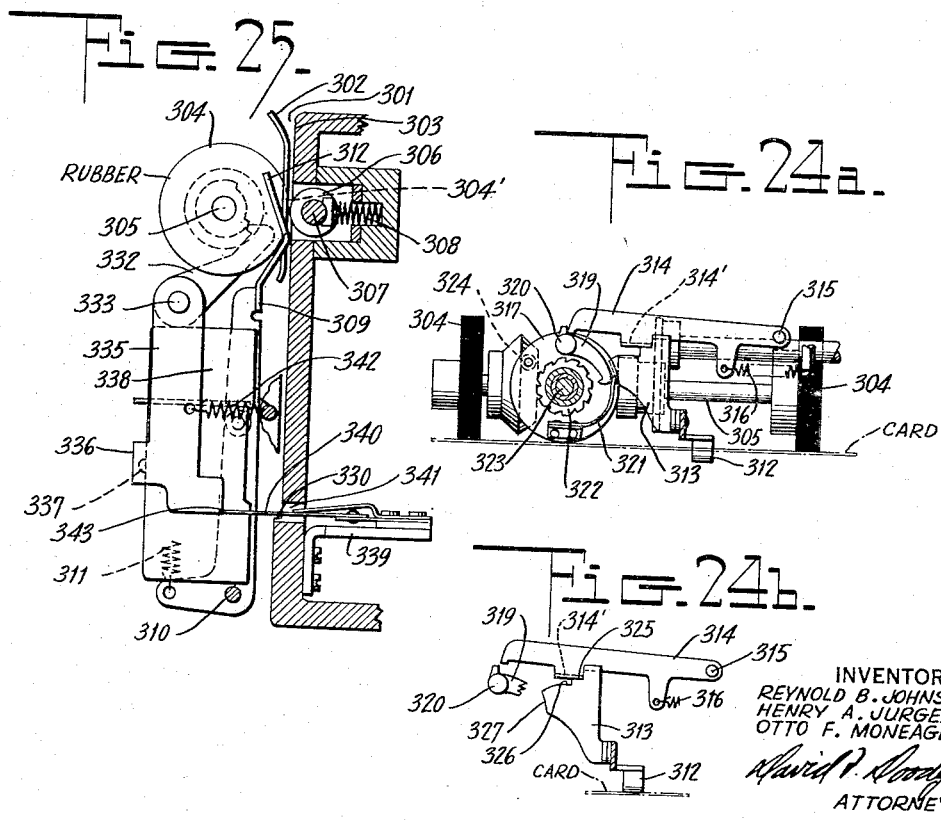

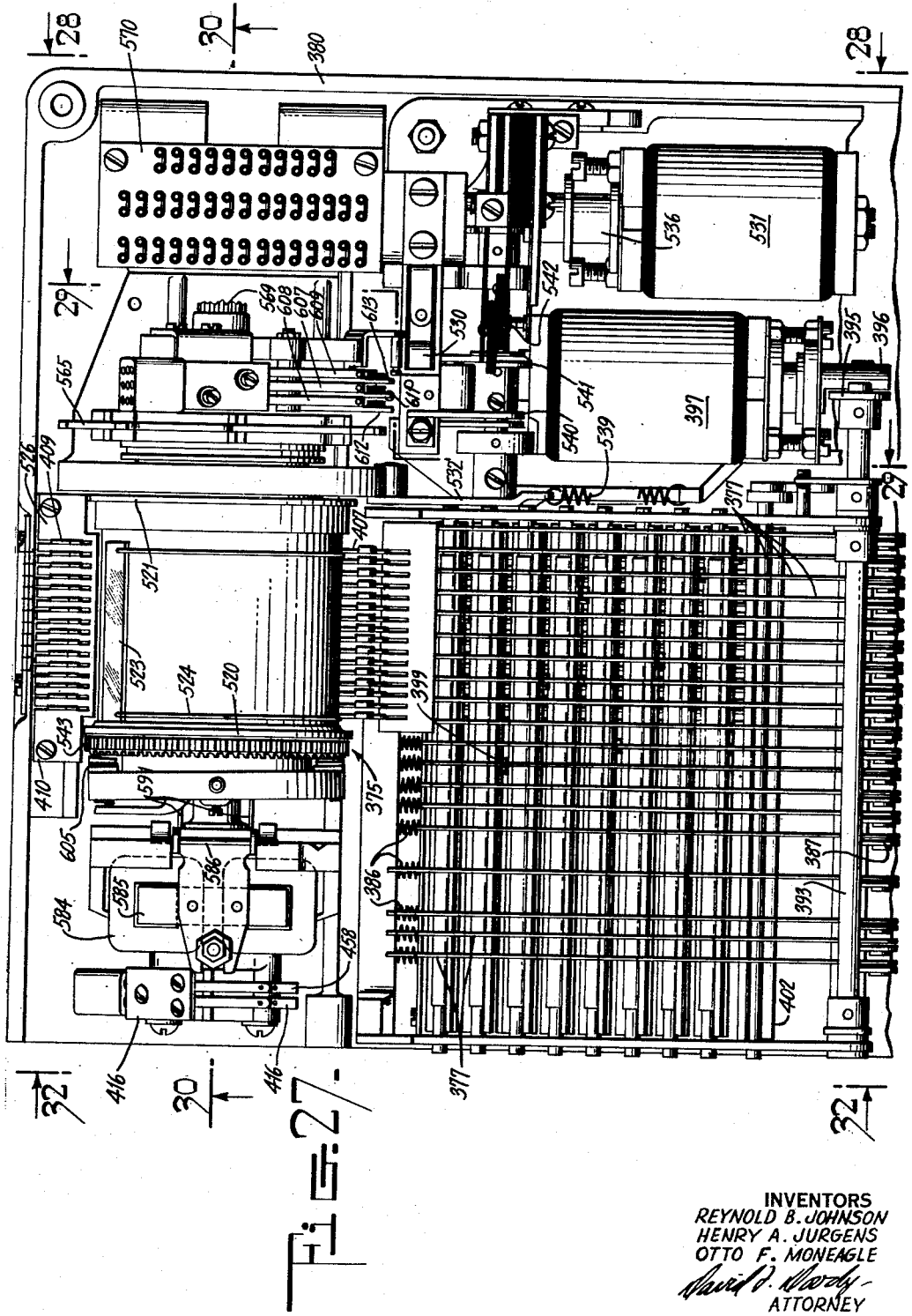

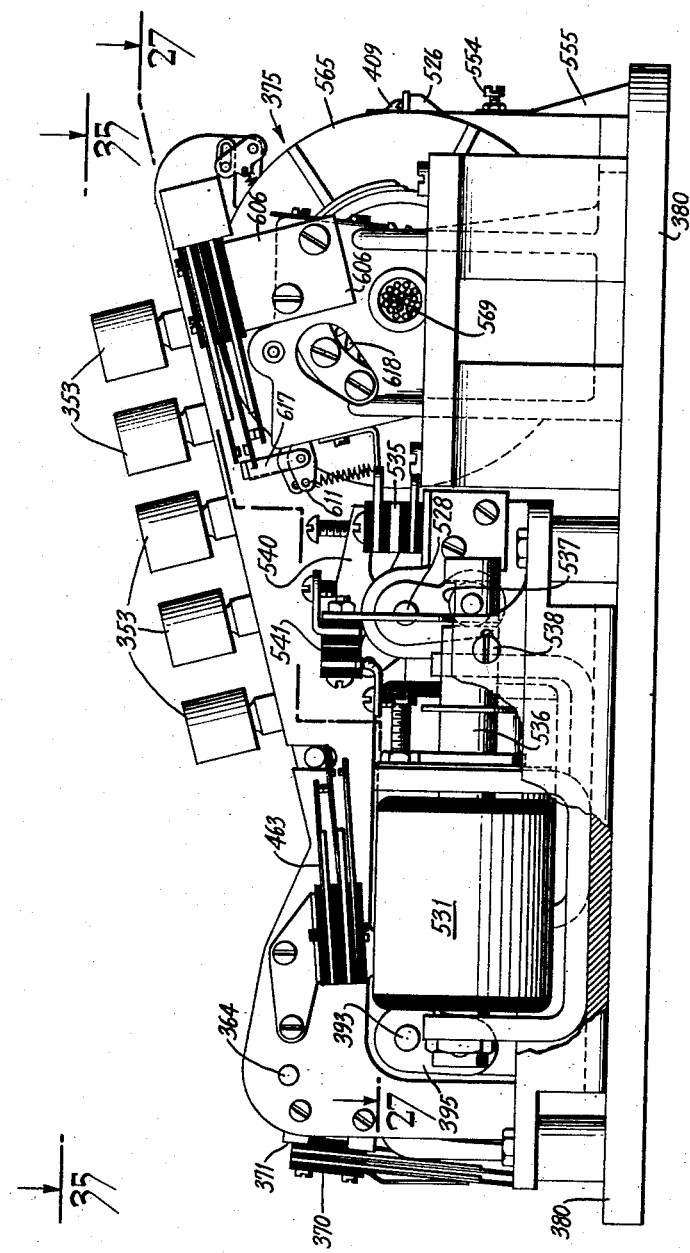

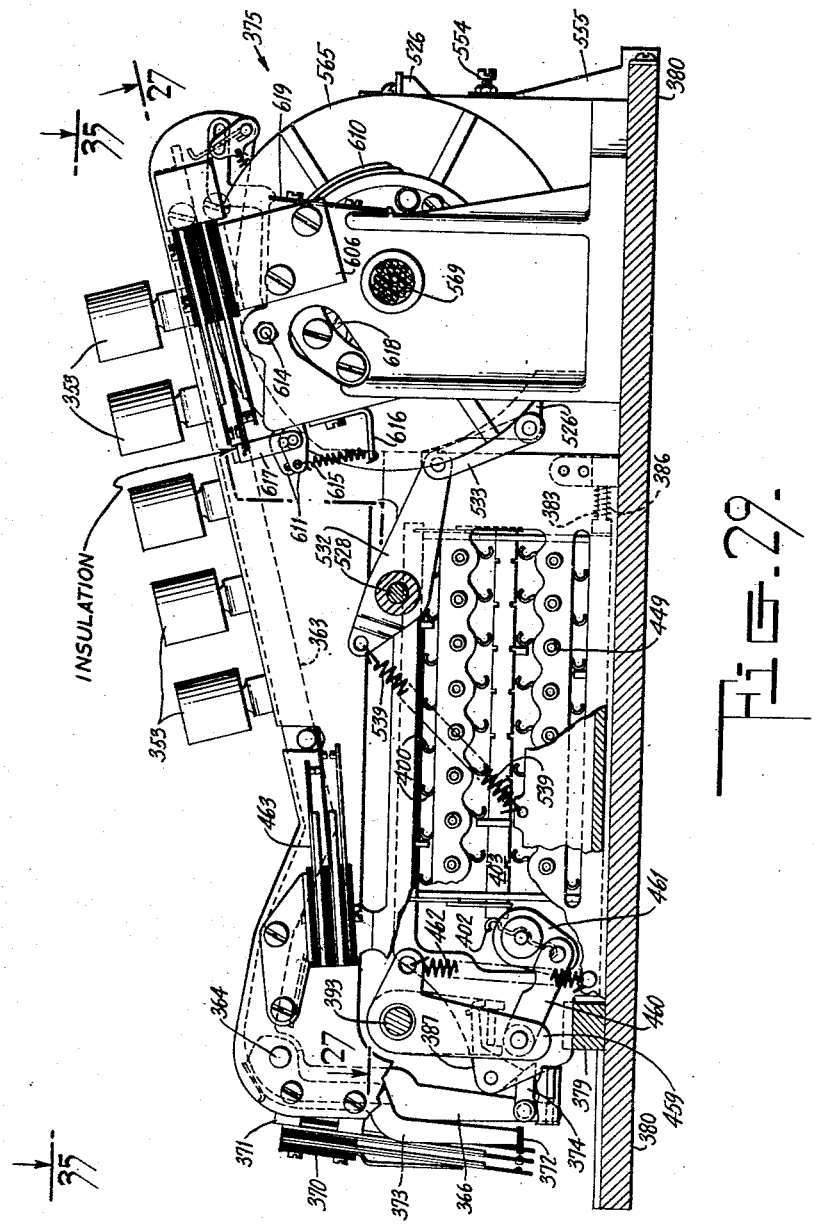

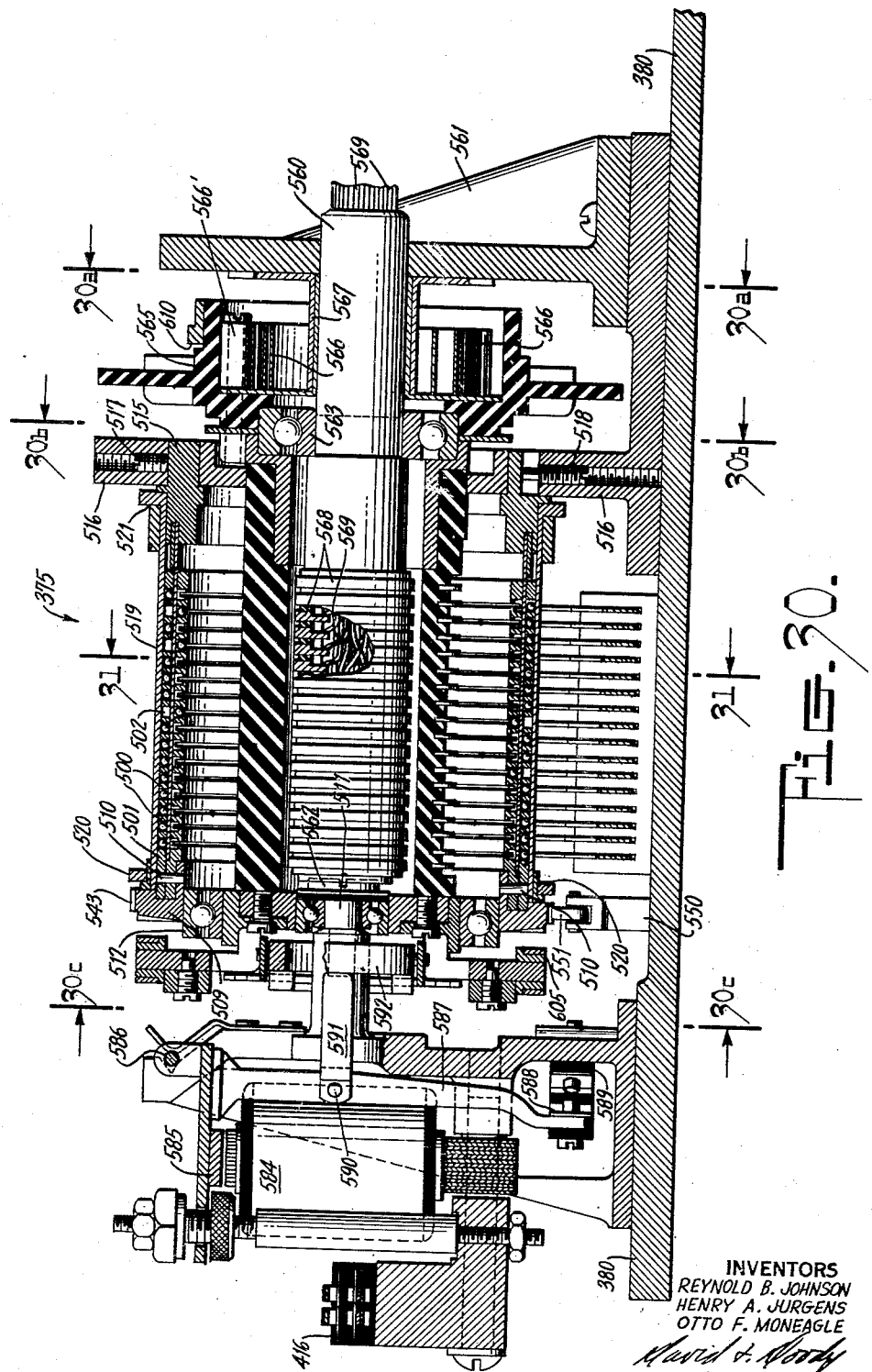

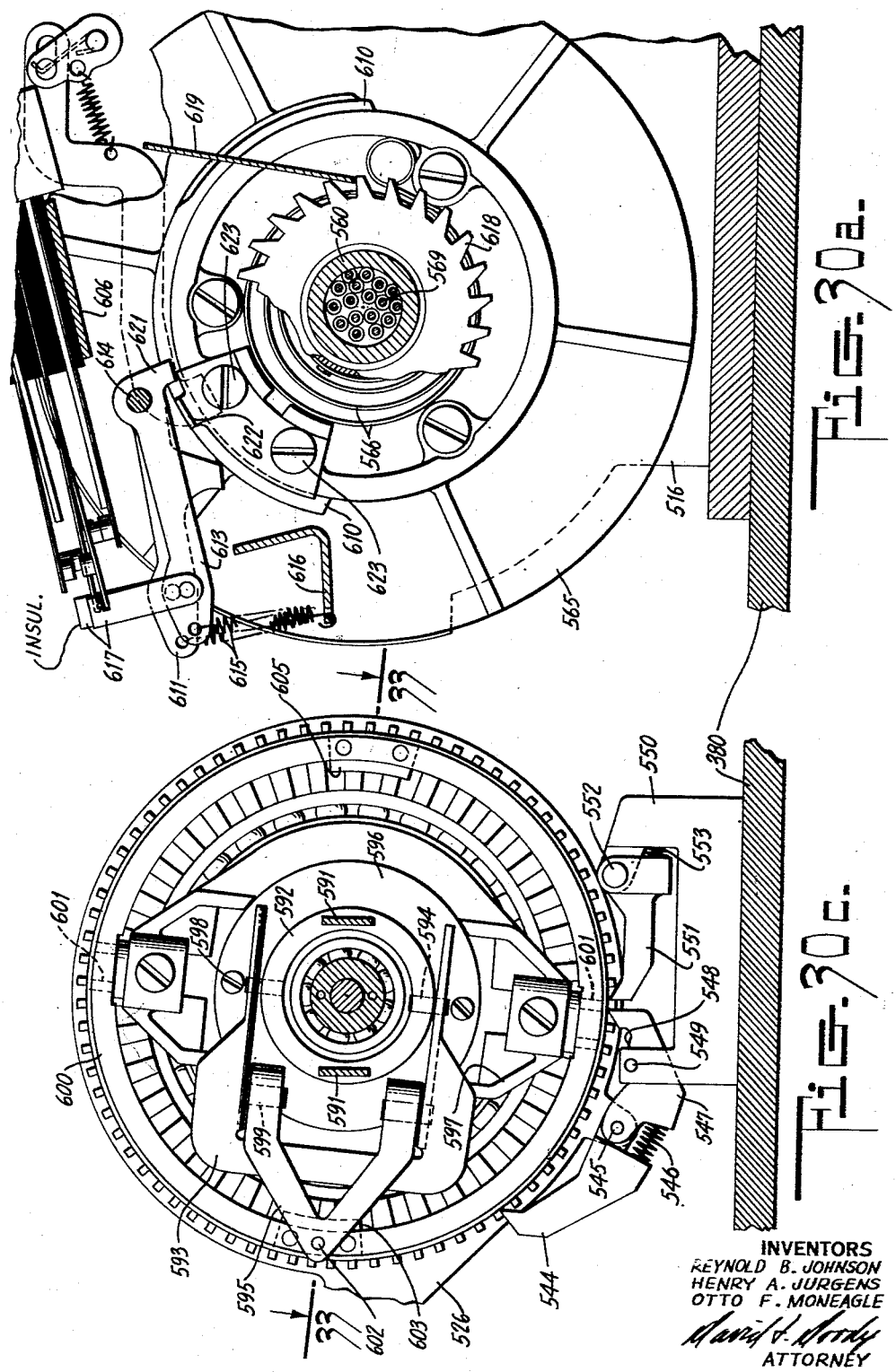

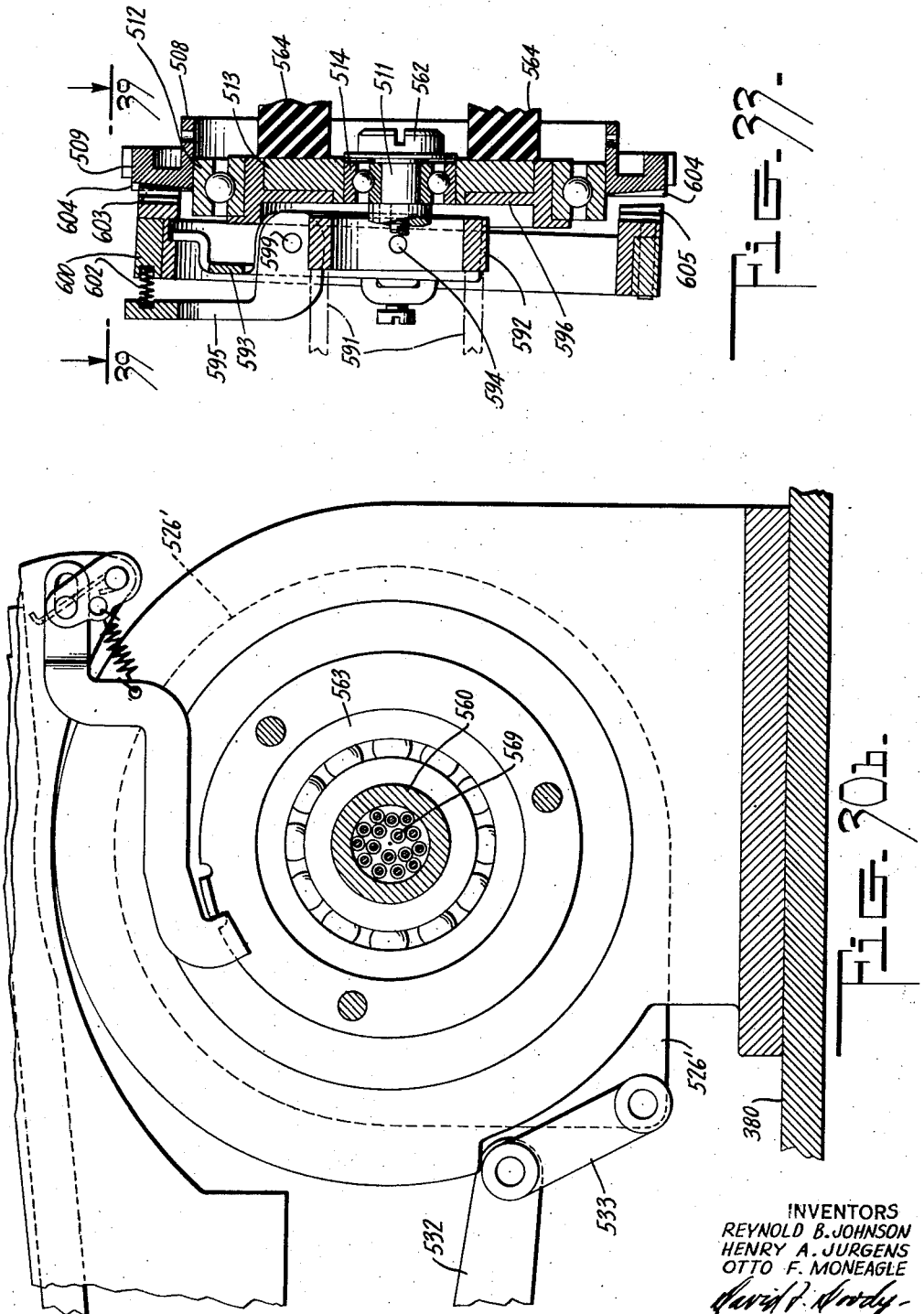

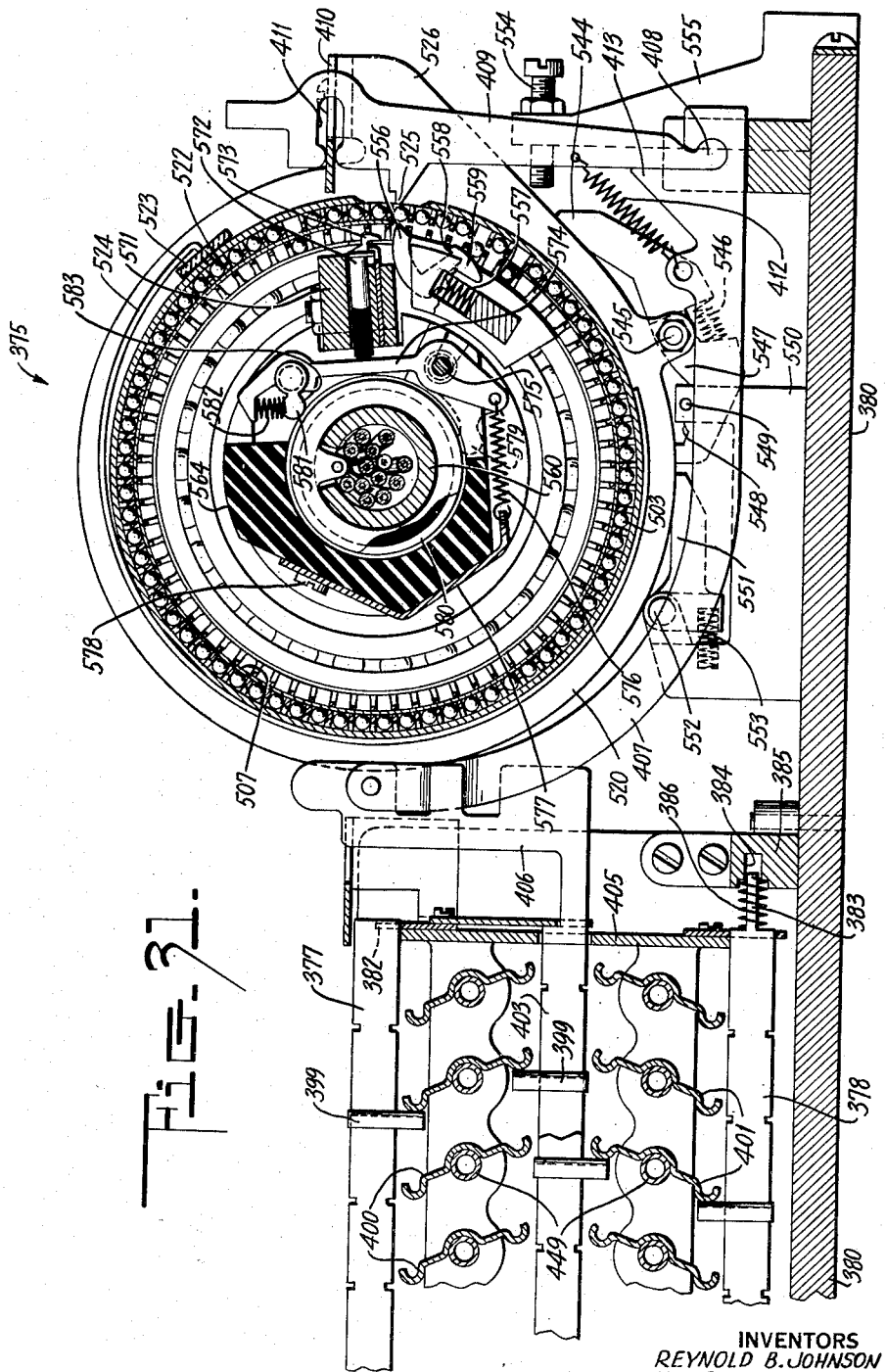

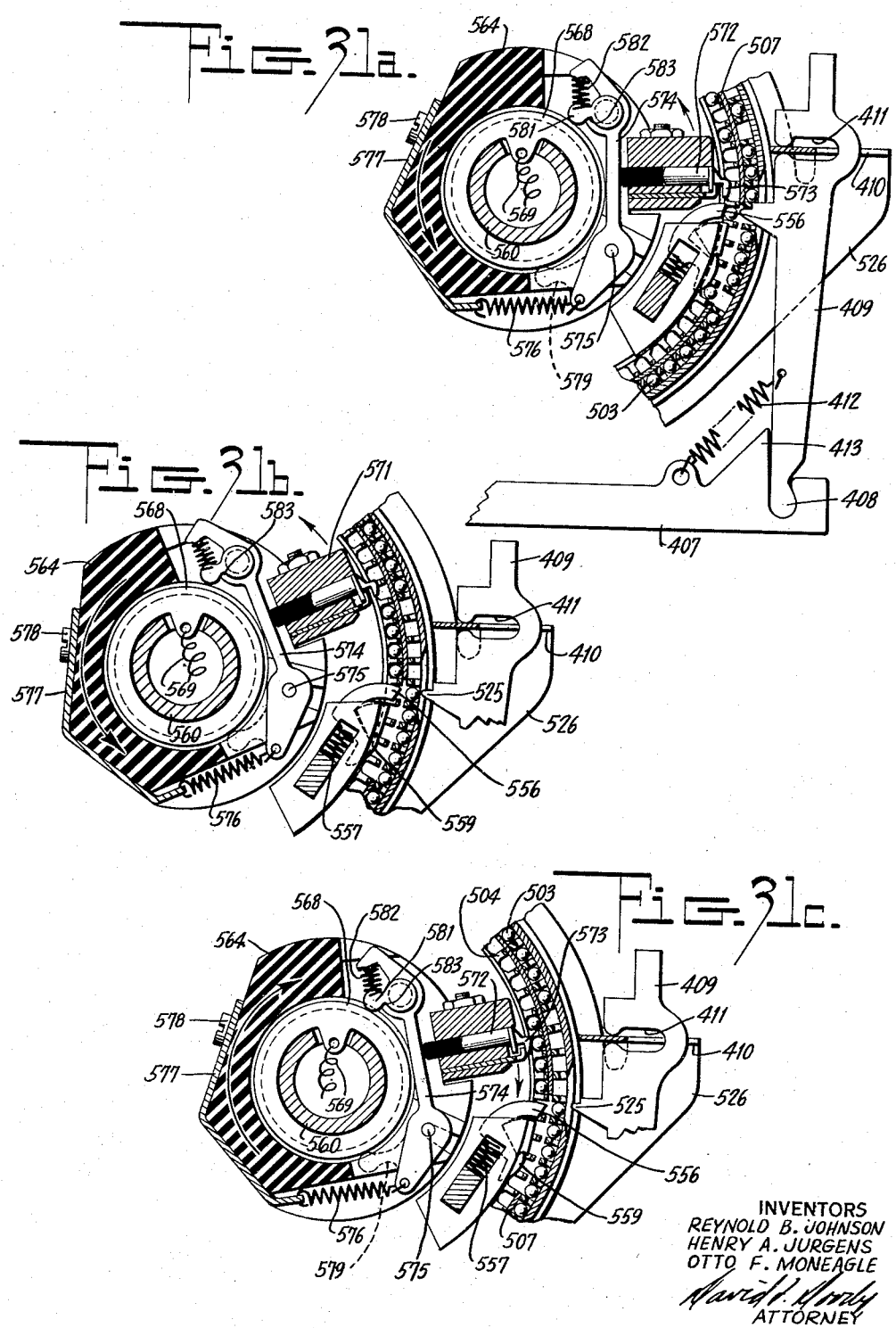

July 27, 1954
R. B. JOHNSON ET AL
2,684,719
STORAGE KEY PUNCH
Filed Aug. 19, 1950
49 Sheets-Sheet 35
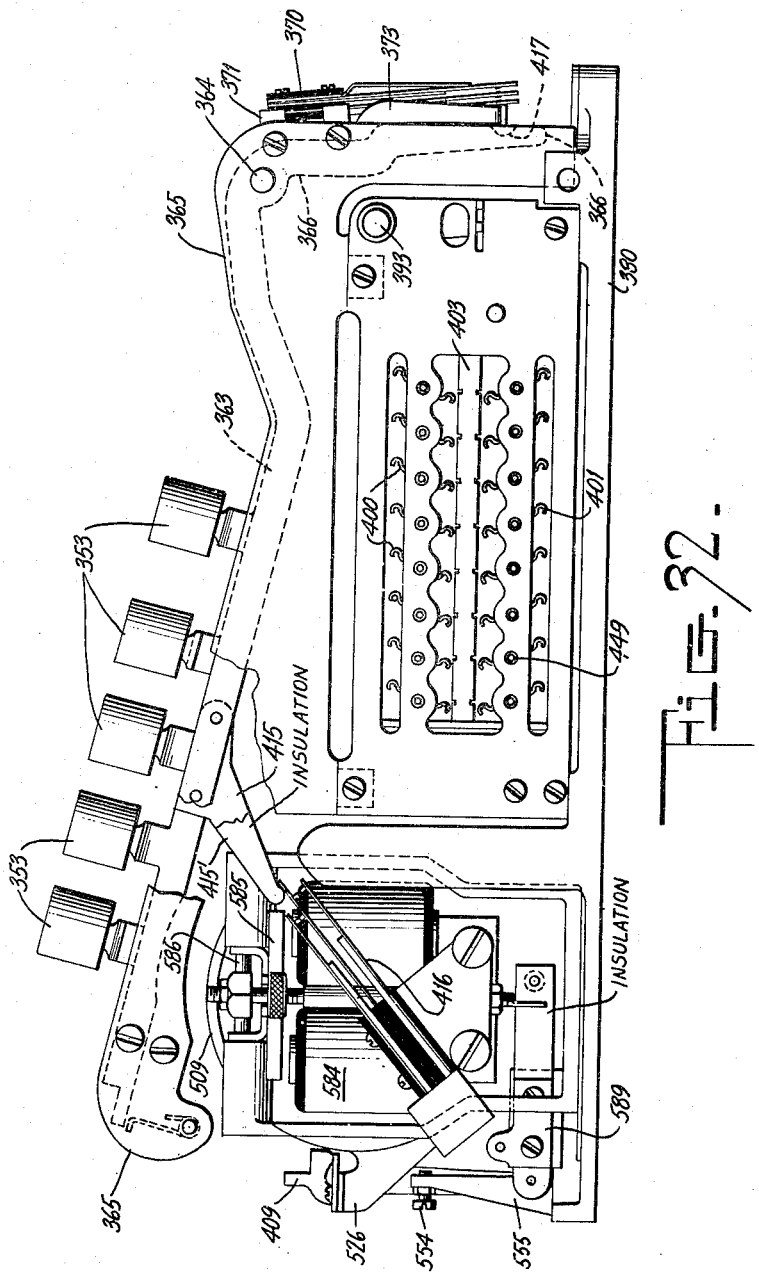
INVENTORS
REYNOLD B. JOHNSON
HENRY A. JURGENS
OTTO F. MONEAGLE
ATTORNEY

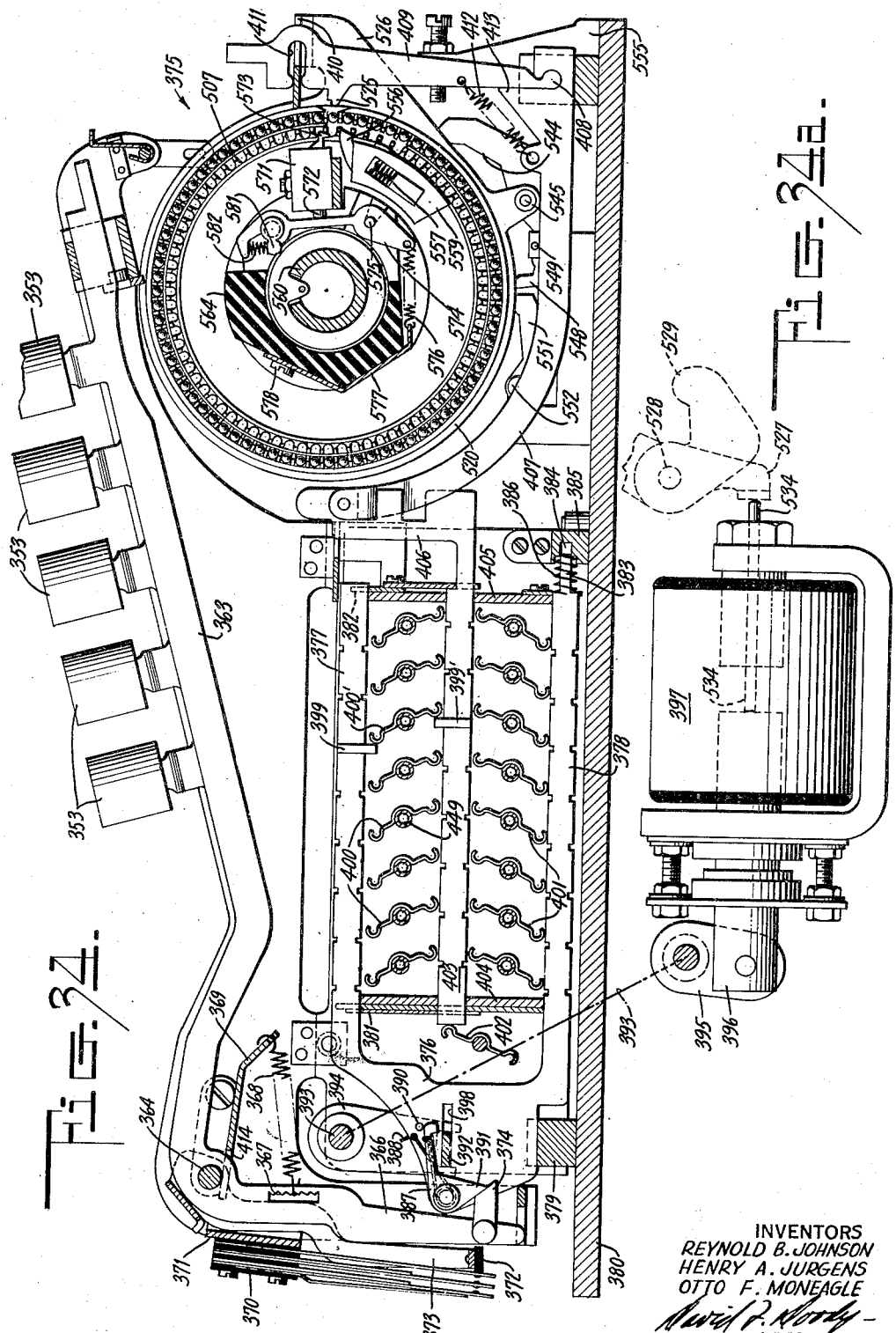

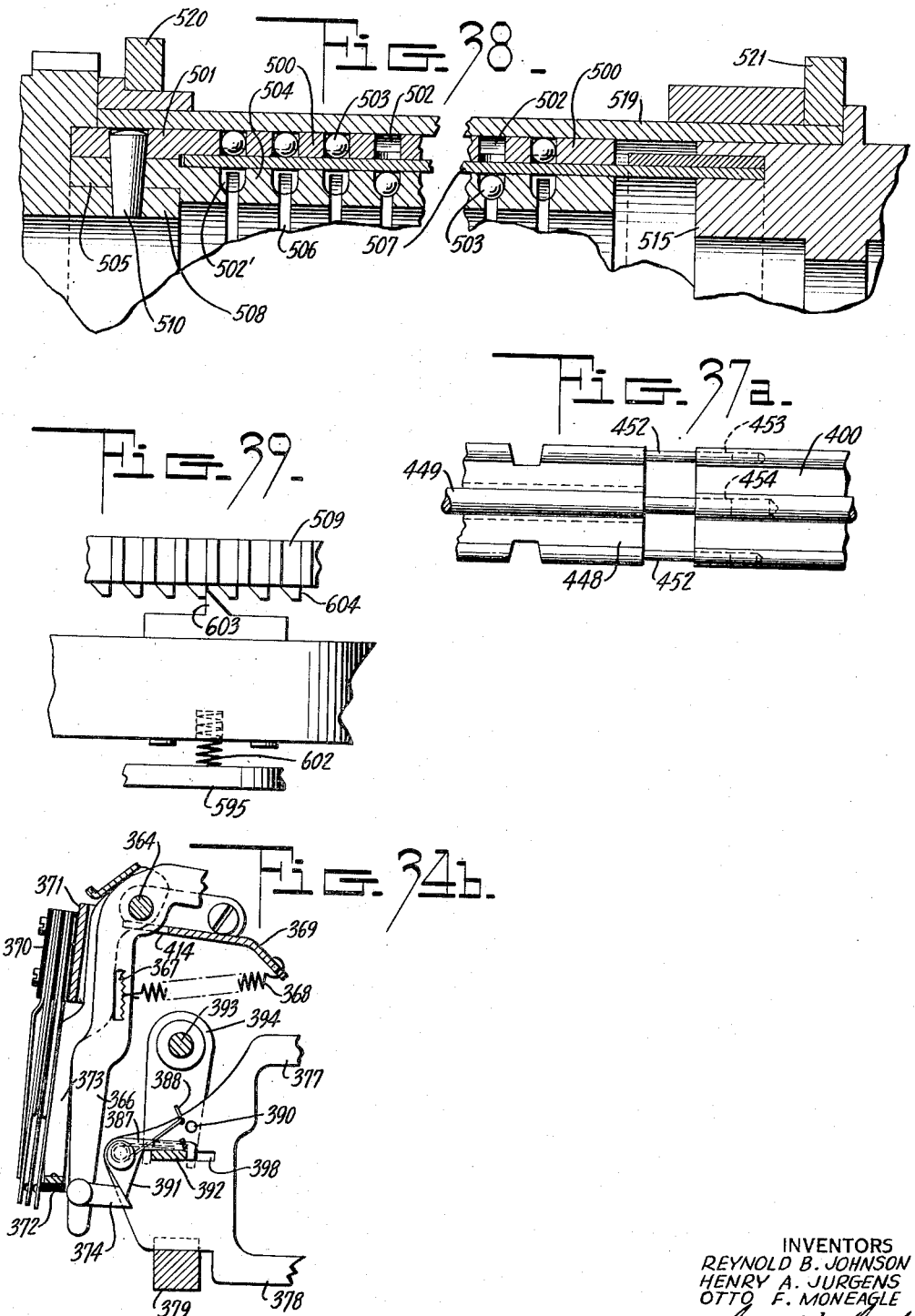

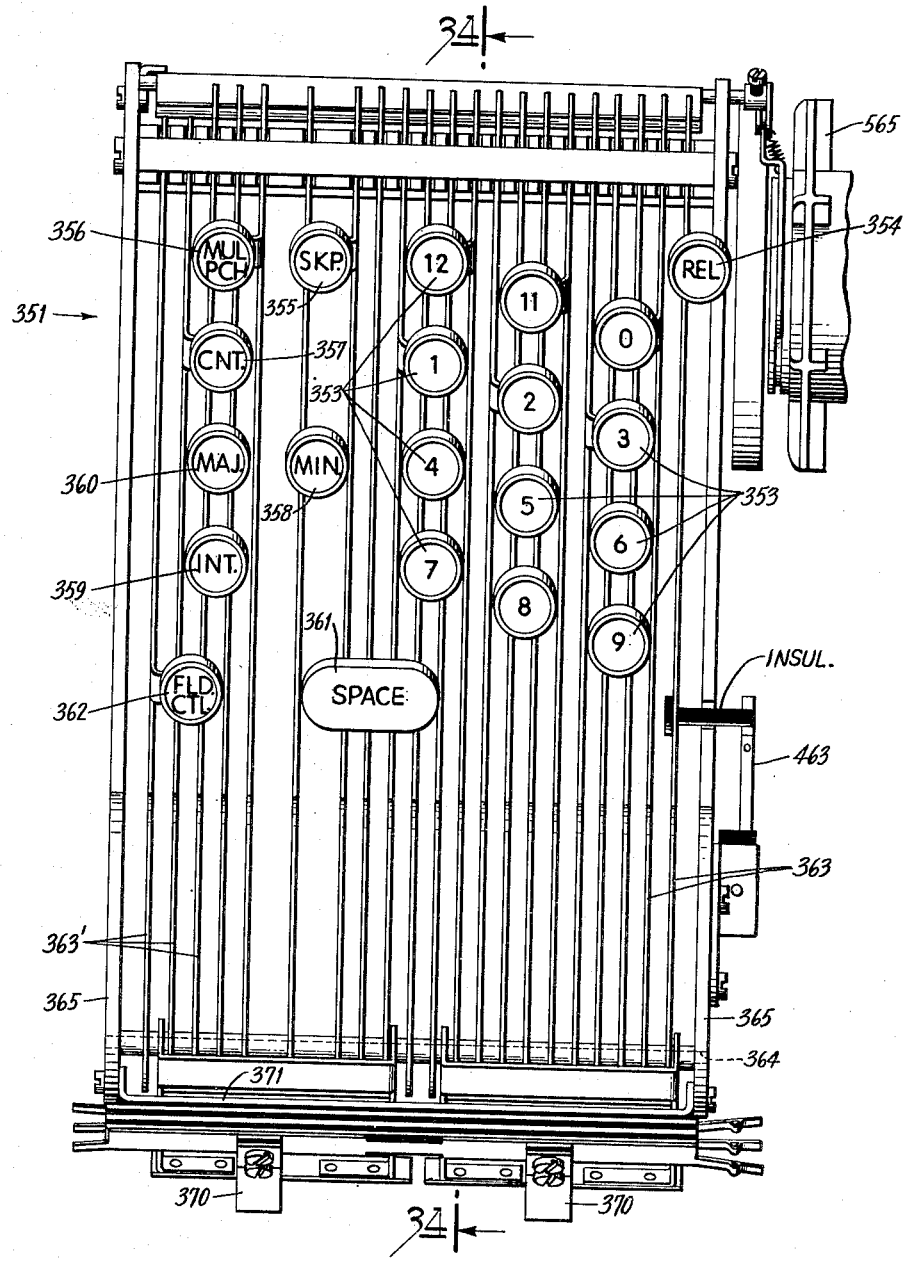

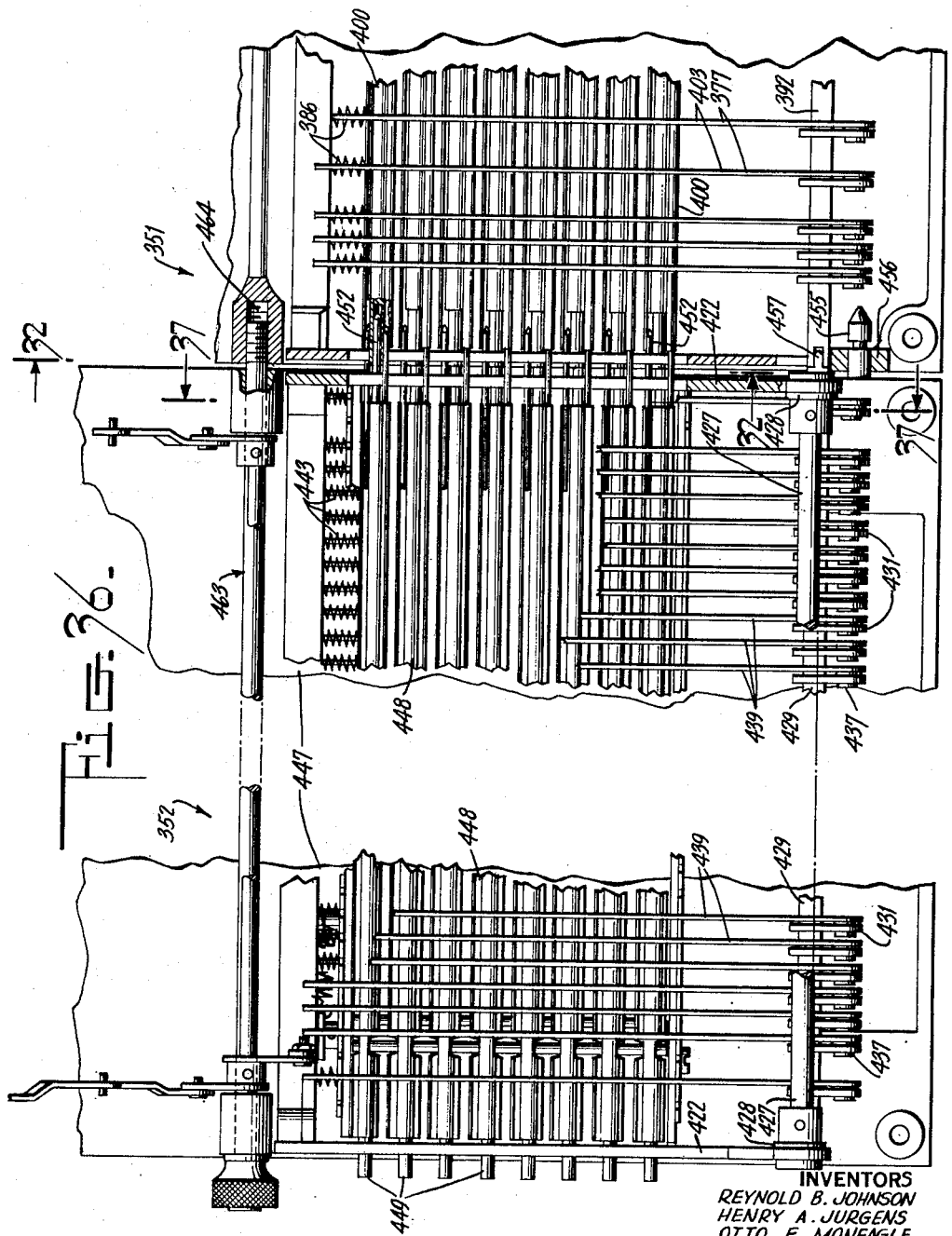

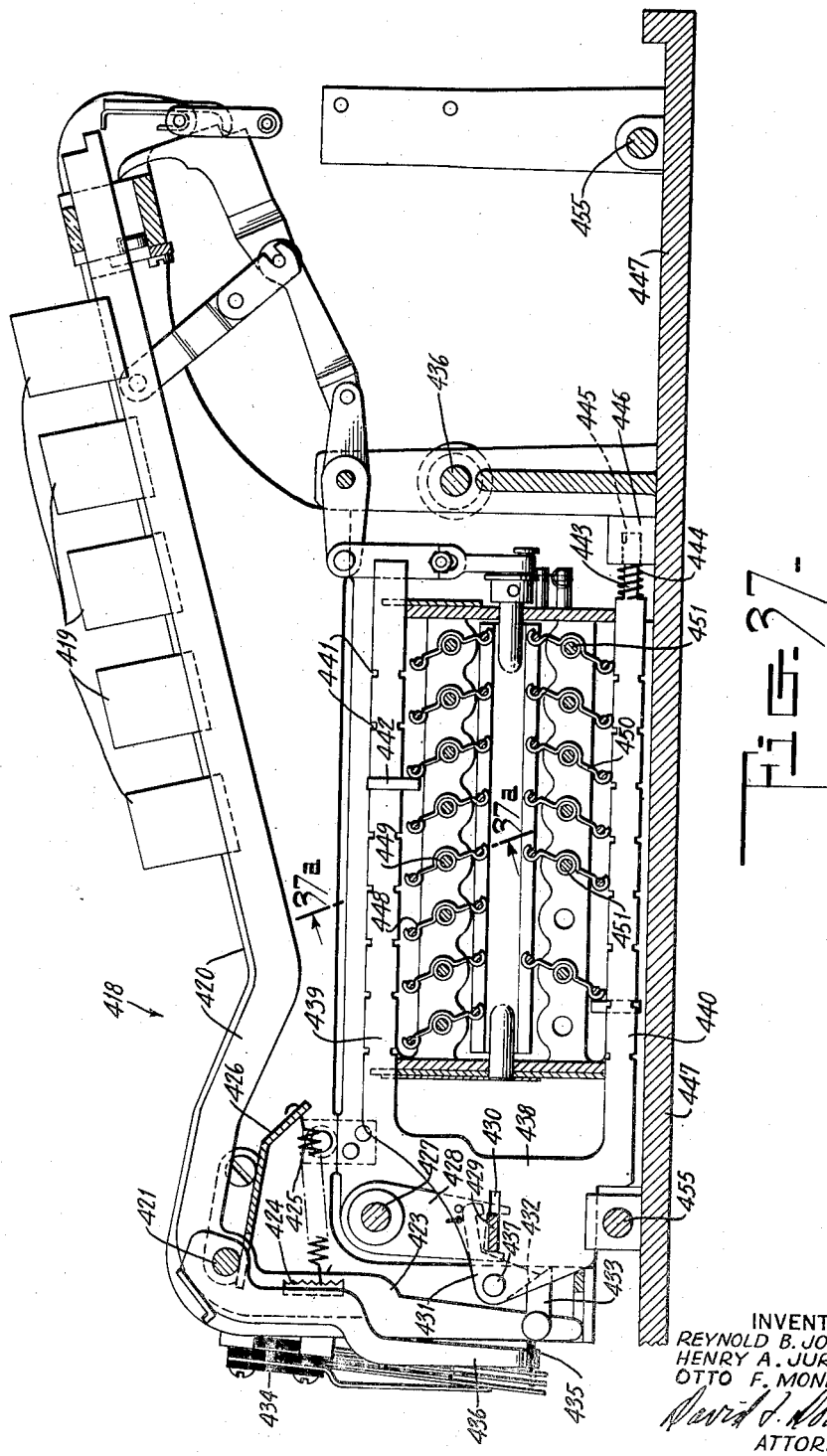

July 27, 1954
R. B. JOHNSON ET AL
2,684,719
STORAGE KEY PUNCH
Filed Aug. 19, 1950
49 Sheets-Sheet 41
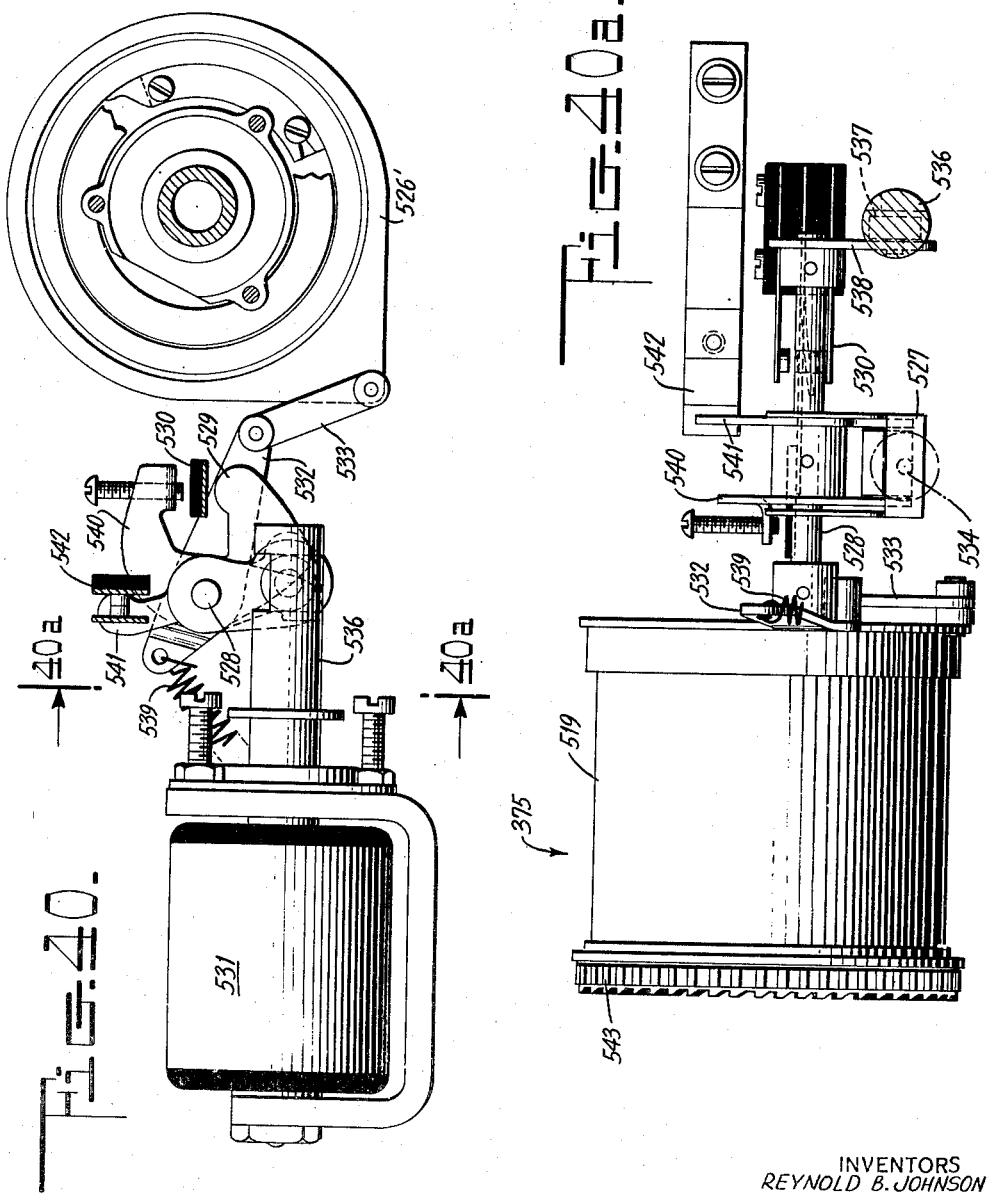
INVENTORS
REYNOLD B. JOHNSON
HENRY A. JURGENS
OTTO F. MONEAGLE
ATTORNEY July 27, 1954  R. B. JOHNSON ET AL  2,684,719
STORAGE KEY PUNCH
Filed Aug. 19, 1950  49 Sheets-Sheet 42

Fig. 41

INVENTORS
REYNOLD B. JOHNSON
HENRY A. JURGENS
OTTO F. MONEAGLE
ATTORNEY

July 27, 1954

R. B. JOHNSON ET AL 2,684,719

STORAGE KEY PUNCH

Filed Aug. 19, 1950

INVENTORS
REYNOLD B. JOHNSON
HENRY A. JURGENS
OTTO F. MONEAGLE

ATTORNEY

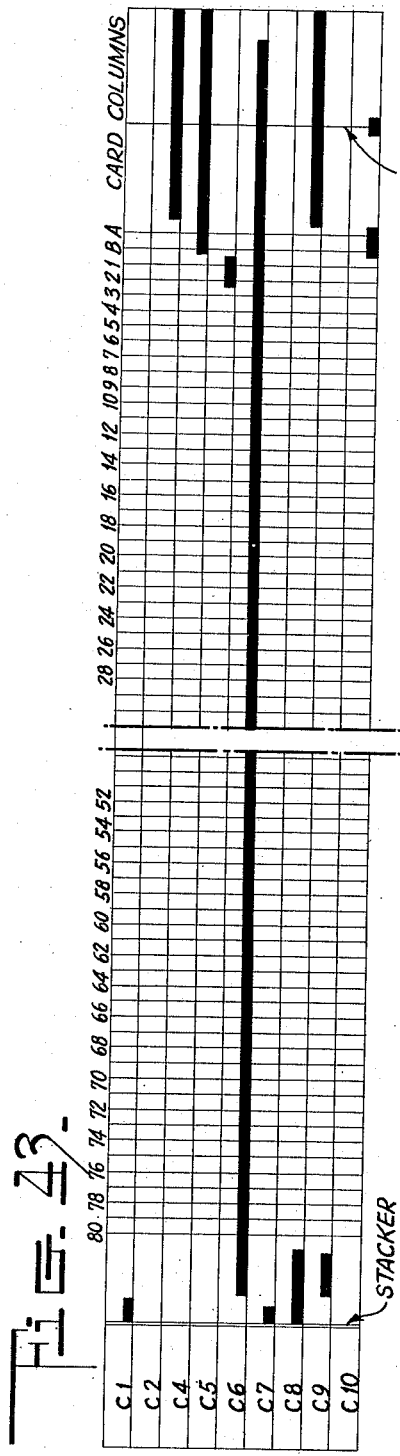
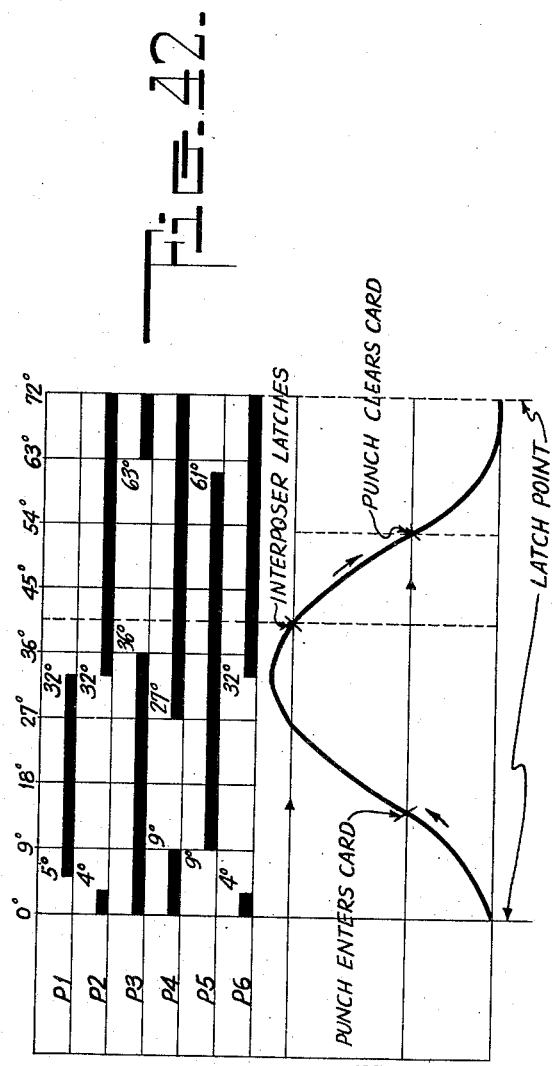

INVENTORS
REYNOLD B. JOHNSON
HENRY A. JURGENS
OTTO F. MONEAGLE
ATTORNEY

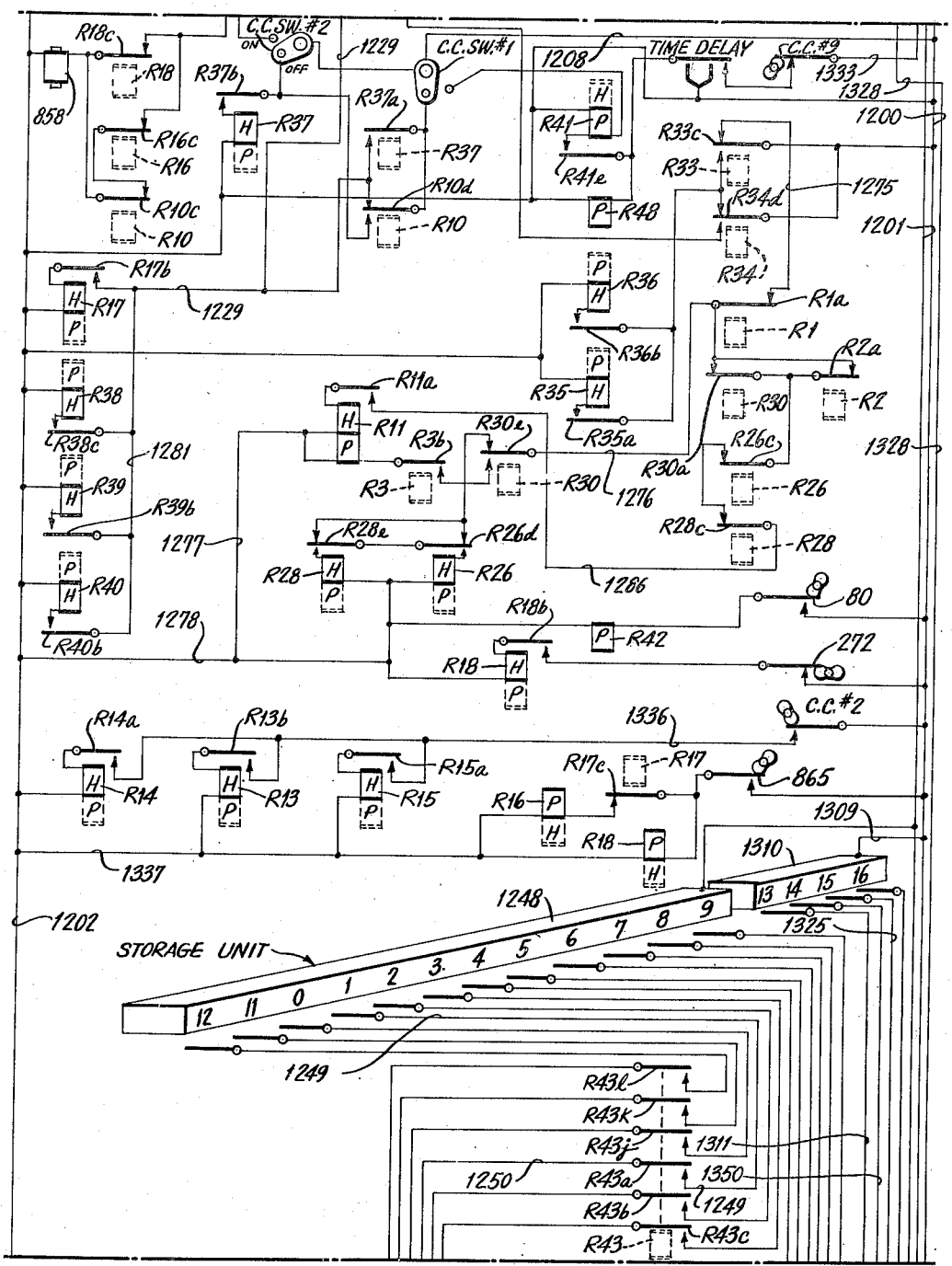

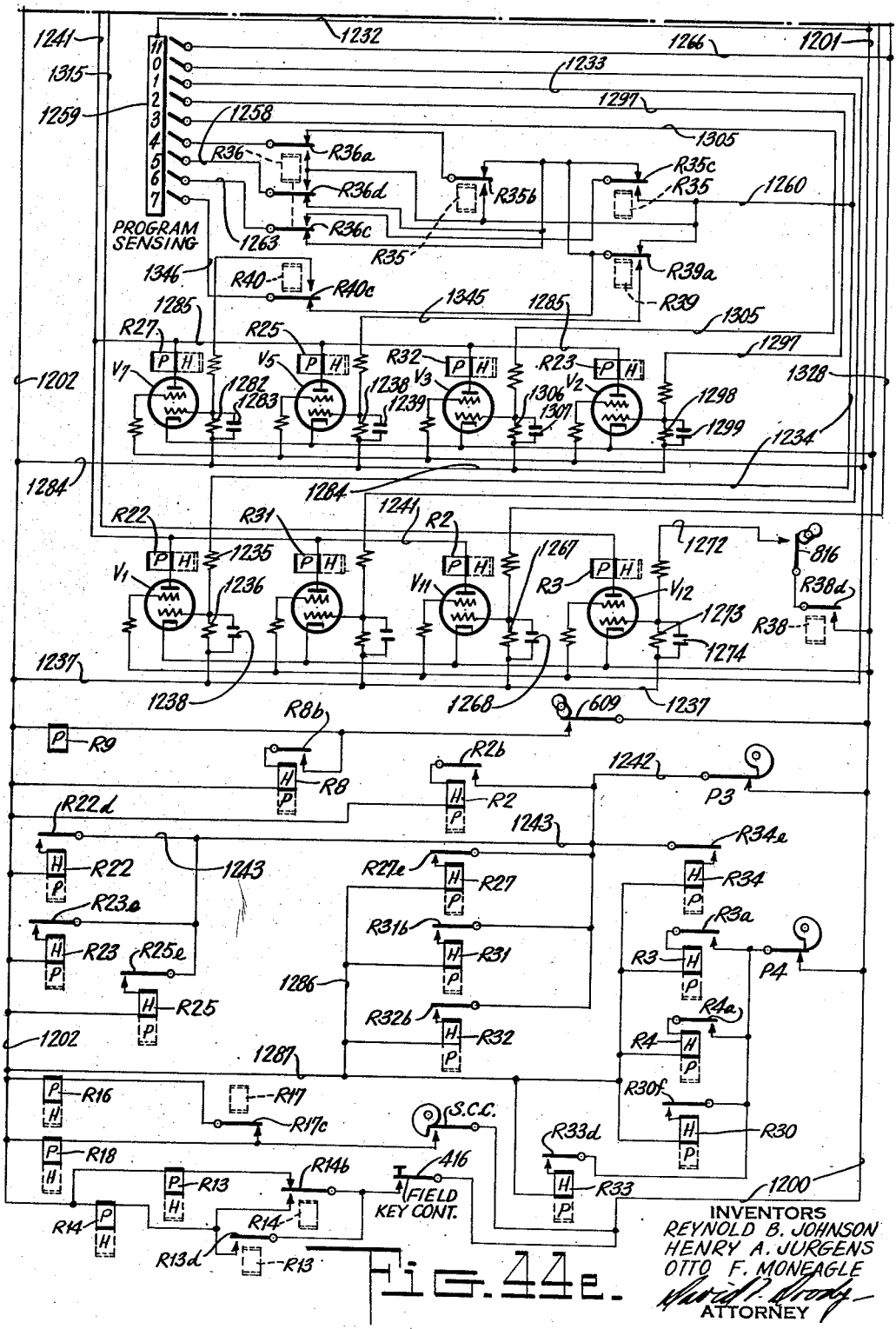

Patented July 27, 1954

2,684,719

UNITED STATES PATENT OFFICE 2,684,719

STORAGE KEY PUNCH

Reynold B. Johnson, Binghamton, Henry A. Jurgens, Vestal, and Otto F. Moneagle, Endicott, N. Y., assignors to International Business Machines Corporation, New York, N. Y., a corporation of New York Application August 19, 1950, Serial No. 180,369

34 Claims. (Cl. 164—113)

This invention relates to data recording business machines and more particularly to key operated card punch machines having provision for the storage of data prior to the transfer of such data to cards.

It is an object of the present invention to provide a novel mechanism for storing data from one source, sensing data from other sources, and making a unitary record of such data.

It is a further object of the present invention to provide a novel card sensing and card punching mechanism and sequence whereby data entry may be made at high speeds.

Another object of the invention resides in the provision of a novel card feeding and aligning mechanism as part of the machine for recording data.

A further object of the invention is in the provision of a quick-releasable union between the numerical and alphabetical keyboards of a card-punch machine.

Still another object of the present invention is the provision of a novel card carriage for securing and advancing several separate data cards simultaneously for the recording of data.

A further object of the present invention is the provision of unique electrical circuits for operating the device of the present invention.

Other objects of the present invention will be made clear from a study of the following description, together with the attached drawings, throughout which like numerals designate like parts.

Fig. 1 is a plan view of a complete machine of the present invention.

Fig. 1a is a chart listing the functions of certain keys of the numerical keyboard.

Fig. 2 is a plan view of the card feed hopper and the detail card alignment mechanism.

Figs. 2a and 2b are plan views of a portion of the detail card aligner mechanism.

Figs. 2c, 2d, 2e and 2f are fragmentary representations of aligner fingers shown in Figs. 2a and 2b.

Fig. 3 is a plan view, partly in section, of the forward and reverse carriage drives and the code card feed drive.

Fig. 4 is an elevational view, partly in section, of the card stackers, the carriage contacts, and the skip-stop brush.

Fig. 5 is a rear elevational view, with parts broken away, showing a part of the card feed mechanism, the detail card alignment switches and magnets.

Fig. 6 is a rear elevational view, with parts broken away, showing drive mechanisms, punch cam mechanism and carriage detail.

Fig. 7 is a plan view, with parts broken away, of the drive motor and the card stacker.

Fig. 14 is a cross-sectional view of the card stacker mechanism taken along the lines 14—14 of Figs. 1, 4, 7 and 10.

Fig. 15 is a cross-sectional view of the gear box showing the punch clutch and forward and reverse drive clutch taken along the line 15—15 of Fig. 6 as viewed from the plane 6—6 of Fig. 14.

Fig. 15a is a detail, partly in section, of the forward and reverse drive carriage clutch.

Fig. 15b is a schematic showing of the gear train between the motor and the card feed, card stacker, punch clutch, carriage clutches and the code card feed.

Fig. 16 is a cross-sectional view of the card punching mechanism and the punch and escapement cam shaft taken along the line 16—16 of Figs. 1 and 3.

Fig. 16a is a longitudinal sectional view of the card punching mechanism taken along the line 16a—16a of Fig. 16.

Fig. 16b is a longitudinal sectional view of the punching mechanism taken along the line 16b—16b of Fig. 16a.

Fig. 16c is a longitudinal sectional detail of the card punch magnets.

Fig. 17 is a plan view, partly in section, of the detail and code card stacker unit.

Fig. 17a is a cross-sectional view of the card stacker taken along the line 17a—17a of Fig. 17.

Figure 8:
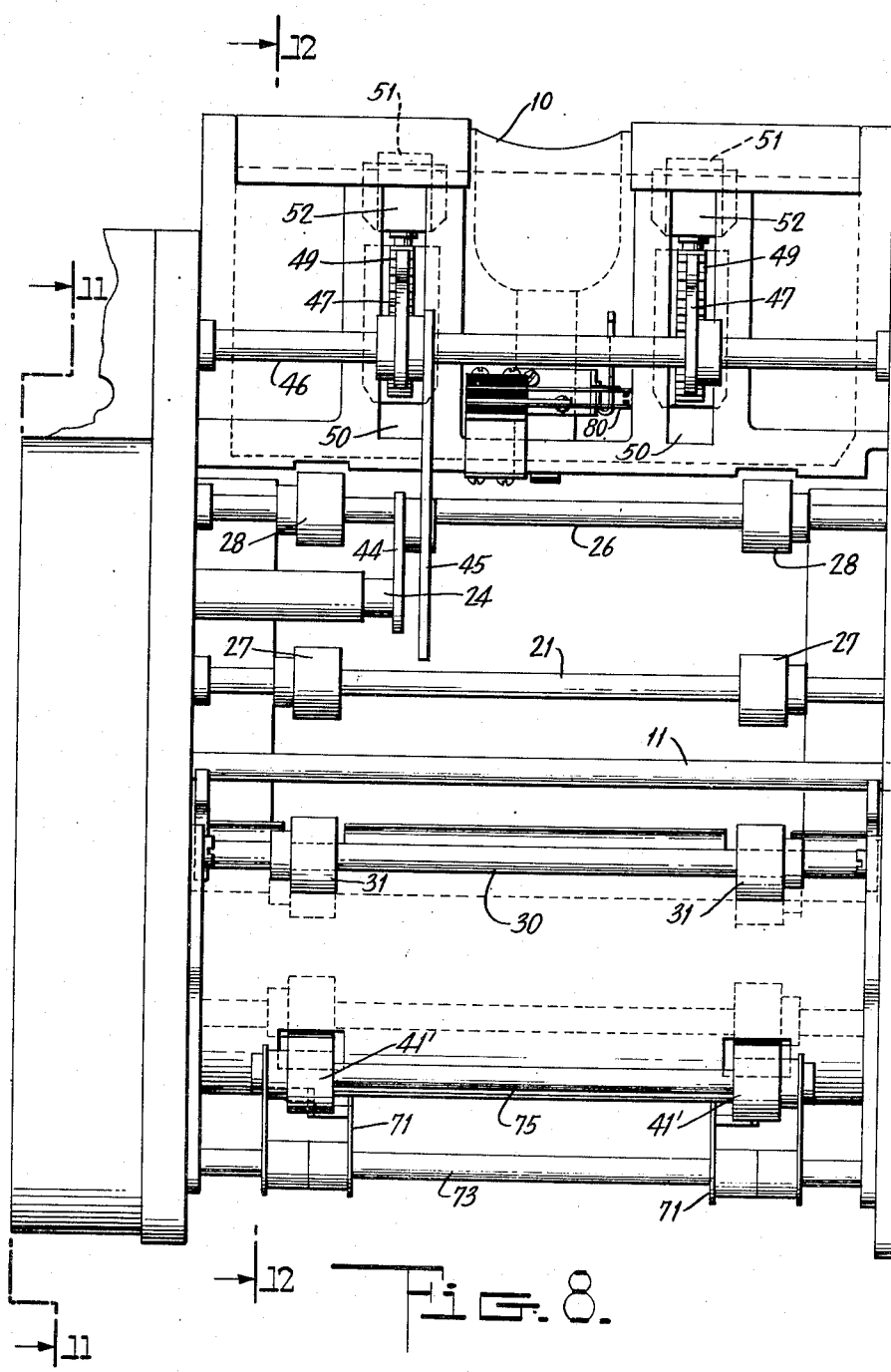
Fig. 8 is a plan view of the card feed section, projected from below, showing the feed roll shafts.
Figure 9:
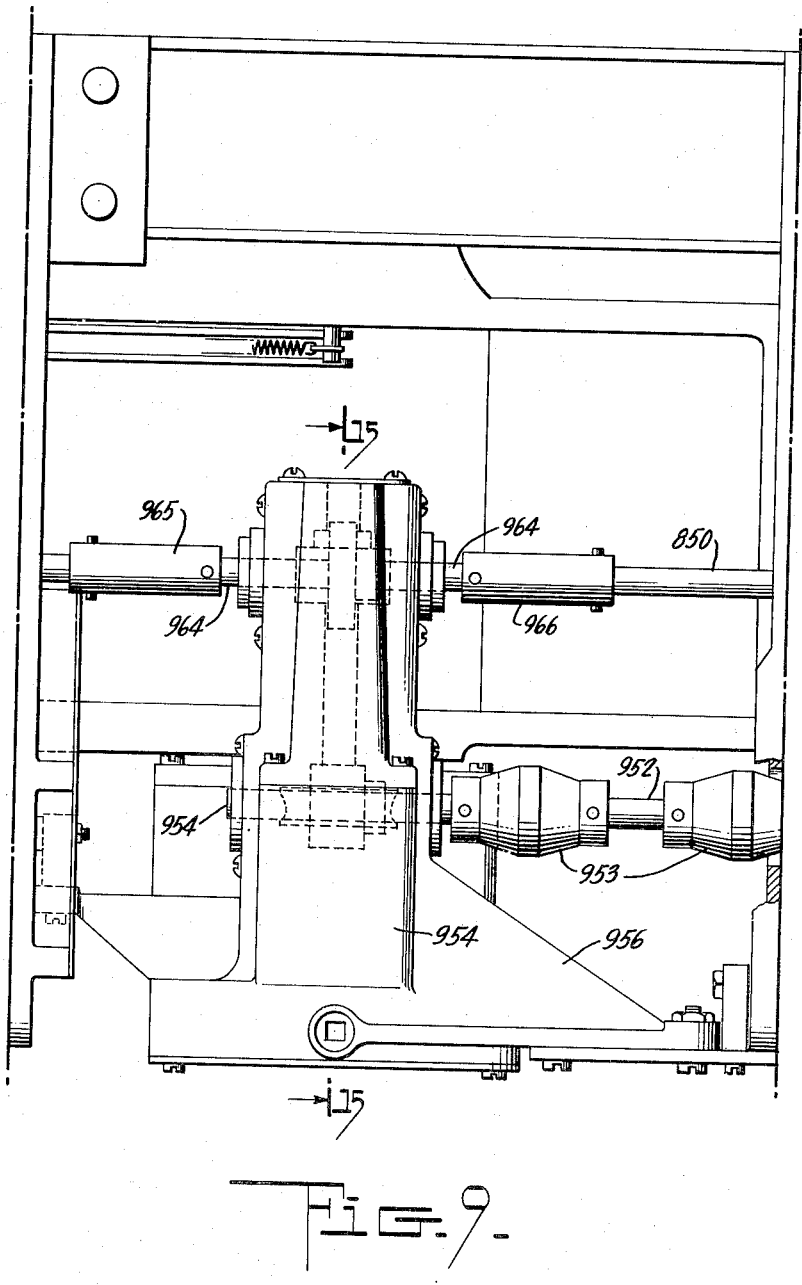
Fig. 9 is a plan view of the main drive and gear housing assembly projected from below.

Figs. 18 and 18b, when joined along the lines a—a form an elevational view of the card carriage.

Figs. 18a and 18c, when overlapped along the lines b—b form a plan view of the card carriage.

Figs. 19 and 19a, when joined along the lines c—c form a rear elevational view of the card carriage mounted to show details of the carriage escapement.

Fig. 19b is a detail of the leading edge of the carriage showing the card releasing mechanism.

Fig. 19c is a plan view of the carriage escapement control mechanism shown in elevation in Fig. 19.

Fig. 19d is a detail, some parts being shown in section, of the release magnet assembly.

Figs. 20 and 21 are cross-sectional views of the carriage taken along the lines 20—20 and 21—21, respectively, of Figs. 19 and 19a.

Fig. 22 is an end elevational view of the carriage, showing cards in place, as viewed from the plane 22—22 of Fig. 19a.

Fig. 23 is a plan view of the leading half of the carriage projected from below.

Fig. 24 is an elevational view of the code card feeding mechanism.

Fig. 24a is a plan view of a detail of the code card feeding mechanism taken along the line 24a—24a of Fig. 24.

Fig. 24b is a detail showing of a part of the code card feeding mechanism.

Fig. 25 is a cross-sectional view of the code card feeding mechanism taken along the line 25—25 of Fig. 24.

Fig. 26 is a cross-sectional detail of the gang card and code card sensing station.

Fig. 27 is a plan sectional view of the numerical keyboard and storage unit taken along the line 27—27 of Figs. 28 and 29.

Fig. 28 is an end view of the numerical keyboard and storage unit, cover removed, taken from the plane 28—28 of Fig. 27.

Fig. 29 is a cross-sectional view of the numerical keyboard taken along the line 29—29 of Fig. 27.

Fig. 30 is a longitudinal sectional view of the storage unit taken along the line 30—30 of Fig. 27.

Figs. 30a, 30b and 30c are cross-sectional views of the storage unit taken along the lines 30a—30a, 30b—30b, and 30c—30c, respectively of Fig. 30.

Fig. 31 is a cross-sectional view of the storage unit taken along the lines 31—31 of Fig. 30.

Figs. 31a, 31b and 31c are cross-sectional details of the read-in mechanism of the storage unit taken along the line 31—31 of Fig. 30 showing different operative conditions of the mechanism.

Fig. 32 is an end elevational view of the numerical keyboard, cover removed, as viewed from the plane 32—32 of Figs. 27 and 36.

Fig. 33 is a cross-sectional view of a detail of the storage unit, taken along the line 33—33 of Fig. 30c.

Fig. 34 is a cross-sectional view of the numerical keyboard and storage unit taken along the line 34—34 of Fig. 35.

Fig. 34a is an enlarged showing in elevation of the keyboard bail solenoid for the numerical and alphabetical keyboards.

Fig. 34b is a cross-sectional detail of the key operated switch and bail lever as shown in Fig. 34.

Fig. 35 is a plan view of the numerical keyboard taken from the plane 35—35 of Fig. 29.

Fig. 36 is a fragmentary plan view showing the union of the numerical and alphabetical keyboards, the keys being omitted for clarity.

Fig. 27 is a cross-sectional view of the alphabetical keyboard taken along the line 37—37 of Fig. 36.

Fig. 37a is a detail showing of the junction between the alphabetical and numerical bails as viewed from the plane 37a—37a of Fig. 37.

Fig. 38 is a longitudinal sectional detail of the storage drum shown in Fig. 30.

Fig. 39 is a detail in plan taken along the plane 39—39 of Fig. 33, showing the storage drum escapement.

Fig. 40 is an end elevational view of the storage read-in solenoid and linkage.

Fig. 40a is a view, partly in section, of the storage unit and read-in control contacts taken along the line 40a—40a of Fig. 40.

Figs. 41 and 41a are showings of two card groups for illustrating a typical operation of the electrical circuits of the machine.

Fig. 42 is a timing chart showing the operation of the punch contacts with respect to the punching cycle.

Fig. 43 is a chart showing the timing of the carriage contacts.

Figs. 44a through 44e set forth the schematic diagram of the electric circuits of the apparatus, when arranged alphabetically and end to end.

The novel data recording machine of the present invention comprises mechanisms and circuits for performing the following functions:

Detail card feeding.
Detail card alignment.
Card carrying.
Code card feed and alignment.
Data keying.
Data storage.
Carriage escapement and card punching.
Card sensing.
Card stacking, separate and collated.
Machine driving.
Operation of electrical circuits.

In the performance of these functions the machine of the present invention utilizes skip mechanisms controlled indirectly by the keyboard operator, or by signals sensed from the program card. The card sensing mechanism is of the type shown and described in the co-pending application of R. B. Johnson, Serial No. 768,559 filed August 14, 1947, now Patent No. 2,490,360 granted December 6, 1949. The card punch mechanism is of the type shown and described in the co-pending application of R. B. Johnson, Serial No. 708,163 filed Nov. 6, 1946, now Patent No. 2,524,127 granted October 3, 1950.

The detail data are recorded on cards under control of numerical and alphabetical keyboards mechanically interconnected. The data storage unit is an improved device of the type shown and described in the co-pending application of R. B. Johnson et al., Serial No. 17,974 filed March 30, 1948, now Patent No. 2,606,244 granted August 5, 1952. Data are read into the storage unit through the numerical keyboard and are electrically read out by suitable circuit arrangements which will be described later. Data to be recorded on the detail card from the gang and/or code sensing stations are not transmitted through the storage unit, which stores only the keyed-in data.

The machine of the present invention will be described by a full explanation of the mechanisms performing the several functions outlined above and the novel keyboard and circuits by which these mechanisms are initiated, controlled and co-related.

Detail card feeding

The conventional record, that is detail cards fed into the machine from hopper 10 (Figs. 1, 12) will be designated as D. These cards normally are blank, that is, unpunched prior to being fed as hereafter described. Once punched with the keyed-in detail data, they are designated as gang cards G. The program cards will be designated as P and code cards will be designated as C.

A stack of cards D is placed face down, 12-edge forward in the hopper 10, closing the card feed hopper contact 80, Figs. 2 and 8. Drive shaft 11 is continuously driven clockwise, as viewed in Figs. 11 and 12, by the main drive which will be described later. The bottom card D will be fed into the card aligner mechanism 12 (Fig. 12) through a downwardly extending card guide 13, through feed rolls and upwardly in the manner to be described.

Shaft 11 loosely carries a spur gear 14 to which is attached a circular drop cam plate (card feed cam) 15 having a cam surface 53. Pivoted to the cam plate is a dog 16 urged to rotate clockwise by a housed spring 54. Armature 17 of card feed magnet 55 is pivoted at 18 and has an extension 19 for engagement with a projection of dog 16 in the position shown in Fig. 11, keeping dog 16 from engaging with the toothed wheel 20 splined to shaft 11.

Figure 11:
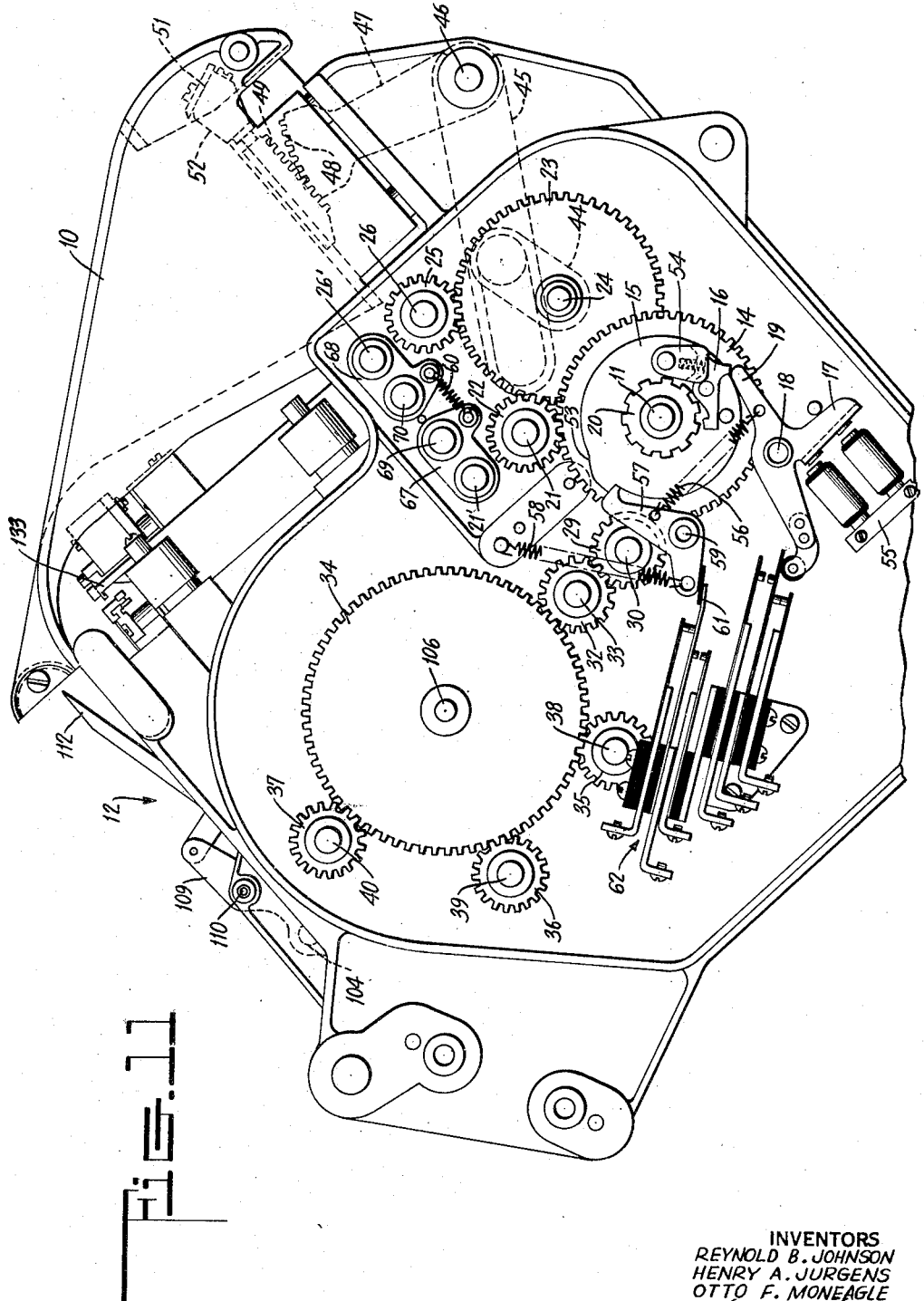
Fig. 11 is a cross-sectional view of the detail card feed mechanism taken along the line 11—11 of Figs. 1, 2, 5 and 8.

With card feed magnet 55 inoperative, armature 17 is biased to the position shown in Fig. 11 by tension spring 56 connected to the keeper pawl 57. Tension spring 58 tends to rotate keeper pawl 57 clockwise about pivot 59 into the position shown. Pawl 57 has a rocker extension bearing upon arm 61 of the card feed cam contacts 62.

Shaft 21 carries a pinion 22 which meshes with gear 14, and in a parallel plane, with spur gear 23 carried by stub shaft 24. A second pinion 25 carried by shaft 26 engages with spur gear 23. Shafts 21 and 26 carry feed rolls 27 and 28 (Fig. 12), respectively. These feed rolls are maintained in contact with similar idler feed rolls 27' and 28' carried on shafts 21' and 26' which are carried on floating links 67 and 68 which are pivoted to stub shafts 69 and 70 fixed to the main frame. Tension spring 60 extends between similar crank extensions on links 67 and 68 and urge feed rolls 27' and 28' into contact with the feed rolls 27 and 28, respectively. The feed rolls 28 and 28' are located at the entrance to guide 13 just below the bottom of the card hopper 10.

Gear 14 (Fig. 11) meshes also with a pinion 29 carried on a shaft 30 which carries feed rolls 31. These rolls are in contact with similar feed rolls 31' which pair of rolls is located at the discharge end of the guide 13.

Figure 12:
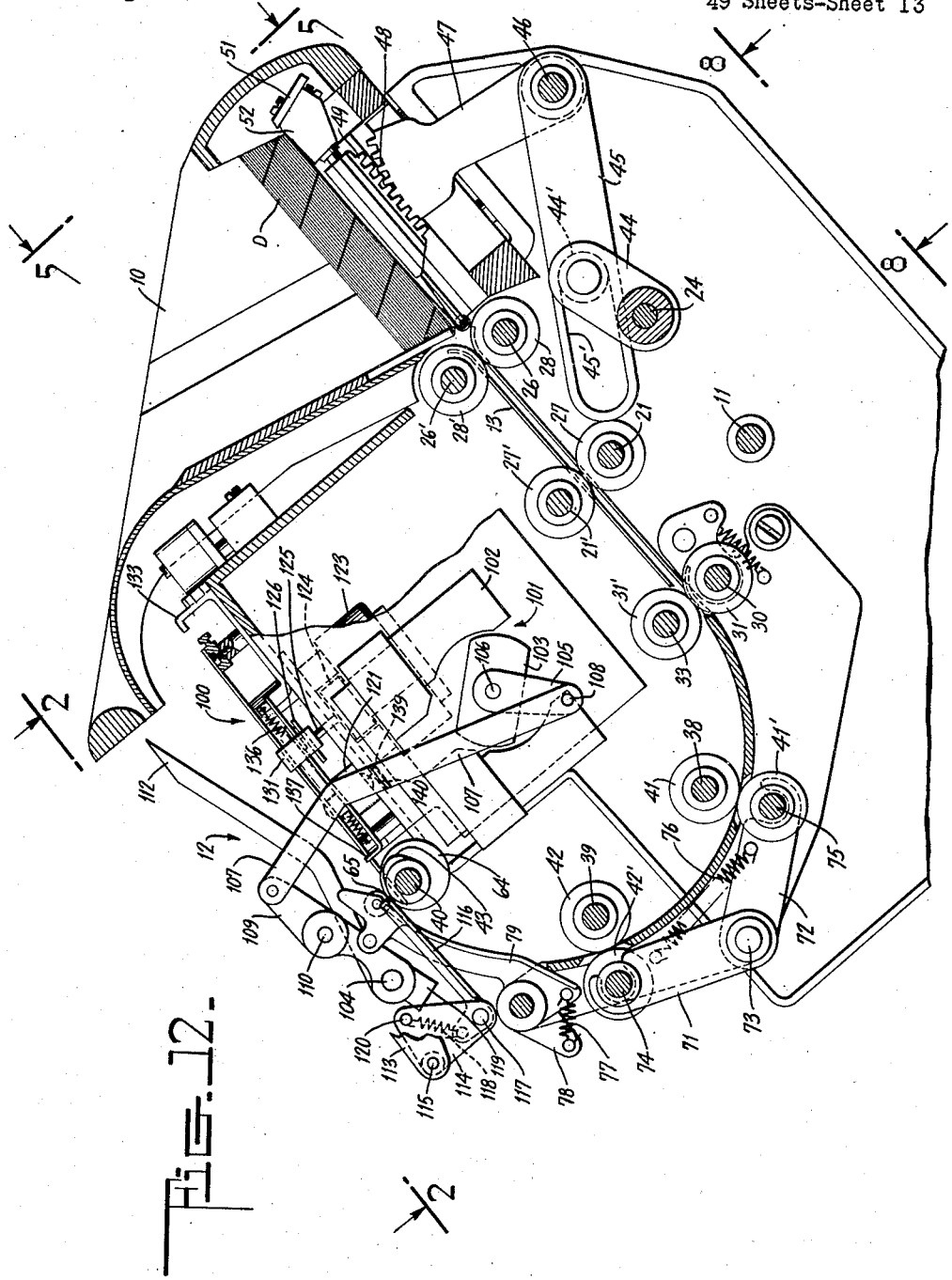
Fig. 12 is a cross-sectional view of the detail card feed mechanism showing part of the aligning mechanism taken along the line 12—12 of Figs. 1, 2 and 9.
Figure 13:
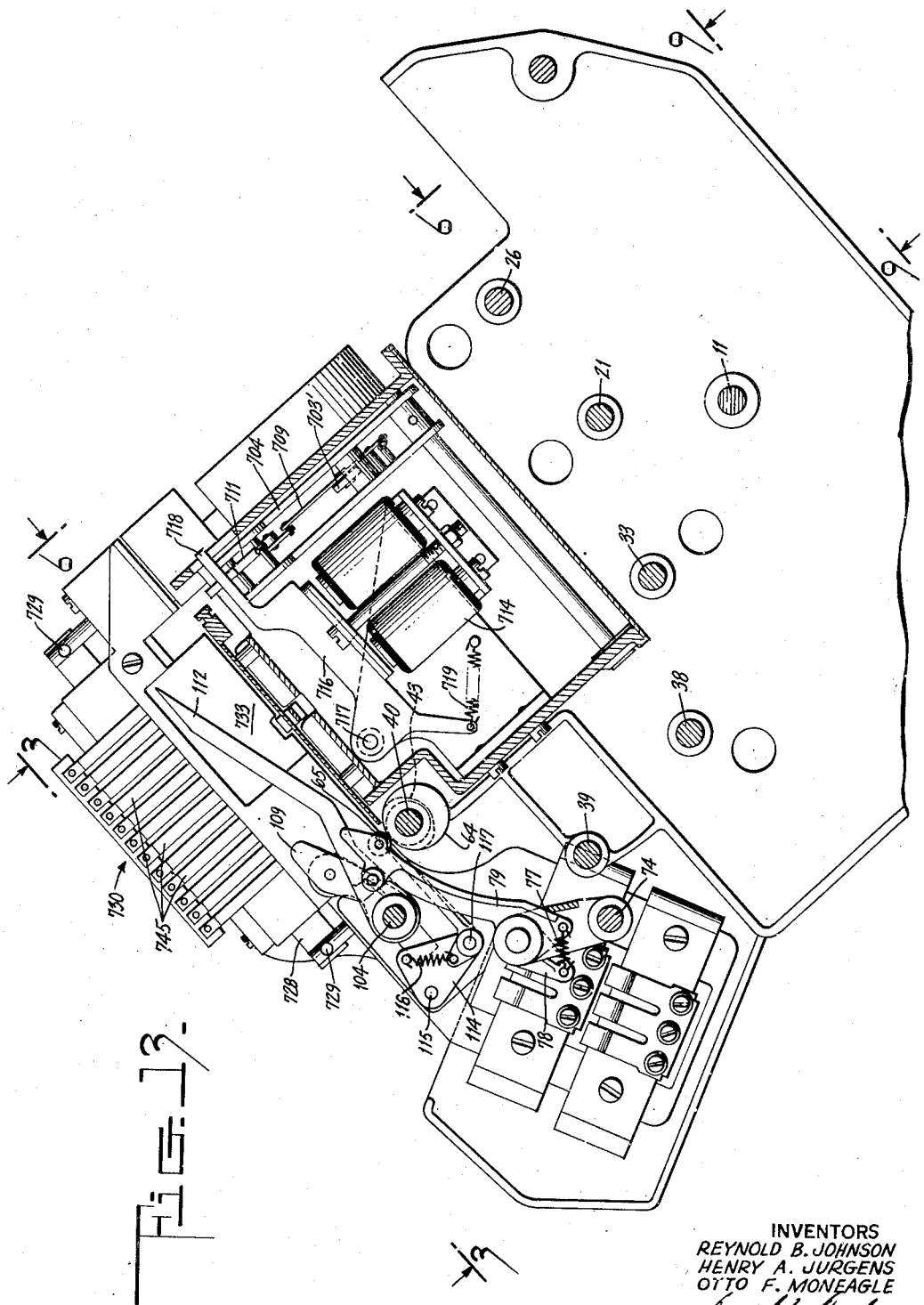
Fig. 13 is a cross-sectional view of the detail card feed unit taken along the line 13—13 of Figs. 1 and 2.

Feed rolls 31' are driven by a reversing pinion 32 carried on shaft 33 and in engagement with a large spur gear 34 (Fig. 11). Spaced around one-half of the circumference of gear 34 are driven pinions 35, 36 and 37, carried respectively on shafts 38, 39 and 40. As shown in Fig. 12, shafts 38 and 39 carry, respectively, feed rolls 41 and 42 which are in contact with similar idler rolls 41' and 42'. These latter idler rolls are maintained in resilient contact with their corresponding rolls 41 and 42 by means of links 71 and 72, which are commonly pivoted to a stub shaft 73 fixed to the main frame, and which carry respectively shafts 74 and 75 of the idler rolls 42' and 41'. The links are urged together by means of helical spring 76 causing the idler rolls 41' and 42' to be maintained in resilient engagement with their corresponding rolls 41 and 42.

Shaft 40 carries eccentric feed rolls 64 and a pair of cam members 43, the function of which will be set forth later. Idler rolls 65 are springpressed into engagement with rolls 64, by means of tension springs 77 engaged between fixed brackets 78 and extensions of oscillating arms 79 which carry idler rolls 65 between their outer extremities.

A crank arm 44 is fixed to shaft 24 and has a pin member 44' engaging with the slot 45' of rocker arm 45 which in turn is rigidly fixed to rock shaft 46 carrying a pair of arms 47 terminating in gear sectors 48 engageable with racks 49. Racks 49 are reciprocable in parallel slots 50 (Fig. 8) and carry feed knives 51 mounted to racks 49 by head members 52.

The gear trains above described are inoperative as long as dog 16 remains out of engagement with the toothed wheel 20.

In a card feeding cycle, card feed magnet 55 is energized, disengaging armature extension 19 from dog 16 so that card feed cam 15 and spur gear 14 are driven by shaft 11 through engagement between dog 16 and toothed wheel 20. Consequent rotation of the gear train and linkage described causes feed knives 51 to be actuated downwardly, carrying bottom card D from hopper 10 into engagement with feed rolls 28 and 28'. The card then is carried forward by feed rolls 27 and 27', 31 and 31', 41 and 41', 42 and 42', and at the end of three cycles the card D is fed past rolls 64 into the aligner bed and is loosely resting against feed rolls 64 and 65.

Detail card alignment

The detail card aligning mechanism is shown principally in Figs. 2, 2a, 2b, 2c, 2d, 2e, 2f, 5, 12 and 13. The aligning mechanism accomplishes two main purposes. It "semi-positions" the card in alignment and it flattens the card in the aligner bed and centers it in coordinate directions about a virtual card center position, after which the card carriage mechanism properly attaches to the card, freeing the alignment mechanism of further functioning for that card.

Detail card alignment is initiated only when the carriage is in the card stacker position at the end of its forward travel.

The card D to be aligned is fed, in the manner described past eccentric feed rolls 64 into the aligned bed 100. The eccentric rise on rolls 64 lifts the card so that it enters the aligner section spaced outwardly from the bed plate 100 by about one-quarter of an inch, thus preventing the card from being fed under a card that has not as yet completely left the aligner bed.

A flipper magnet motor 101 comprising an electromagnetic field winding 102 and a rotor 103 actuates a rock shaft 104 clockwise (Fig. 12) through the following linkage:

Crank arm 105 is keyed to armature shaft 106 and pivoted to link 107 by pin 108. The other end of link 107 is pivotally joined to rocker arm 109 which is pivoted about a stud at 110.

Shaft 104 keyed to rocker arm 109 has rigidly mounted thereon four flipper arms 112 which are poised above the bed plate 100 as shown in Fig. 12 when not in operation. Arms 113 fixed to the machine housing carry the triangular plates 114 pivoted at 115. These plates carry pusher arms 116 pivoted at 117 and tensioned to lie against cams 43 by springs 118. Rocker arms 109 have extensions 119 which engage pins 120 in operation. As will be explained later, when the carriage is in the stacker position, a circuit is closed to energize the flipper motor 101, causing rotor 103 to turn and move shaft 104 and flipper arms 112 clockwise against the aligner bed 100 to flatten the card D in the aligner bed. Flipper arms flatten out the card but do not press against it, so that the alignment mechanism can orient the card with the flipper arms contacting the outer face of the card. When flipper arms 112 move clockwise, extensions 119 butt against pins 120, rotating plates 114 counterclockwise about pivot 115 causing pusher arms 116 to be translated upwardly so that they push the bottom or 9-edge of a card D above the bottom aligning fingers 137 in the aligner bed 100.

An Acro snap switch 121 mounted beneath aligner bed 100 has a bifurcated button 122 projecting above the plane of bed 100 arranged so that one of flipper arms 112 passes between the bifurcations, and with no card in the aligner bed does not actuate the switch. When a card is in the aligner bed, however, the flipper arm cannot pass between the bifurcations and the switch 121 is therefore depressed, and snaps to a position below the aligner bed 100, causing the contacts to transfer for a purpose to be described later.

Switch 121 has a lower button 139 (Fig. 12) which is operable by a bracket 140 extending inwardly from link 107. Engagement of button 139 by bracket 140 restores the switch 121 to normal.

The aligner motor includes an electromagnetic stator 123 and a magnet rotor 124 which has a shaft 125 projecting toward, but not through, the aligner bed and keyed to plate 126 and extending through the center point of a loose link 127 which is attached to laterally extending arms 128 biased to move inwardly by tension spring 129 connected therebetween.

Plate 126 has a stud 130 projecting into the plane of link 127 to limit the inward motion of arms 128. When actuated, armature or rotor 124 will rotate plate 126 and stud 130 clockwise (Fig. 2) permitting further inward motion of arms 128 which have right-angle fingers 131 at their outer extremities which project through the aligner bed and engage the side edges of a card D to be aligned. Plate 126 is tensioned to the position shown in Fig. 2 by means of spring 144.

Each of the arms 128 carries a stud 132 intermediate its ends and generally in line with each of the cross-arm link pairs 133 and 134. Elements 133 and 134 of each pair are connected by means of similar loose links 135 pivoted at 135' and biased inwardly by tension spring 136. These loose links have depending lugs engaging studs 132 on arms 128, limiting the inward travel of arms 133 and 134.

Arms 133 have right-angle fingers 137 at their outer extremities which are intended to engage the bottom or 9-edge of a card to be aligned. The outer extremities of arms 134 butt (when arms 134 are brought inwardly) against the top of spring-biased shoes 138 normally urged upwardly. These shoes mounted in the card carriage, contact the upper or 12-edge of the card to be aligned.

As shown most clearly in Figs. 2c and 2d, the left-hand finger 131 is mounted to arm 128 by a spring link 141 which maintains finger 131 below the surface of the aligner bed 100 as shown in Fig. 2d.

When the arm 128 is retracted, however, in the aligning operation, finger 131 rides up on a cam abutment 142 carried by the main frame forcing the finger 131 through an aperture in the aligner bed so that it projects above the surface of the card in the bed 100.

When the card D is in the aligner bed with flipper arms 112 in actuated position, but prior to being aligned, the carriage which has been at the stacker position can be returned to the aligner position, closing the circuit of the aligner motor and driving rotor 124 and shaft 125 clockwise (Fig. 2), thus driving plate 126 clockwise against the tension of spring 144 and permitting arms 128 to be drawn inwardly by the action of spring 129 until the fingers 131 have laterally positioned the side edges of card D about its virtual center. Meanwhile, inward motion of arms 128 and studs 132 carried thereon permits loose links 135 to rotate by virtue of the springs 136, thus bringing fingers 137 upwardly carrying the bottom edge of card D therein. Simultaneously arms 134, moving downwardly urge shoes 138 downwardly against the top or 12-edge of card D, so that it is positioned about a virtual center, midway between fingers 137 and shoes 138, and thus aligning the card D within the carriage. Arms 128 are stopped in their inward travel by contact of the card edges by fingers 131.

As shown best in Figs. 2a and 2b, an aligner open Acro switch 143 is carried by the main frame. Any inward motion of arm 134 will allow aligner open contact 143 to transfer.

Card carrying

The novel card carriage of the present invention is shown principally in Figs. 18 through 23, most of the showings being of carriage detail. Figs. 5, 6 and 7 jointly show the carriage in position in the machine. The carriage is designed to carry one or more of the following cards simultaneously: The detail card D, a gang card G (card D after it is punched), a code card C and a program card P.

Figs. 18 and 18b, when joined together, represent a front view of the complete carriage which is in two sections. The right hand section 200, carries the detail card D. The left hand section 201, carries the gang card G, the code card C and the program card P. Sections 200 and 201 are joined together by the drive rack 202 commonly mounted to the two sections, and are normally driven step by step through the escapement during punching operations and may also be driven freely by pinion 203 through the forward and reverse drive clutch.

Section 200 has a longitudinally extending card slot or track 205 throughout its length which is aligned with a similar card slot or track 205' in section 201. Section 200 also carries mounted on its back side an escapement rack 206 which parallels drive rack 202 but does not extend into section 201.

Section 200 has two apertures 207 in which are positioned shoe members 208 having planar bottom surfaces for engagement with card D in slot 205 and upper cam surfaces 209 upon which ride cam followers 210 which are journaled in a reciprocable U-shaped link 211 extending longitudinally of the carriage section 200 and connected to coupling link 204 through screw stud 212. A corresponding screw stud 212' connects coupling link 204 to carriage section 201 as shown in Fig. 19a.

Fig. 20 is a cross-sectional detail of the carriage showing the manner of mounting a shoe 208 in aperture 207. A right-angle leaf spring 213 is riveted to the top of shoe 208 and fastened to carriage section 200 by screw studs 214. Spring 213 normally holds shoe 208 upwardly so that a card D may freely pass along the card slot 205 but when link 211 is drawn to the left (Figs. 18 and 18b), roller cam followers 210 ride up the cam surface 209 and force shoe 208 downwardly to grip card D firmly in the card slot. A sheet metal cover 215 maintains link 211 and roller cam followers 210 in position and is fastened to section 200 by one or more screw studs 216. U-shaped link 211 also has mounted thereon a rectangular stop member 217 which engages with a latch member 218 pivoted to section 200 by means of a stud 219. A leaf spring 243 urges latch 218 upwards into engagement with stop member 217. The purpose of this latching arrangement will be set forth later.

Section 201 has a coverplate 220 enclosing a longitudinally extending U-shaped link 221 joined to coupling link 204 at one end and terminating at its other end in an exposed pusher bar 222. Apertures 223 and 224 expose shoes 225 having planar bottom faces for engagement with cards (in the respective slots 205' and 226) and cam upper faces 227. The cross-sectional detail of Fig. 21 shows one pair of shoes 225 carried on one spring 242, in aperture 223, mounted to section 201 and one shoe 225 in aperture 224 is carried on spring 228 mounted on section 201. As viewed in Fig. 21 the right-hand shoe in aperture 223 bears against the edge of gang card G, being held down by roller cam 210 journaled in U-shaped link 221 paralleling link 221' and being spaced therefrom and mounted to a common spacer block 229 so that both links move as a unit.

The left-hand shoe 225 (Fig. 21) bears, not against a card, but against a pusher rod 230 which extends downwardly into aperture 224 and seats against the top of shoe 225 therein. This latter shoe bears against the code card C in card slot 226. Fig. 18 shows that two such pusher rods are in contact with each of the shoes 225 in apertures 224. The cam faces 227 on these two shoes serve no camming function.

Carriage section 201 also has a depending integral portion to which is attached a card mount 231 extending at right angles thereto (Fig. 21). Carriage sections 200 and 201 are guided in the machine proper by an upper H-section rail 232 which is rigidly attached to the main casting of the machine and the depending portion of section 201 is guided in a track 233 fixed to the main casting and extending for only a portion of the length of the complete carriage, whereas rail 232 extends throughout the length of sections 200 and 201. The depending portion of carriage section 201 has mounted thereon a roller member 262 which rides in track 233.

Card mount 231 extends rearwardly of the carriage section 201 and has a program card receiving slot designed by a fixed jaw 234 and a movable jaw 235 which is constrained to move parallel to jaw 234 by guide pins 236 driven into jaw 234 and having sliding engagement in holes formed in jaw 235 (Fig. 23). Holes in jaw 235 contain helical springs 240 which bear upon the heads of pins 236 at each end of jaw 235 urging jaw 235 toward jaw 234. Cam opener 237 (Fig. 18a) pivoted to the jaw 235 at 238 has a handle 239 which, when manually raised, separates jaws 234 and 235, permitting manual insertion of a program card P. When handle 239 is returned to the position shown in Fig. 18a the card P is firmly held between the jaws by the action of the helical springs 240. Program card P is aligned for depth within jaws 234 and 235 by ears 241 (Fig. 18a) integral with jaw 234. Program card P is laterally aligned against aligning shoulders 263 formed in the fixed jaw member 234.

When pusher bar 222 of U-shaped link 221 is forced to the right (Fig. 18) rollers 210 will descend cam surface 227 of shoes 225, thus releasing the grip with which shoes 225 hold the code and gang cards.

At the same time this motion is transmitted to U-shaped link 211 thus releasing the grip with which shoes 208 hold the detail card D.

Block 217 carried by U-shaped link 211 will be advanced sufficiently to the right as shown in Fig. 18b to permit the latch 218 to be engaged therewith holding the links 221 and 211 in this position against the action of spring 265.

As will be shown later, this occurs when the carriage is in the stacker position. When released the cards should drop from the carriage into the stacker, but positive "kicker means" is provided to eject the cards at that point. A sliding link 245 terminating in a right angle face 246 (Figs. 18, 18a, 23) is tensioned by spring 247 to keep link 245 in the position shown in Fig. 23. Two kicker arms 248 pivoted about centers 249 are loosely pivoted to link 245 at 250. Kickers 248 are mounted so as to project into the slot 226 for carrying code card C.

Another link 251 having an end face 252 (Fig. 18a) and tensioned by spring 253, has pivoted thereto at 254 kicker arms 255 which rock about points 256 on the carriage frame. These kicker arms project into the gang card slot 205'.

At the stacker position, the main frame of the machine has mounted therein abutments 257 and 258 (Fig. 4) which are aligned to contact, respectively, faces 246 and 252 of links 245 and 251. Abutments 257 and 258 are made resilient by compression springs 259 and 260. The purpose of these abutments and the operation of the kickers will be set forth later.

U-shaped link 221 carries an upstanding lug 264 which projects through a slot in the coverplate 220 and to this lug is anchored one end of a tension spring 265 which is anchored at its other end to a bracket 266 fixed to the coverplate 220. This spring tensions links 221 and 211 into the position shown in Figs. 18 and 18b.

With the carriage in the align position, the aligner rotor 124 is energized to move clockwise as shown in Figs. 2 and 5, causing a link 267 to be moved downwardly. Link 267 is pivoted to a crank arm 269 connected to a shaft 270 journaled to the main frame, which shaft has keyed to its forward end an arm 271 which is moved clockwise by the aligner motor to trip latch 218 out of engagement with stop member 217, thus permitting U-shaped links 211 and 221 to be drawn to the left as shown in Figs. 18 and 18b, by the action of spring 265, so that roller cam followers 210 will ride up the respective cam surfaces 209 and 227 of the card engaging shoes 208 and 225, permitting the cards to be again gripped by the carriage. Shaft 270 also carries a camming plate 268. At the end of the clockwise motion of shaft 270, camming plate 268 engages contact of an Acro type aligner closed switch 272 causing it to transfer.

The card carriage operates means for controlling carriage contacts mounted on the main frame of the machine, so that certain circuits that will be fully described later can be made and broken, depending upon the position of the carriage in the machine. Reference to Fig. 43 shows that all of the carriage contacts are transferred toward the end of the travel of the carriage for either the forward or reverse motion. The diagram shown in Fig. 43 will be understood when taken in conjunction with the description of the electrical circuits.

Mechanically, the transfer of the carriage contacts at proper intervals is accomplished by a series of cam plates 273 mounted at each end of section 201 of the carriage, as shown in Fig. 19a. These cam plates are shown also in Figs. 4, 7, 14, 18a, 21 and 22. Cam plates 273 are mounted to the main casting of carriage section 201 by means of brackets 274. The cam plates 273 are carried on posts 275 mounted in brackets 274 and are separated by spacer members 276. Each of the cam plates 273 operates a contact lever 277 (Fig. 4) pivoted to the main frame at 278 and each lever contains a roller cam follower 279 engageable with its cam plate 273. Each contact lever 277 carries a finger of insulating material 280 which has a slot receiving a contact member 281.

Contact levers 277 are maintained in alignment by a comb member 282 mounted to the main frame by studs 283. Contact levers 277 are biased upwardly by leaf springs 284 so that, in the absence of camming action, contact 281 closes against contact 285.

As shown in Fig. 4, roller cam follower 279 bears against the rise of cam plate 273 forcing contact lever 277 downwardly so that contact 281 closes against contact 286.

While the code card is mechanically fed and horizontally aligned as described later under the heading "Code Card Feed and Alignment" the card is horizontally or laterally aligned within slot 226 of carriage section 201 by a mechanism shown in Figs. 18, 19a and 23.

Spring plate 287 is loosely pivoted to the casting of carriage section 201 by studs 288, and as shown in Fig. 18 its bottom edge rests on the top of track 233. Spring plate 287 lies just below the surface of the card C carried in slot 226 and after code card C has been horizontally aligned it rests within slot 226 but may not properly be positioned along the slot.

Track 233 carries an upstanding cam 289 so positioned that as carriage section 201 is being returned to the right (as shown in Fig. 18), that is toward its aligner position, spring plate 287 will ride up on cam 289 pressing against the top surface of card C within the slot 226 and causing it to be carried along with the carriage section 201 with slight spring pressure until the right-hand edge of card C strikes an aligning shoulder 290 which is part of the main frame of the machine and it is at this point that the card C becomes gripped along with the card G in carriage section 201 as has been described.

The end of the carriage which enters the stacker carries means for latching itself in the stacker position and for releasing the latch when the carriage is signaled to return toward the aligner position. Latch member 291 (Figs. 19, 19a and 19b) is pivoted to the carriage casing by means of stud 292 and is urged upwardly into engagement with a notch formed in rail 232 by means of a spring finger 293 secured to the carriage casting. As the carriage approaches the stacker position, latch 291 rides upon the bottom of the rail 232 and as a stacker position is reached, the latch engages with the notch in rail 232 so that the carriage becomes locked in the stacker position.

It has been explained that bar 292 will be moved to the right as shown in Fig. 18 for release and ejection of the gang and code cards after the carriage has been latched in the stacker position. The carriage must be unlatched to permit its movement out of the stacker. As shown in Fig. 19b, pusher bar 222 has mounted thereon a pin 294 which rides between bifurcated arms of a cam member 295 pivoted to the carriage casting by stud 296. When pusher bar is moved to the left, as shown in Fig. 19b, to release the cards, pin 294 rotates cam 295 counterclockwise causing latch 291 to be disengaged from the notch in rail 232 so that the carriage is free to move toward the aligner position upon being signaled.

*Coded card feed and alignment*

The novel code card feed and aligning mechanism of the present invention is shown best in Figs. 3, 6, 24, 24a, 24b and 25. Figs. 3 and 6 show the mechanism in place in the machine proper and the other figures show details of the mechanism apart from the machine.

In Fig. 1, 300 is the aperture through which code cards C are fed into the code card feed and alignment mechanism. Having reference to Fig. 25, 301 represents a longitudinally extending throat into which card C is manually fed with the 12-edge up and toward the operator who would be looking toward the feed as shown in Fig. 24. As the card is advanced into the throat 301 defined by a guide plate 302 and a vertical face of housing 303, it passes between two pairs of rolls, each pair of which includes a rubber faced roll 304 secured to transverse shaft 305 and a smaller idler roll 306 carried on transverse floating shaft 307. This shaft is urged to the left as shown in Fig. 25 by a spring 308. Rolls 304 have a flat section 304' which permits a card to pass into throat 301. A code card can be fed into the code card feed and aligning mechanism only when the carriage is in the stacker position.

A card lever 309, pivoted at 310 and urged clockwise by tension spring 311, has a card contacting surface 312 extending upwardly into the throat 301. Pinned to card lever 309 is an arm 313 engageable with an upwardly turned shoulder 314' of latch 314 which is pivoted about point 315 and tensioned counterclockwise by spring 316. As shown in Fig. 24b, arm 313 has two shoulder sections 325 and 326, and a cam edge 327. Disc 317 is secured to shaft 318 and carries a dog 319 pivoted at 320. Spring 321 carried by disc 317 urges dog 319 into engagement with ratchet 322 carried by and constantly driven by drive shaft 323. The upper surface of disc 317 (Fig. 24) carries an upwardly projecting stud or cam member 324 which is engageable with cam edge 327 during part of the rotation of disc 317 as will be described. Disc 317 and dog 319 and their associated elements act as a clutch to impart rotation to shaft 305 through mitre gears 328 and 329 under control of card lever 309.

When a card is inserted into throat 301, it rotates lever 309 counterclockwise through a short arc causing shoulder 325 of arm 313 to engage with upstanding shoulder 314' of latch 314, moving the latch out of contact with dog 319 so that the dog can be brought into engagement with ratchet 322 by spring 321 and rotate rollers 304 to advance the card completely into the throat 301. As so far described, as long as a card is in throat 301, rolls 304 will be operated and it is therefore necessary to disengage dog 319 from ratchet 322 when the card is completely positioned. Cam 324 is so positioned with respect to dog 319 that, shortly after dog is unlatched, cam 324 engages with cam edge 327 of arm 313 to force arm 313 to the right as shown in Fig. 24b, permitting latch 314 to drop off shoulder 325 and to fall on shoulder 326, in which position latch 314 will engage dog 319 upon completion of one revolution of the disc 317 thus disengaging the dog 319 from ratchet 322 and causing rollers 304 to be stopped.

The horizontal alignment of the code card is not completed until the bottom or 9-edge of the card is resting upon the horizontal ledge 330 formed in the housing 303. In order to insure that the card comes to rest upon this ledge, the following sensing mechanism is provided.

A circular drop cam 331 is carried upon shaft 305 and a cam follower 332 pivoted to rock shaft 333 rides upon this cam. Rock shaft 333 is supported by suitable bearings such as bushing 334 and terminates in crank arm 335 which extends downwardly to the level of ledge 330 and is tensioned counterclockwise by spring 342.

Arm 335 has an integral, laterally extending bracket 336 which projects over a contact 337 of an Acro type switch 338 rigidly carried on the main frame. A bracket 339 mounted to the housing 303 carries a resilient cantilever latch 340 which extends through aperture 341 at the level of the ledge 330, and at this outer end latch 340 contacts a front face of arm 335 at point 343 unless latch 340 has been deflected downwardly below the level of the ledge 330 by the bottom or 9-edge of a card being aligned. When latch 340 is so deflected, then the counterclockwise oscillation of arm 335 is not stopped by contact with latch 340 so that arm 335 overswings and causes bracket 336 to press against contact 337 thus transferring the contacts of switch 338 for a purpose that will be set forth in the description of the electrical circuit. Vertical or lateral alignment of the code card in the card carriage is accomplished by means of a cam on the carriage track and a pressure plate movable with the carriage as set forth in the description of the machine under the heading "Card Carrying."

Data keying

The keying system of the present machine utilizes a numerical keyboard and an alphabetical keyboard mechanically interconnected with the numerical keyboard, yet readily separable therefrom. The two keyboards, together with a data storage unit, form a separate unit movable with respect to the rest of the machine, to which the movable unit is connected by flexible electric cables. Data is mechanically keyed into a novel data storage unit that will be described later.

Fig. 1 shows the general arrangement of numerical keyboard 351 and alphabetical keyboard 352 and their relation to the machine as a whole. Figs. 27, 28, 29, 31, 32 and 34 to 36, inclusive, relate to the keying system to be described.

Fig. 35 shows the numerical keyboard 351 with cover removed. In addition to the numerical keys 353 for digits zero to 9, 11 and 12 there are provided special function keys as follows: release key 354, skip key 355, multi-punch key 356, cancel or clearing key 357, minor gang control key 358, intermediate gang control key 359, major gang control key 360, space key 361 and a field control key 362. All the keys other than 357 and 362 read directly into the novel storage unit to be described later.

The key operated levers 363, suitably spaced, are ranged along rod 364 (Figs. 32, 34) carried by end frames 365 (Fig. 35), and their depending legs 366 have toothed slots 367 for receiving restoring springs 368 tensioned between these slots and a bridge member 369 spanning frame members 365 and having a comb section 414 for spacing the key operated levers 363.

Depending leg 366 of each key operated lever 363 has rigidly mounted thereon a cam member 374. Duplicate bail contacts 370 (Fig. 34 e. g.) are mounted on frame member 371 intermediate the end frame members 365, as shown in Fig. 35. These two contacts have their contact arms extending downwardly past bail members 372 which are pivoted to rod 364 by means of end brackets 373. Depressing any key operated lever rotates its lever's leg 366 clockwise (in Fig. 34), engaging one of the bail members 372 and forcing it in the same direction to close contacts 370.

The lever leg 366 operated by field control key 362 as shown in Fig. 35 is outside the bails 372 hence depression of this key has no effect on the circuit operated by key contacts 370. Depending from lever 363' for field key 362 is a bracket of insulating material 415 which engages with contacts of a field control switch 416, the function of which will be described later. Depending leg 366 operated by the cancel key 357 has a cutout portion 417 (Fig. 32) so that depressing the cancel key will not cause bail 372 to be operated. Operation of cancel key 357 causes contact 458 to be operated through the bracket 415' of insulating material carried by its key lever 363'.

The linkage system for reading in data to the storage unit 375 includes, for each key position (except for 357, 362), a sliding plate 376 having parallel slide arms 377 and 378, the plate 376 being mounted for reciprocable motion in slotted guide block 379 fastened to the keyboard base 380. Slotted plates 381 and 382, mounted to the frame, are also provided to guide plates 376. Arms 378 terminate in fingers 383 reciprocable in bores 384 formed in block 385 fastened to the main frame. Helical springs 386 are mounted over the fingers 383 to bias them to the left as shown in Fig. 34.

Each slide plate 376 has pivoted to it an interposer 387 movable downwardly under pressure of spring 388 and having its upward travel limited by a stop 390 carried on plate 376. Each interposer 387 has a cam follower 391 for engagement with cam 374. A bail member 392 is mounted on rock-shaft 393 by bracket arms 394 keyed to the shaft which is journaled in the end frame members 365 and terminates at one end in a crankarm 395 pivoted to the plunger 396 of the keyboard bail solenoid 397, the function of which will appear later. Plate 376 has a slot 398 in which bail 392 is free to move. When the keys are at rest interposers 387 and cams 374 are in the position shown in Fig. 34. When a key is depressed, its lever 363 rotates to move its leg 366 clockwise, carrying its cam 374 out of engagement with its follower 391 and permitting interposers 387 to move downwardly and to latch over the keyboard bail 392.

Arms 377 and 378 are notched at fixed intervals and have clips 399 in certain of the notches, the clip position determining the numeral or character of a particular key. A row of freely oscillating bails 400 is provided below slide arm 377 and a similar row of freely oscillating bails 401 is provided above slide arm 378. These bails are journaled in the end frame members 365.

A series of slide arms 403 is provided and extends parallel to the arms 377 and 378. Each arm 403 carrying one clip 399' runs transversely of and between the rows of oscillating bails 400 and 401 and is reciprocable in slotted plates 404 and 405. Any clip 399' contacts one of the oscillating bails 400 and 401. Each arm 403 has a right-angle extension 406 to which is pivoted an arcuate link 407 having a notched end 408 in which is pivoted a data read-in lever 409. Each of the read-in levers is mounted in a comb 410 spanning the data storage drum 375 and fixed to the shell thereof. Each lever 409 also has a slotted portion 411, the open end of which bears upon the base of comb 410. Levers 409 are tensioned by springs 412 against shoulders 413 of links 407.

While the circuits will be described later, the operation of the linkage system set forth is as follows:

A key 353 is depressed, swinging leg 366 so as to withdraw cam 374 from interposer 387 which then is moved downwardly by spring 388 to latch over bail 392. Simultaneously, bail 372 is moved to close contacts 370 and energize the keyboard bail solenoid 397 causing plunger 396 to move to the right (Fig. 34a), rocking shaft 393 and carrying bail 392 to the right. Since slide plate 376 is latched to bail 392, clip 399 on arm 377 will rotate the oscillating bail 400' clockwise and shift slide arm 403 to the left. Link 407 also will move to the left causing read-in lever 409 to be actuated to transfer the keyed data into the storage unit 375.

A single restoring bail 402 extends along an axis parallel to the bails 400 and 401. It is operated as follows:

When shaft 393 is rocked counterclockwise by operation of the keyboard bail solenoid 397, bail 402 is rocked counterclockwise against the action of the restoring spring 462 by the crank arm 459 keyed to shaft 393, which crank arm carries a loose link 460 connected to bail arm 461.

When keyboard bail solenoid 397 is deenergized, restoring spring 462 rotates shaft 393, crank arm 459 and restoring bail 402 clockwise, so that all slide arms 403 will be restored to their home positions as shown in Fig. 34.

Alphabetical keyboard 352 is mechanically joined to a numeric keyboard 351 laterally thereof. Fig. 36 shows the alphabetical keyboard and its union with a numeric keyboard and Fig. 37a is a detail of the mechanical interlock or connection between the bails of the two keyboards. Fig. 37 shows the alphabetical keyboard 352 in end section. This keyboard contains a series of keys 419 corresponding to the characters of the conventional typewriter keyboard and each key 419 is carried on a key lever 420 which rocks about a shaft 421 extending between the end frame members 422 of keyboard 352. Legs 423 of key levers 420 have toothed slots 424 in which are mounted restoring springs 425 which have their other ends connected to a bridge member 426 extending between end frame members 422. A rock shaft 427 extending between end frame members 422 carries crank arms 428 at each end thereof, which crank arms engage a bail member 429 extending between the end frame members 422 and slidable horizontally in slots 430 formed in the end frame members 422. For each key lever there is an interposer 431 which is engageable with bail 429 when a key 419 is depressed. Interposers 431 have diagonal cam follower faces 432 for engagement with cams 433 fixed to each of the legs 423. The frame of keyboard 352 has mounted thereon electrical key contacts 434, which are closed upon depression of a key 419 by a bail 435 secured to rocker arms 436 which are pivoted to shaft 421. The operation of the bail and interposer mechanisms will be clear from the prior explanation of the numeric keyboard.

Attached to each interposer 431 by a stud pivot 437 is a sliding plate 438 having parallel slide arms 439 and 440. These arms have a series of notches 441 formed therein and in appropriate notches there are mounted clips 442. A helical spring 443 is mounted at the end of each of the slide arms 440 about extensions 444 of arm 440. These extensions 444 are reciprocable in slots 445 formed in a block 446 carried by the base 447 of the keyboard 352. A series of oscillating bails 448 pivoted about shafts 449, and another series of oscillating bails 450 pivoted about shafts 451, extend transversely of keyboard 352 between the end frame members 422, and the left end of each of these shafts 449 and 451 (as shown in Fig. 36), are pivoted to the left end frame member 422. At the right end of these shafts, as shown in the detail Fig. 37a, pin members 452 carried by bails 448 (as well as bails 450) project into sockets 453 formed in the left-hand ends of bails 400 (as well as 401) of the numeric keyboard 351. Shafts 449 are engageable in similar sockets 454 formed in bails 400 (as well as 401).

Pin members 455 mounted on the base 447 engage in holes 456 formed in base 380 of the numeric keyboard.

The two keyboards are further secured by a screw stud 463 which mates with a tapped hole 464 in the frame of the numeric keyboard 352. As shown in Fig. 36, bail 429 is also made to follow the action of bail 392 by means of key 457 which is an integral part of bail 429 meshing with the keyway in bail 392.

*Data storage*

The data storage unit of the machine of the present invention is shown in plan view in Fig. 27 in relation to the numeric keyboard. This and other relations as well as the structural features of the storage unit are shown also in Figs. 28, 29, 30, 30a, 30b, 30c, 31, 31a, 31b, 31c, 32, 33, 34, 34a, 34b, 38, 39, 40 and 40a.

The storage unit serves the function of receiving and storing data from the keyboard at keying speed and reading out the data to the punch mechanism at a predetermined high speed after keying is completed. The storage unit has novel features as will be set forth, but is generally of the type set forth in the above identified copending application of R. B. Johnson et al., Serial No. 17,974, filed March 30, 1948.

The storage unit, generally designated 375, comprises a cylindrical drum having a horizontal axis, the whole storage unit being mounted on the base 380 of the numeric keyboard, below the keys and rearwardly of the key-operated bails.

Storage unit 375 includes several coaxial shells and contains radially within these shells read-out mechanisms that will be described. A ball retaining shell 500 has a mounting rim section 501, which is shown to the left of the shell in Fig. 30, and a series of parallel rows of ball retaining holes or apertures 502, these holes being spaced equally about the circumference of shell 500.

In the embodiment shown there are 16 rows of holes, 502, each row representing one of the 12 holes or positions found in each column of a conventional 80-column card and 4 rows representing special functions supplied by the keyboard. Each row has 72 of the holes 502 spaced equally about the circumference of shell 500. The distance between any two of the 72 balls in each row represents the distance separating columns on a card. Each hole 502 contains a small ball 503 which, in the embodiment shown, has a diameter of .062". An inner shell 504 has a mounting rim section 505 and holes 502' formed therein in the same number of rows and the same number of holes per row as for shell 500. The inner or bottom section of each of the holes 502' is cupped, as shown in Fig. 38, to prevent the ball from falling through to the interior of shell 504 and each of the 16 rows of holes 502' contains a slot 506 provided for the operation of the read-out mechanism to be described.

Shells 500 and 504 are separated by an imperforate shell 507 which acts as a separator to prevent transfer of balls between corresponding holes 502 and 502'. As shown, particularly in Figs. 31, 34, 31a, 31b, 31c, shell 507 has a longitudinally extending cut-away portion or window through which balls may be transferred between outer shell 500 and inner shell 504 by the read-in and restoring mechanisms to be described. Mounting rims 501 and 505 of shells 500 and 504, respectively, are mounted to an inturned flange 508 of the read-in and read-out ratchet tooth ring 509. Pin members 510 are provided for securing shells 500 and 504 to the flange 508 in proper relation. The ratchet ring 509 (as shown particularly in Fig. 33) is mounted for rotation about the shaft 511 by a set of ball bearings 512 which in turn are mounted upon the end ring assembly 513 which is rotatably carried on the hub bearings 514 of shaft 511.

The left end of shell 507, as shown in Fig. 38, rides freely in the slot formed by the offset shoulders of mounting rims 501 and 505. The right end of shell 507, as shown in Fig. 38 is wedged tightly on to ring member 515 which is mounted in a bracket 516 by means of set screws 517 and a dowel screw 518. Bracket 516 is bolted to the keyboard base member 390. Shells 500 and 504 may be oscillated or rotated as will be described but shell 507 remains stationary at all times.

An outer cover shell 519 is provided in order to retain the balls 503 within shell 500 and to afford control of the reading-in of keyed data. It is mounted for relative movement with respect to shell 500, ratchet ring 509 and fixed ring 515, and terminates at each end in flanges 520 and 521 welded or otherwise secured to the cover shell 519. Read-in lever supporting comb 410 has its ends mounted to integral brackets 526 carried on flanges 520 and 521 so that shell 519 and read-in lever comb 410 will move as a unit for the purpose to be set forth. Shell 519 has a horizontal row of holes therein at 522 closed by a window of transparent plastic 523 which is held in place frictionally by spring retainer rings 524 embracing shell 519. A horizontal row of slots is formed at the read-in position in line with ball contacting fingers 525 formed on the read-in levers 409. The slots are narrower than the diameter of the balls so there is no danger of the balls being lost therethrough.

In operation shell 519 will oscillate counterclockwise (as viewed in Figs. 31 and 34) from one "column" of balls to the next and return the same distance to its home position. The drive for accomplishing this motion is as follows:

Operation of keyboard bail solenoid 397 as described above will cause plunger 396 (Fig. 34a) to be attracted and move to the right so that it strikes pin 534 and this pin rotates lever arm 527 about shaft 528, (to which it is loosely pivoted), moving integral arm 529 upwardly, thus transferring a contact 530 and energizing the storage read-in solenoid 531, attracting its plunger 536 to the left as shown in Fig. 28.

Plunger 536 has a vertical slotted section in which rides a roller follower 537 carried by an arm 538 keyed to shaft 528. Attraction of plunger 536 therefore causes shaft 528 to be rotated clockwise, carrying rocker arm 532 clockwise as viewed in Fig. 40, thus rotating bracket 526' of shell 519 counterclockwise through the mutually connected loose link 533. Bracket 526' is integral with flange 521 secured to the right end of oscillating shell 519, as viewed in Fig. 27, hence shell 519 will be oscillated counterclockwise.

When shaft 528 is rotated clockwise by virtue of the attraction of plunger 536 into storage read-in solenoid 531, lever arm 540 keyed to shaft 528 is rotated clockwise and pushes snap switch contact 530 downwardly again opening the storage read-in solenoid circuit and transferring the contact 530. Keyed to shaft 528 is a contact lever arm 541, which when rotated clockwise opens the bail contact 542, deenergizing the keyboard bail solenoid 397.

Rocker arm 532 is tensioned by spring 539 so that upon deenergization of the storage read-in solenoid 531, rocker arm 532 and shaft 528 are rotated counterclockwise causing shell 519 to be oscillated back to its home position by virtue of link 533 connected to bracket 526'.

Read-in ratchet ring 509 (Figs. 27, 30 and 31) has formed along its outer periphery a series of read-in teeth 543 which are engageable with a read-in feed pawl 544 pivotally fastened to flange 520 by means of a stud 545. Pawl 544 is urged into engagement with teeth 543 by means of a spring 546 which bears against a locking pawl 547 also pivoted to stud 545. This locking pawl has formed thereon a cam surface 548 engageable by a pin 549 mounted on bracket 550 bolted to the keyboard base 390. Bracket 550 also carries a ratchet 551 which is pivoted thereto by stud 552. A spring 553 bears against ratchet pawl 551 to urge it into engagement with the read-in teeth 543. As set forth above, during the read-in cycle shell 519, together with flanges 520 and 521, will be driven counterclockwise to the next "column" of balls. The teeth 543 are spaced accordingly and upon counterclockwise rotation of shell 519, read-in pawl 544 which is in engagement with one of the teeth 543, will drive the ratchet ring 509 counterclockwise so that shells 500 and 504, which are fastened thereto through flange 508, will be moved counterclockwise the same distance. An adjustable stud 554 is fixedly mounted by a bracket 555 and limits the travel of read-in pawl 544 in its counterclockwise motion. During this counterclockwise motion, locking pawl 547 is cammed outwardly by virtue of engagement of cam surface 548 with pin 549 so that pawl 547 is raised out of engagement with teeth 543. Return motion of ratchet ring 509 is prevented, however, by virtue of the engagement of ratchet 551 with teeth 543. Upon the return, or clockwise, motion of shell 519, read-in pawl 544 clicks over ratchet teeth 543 and locking pawl 547 returns at the end of this motion into engagement with teeth 543; thus in this cycle ratchet ring 509 has been advanced counterclockwise by one tooth 543. During this cycle read-in lever comb 410, which is mounted to bracket 526, together with the read-in levers 409 and arcuate link 407 will be oscillated along with shell 519.

Data is read into storage drum 375 as follows: One or more of the arcuate links 407 actuated in response to keying-in will be drawn to the left, as viewed in Fig. 31, causing read-in lever 409 to be rocked inwardly, projecting finger 525 through one of the read-in slots in shell 519, striking the ball 503 held in shell 500 and driving it inwardly into shell 504 and rocking the restoring pawl 556 inwardly against the action of spring 557 about the knife edge pivot 558 of the restoring pawl. The lower section of restoring pawl 556 has an arcuate surface 559 extending into groove 505 of shell 504.

Immediately after finger 525 has pushed ball 503 into shell 504 the counterclockwise cycle of shell 519 is started and by virtue of the counterclockwise movement of ratchet ring 509, shells 500 and 504 carried thereby will be advanced counterclockwise past stationary shell 507 so that the ball is retained within shell 504 by the inner surface of stationary shell 507. Finger 525 remains projected within shell 500 in the clockwise part of the cycle. As has been set forth above, storage read-in solenoid 531 and the keyboard bail solenoid 397 are deenergized so that arcuate link 407 returns to its home or right-hand position and withdraws finger 525 from shells 500 and 519. During the clockwise part of this cycle, the arcuate surface 559 of rotating pawl 556 cams out of shell 504 and into shell 500 any ball that might have been read into the shell 504 in a previous cycle.

The read-out mechanism includes the following:

A collector ring shaft 560 is carried in the hub section of an end bracket 561 and extends through drum 375 up to a screw stud 562 carried on shaft 511. Shaft 560 carries the inner race of ball bearings 563. Bearings 563 rotatably mount a read-out support block 564 of insulating material which extends axially within drum 375. This supporting block 564 is also secured to a cup shaped housing 565 which includes a clock spring 566 having one end 566' anchored thereto and the other end anchored to a sleeve 567 which is fastened to bracket 561. Spring 566 applies a clockwise torque to block 564 and the tension of spring 566 can be adjusted by rotation of ratchet wheel 618 which is kept by a spring pawl 619 secured to end bracket 561 (Fig. 30a). Shaft 560 carries 18 collector rings 568 insulated from each other and to each of these collector rings is connected an insulated conductor 569 which extends through hollow shaft 560 to a suitable connecting block 570, (Fig. 27).

Read-out block 564 has mounted thereto at each end an axially extending bridge member 571 which contains 16 feeler plungers 572, each of the plungers having a finger 573 extending into one of the slots 506 formed in shell 504. The plungers 572 are reciprocable in bridge 571 and butt against read-out levers 574 which are pivoted about axis 575. There are two shafts on this axis 575, one of which carries 12 levers 574, corresponding to the 12 numeric characters in each card column, and the other of which carries the 4 special function levers 574. Each of these shafts has electrical connection by means of brush 579 which makes electrical contact with an end collector ring 568 which is carried at each end of the collector ring shaft 560.

Each of the read-out levers 574 is tensioned by a spring 576 connected between the lower extremity of the lever and a sheetmetal plate 577 secured to the block 564 by a series of screw studs 578.

Each of the read-out levers 574 carries at its upper end a brush 581 which is pivoted to lever 574 and urged downwardly by spring 582. Brushes 581, however, have their downward motion limited by a shelf 583 formed on lever 574. In the position shown in Figs. 31a and 31b, brush 581 is out of contact with its corresponding collector ring 568 while in Figs. 31c brush 581 makes contact with its collector ring 568. This contact is established by virtue of the inward displacement of plunger 572 caused by engagement of its finger 573 with a ball encountered in the shell 504. Spring 582 serves to assure contact between brush 581 and its collector ring 568 regardless of small variations in diameter of the collector rings that might result from wear.

As has been set forth above, during the read-in cycle, ratchet ring 509 is advanced counterclockwise. It has also been pointed out that spring 566 tends to drive the read-out support block 564 clockwise. In the read-out cycle, support block 564 will be permitted to escape clockwise row by row, so that fingers 573 of plungers 572 will detect in sequence balls representing Columns 1 through 72 for each of the 16 rows of balls. Clockwise escapement of block 564 during the read-out cycle is accomplished by the following mechanism:

Storage escape magnet 584 mounted to the base 380 has an armature 585 pivoted at 586 and carries a downwardly extending arm 587 which terminates in a finger engaging storage escapement contact 588 of a switch 589 mounted to base 380. Pinned to arm 587 at 590 are two arms 591 which extend horizontally as shown in Figs. 27 and 30 into contact with a ring 592 mounted to a yoke member 593 (Fig. 30c) by means of trunnions 594. A V-shaped bracket 595 is rigidly mounted to the face plate 596 which is part of the end ring assembly 513. This plate 596 is held in place by screw studs 598. Yoke member 593 is pivoted to bracket 595 by means of pins 599. Also mounted to face plate 596 are diametrically disposed brackets 597 to which the escapement ring 600 is mounted by means of trunnions 601. A compression spring 602 is inserted between ring 600 and bracket 595 to urge detent 603 into engagement with teeth 604 carried by the escapement ring 509. Ring 600 also has mounted thereon, diametrically opposite detent 603, another detent 605. Upon energization of the storage escapement magnet 584, arms 591 force ring 592 to the right as shown in Fig. 30. This causes yoke 593 to pivot about pins 599, thus disengaging detent 603 from escapement teeth 604 and at the same time rocking escapement ring 600 so that detent 605 is made to engage with teeth 604. Upon deenergization of escapement magnet 584, detent 603 engages the next tooth 604. This results in support block 564 being driven clockwise by spring 566 for one tooth 604. In a full read-out operation storage escapement magnet will be energized in pulses under electrical controls that will be explained later.

Three sets of switch contacts are mounted on a bracket 606 carried by end bracket 561. As shown in Fig. 27 these contacts are 607, which is designated as the 10-column contact, 608 which is designated as the 30-column contact, and 609 which is designated as the "storage last column contact." The purpose of these contacts will be made clear in the circuit description, however for their operation cam surfaces are provided on the cup-shaped housing 565 which rotates with the support block 564 carrying the read-out lever and contact assembly. These cam surfaces are formed on a metal band 610 secured to housing 565 (Figs. 30 and 30a). Cam followers 611 and 612, engageable with the cams for contacts 607 and 608, are pivoted about the shaft 614 mounted in fixed plate 616 carried by end bracket 561. The switch contacts 607 and 608 are made to move under control of their respective cam followers by means of links 617 of insulating material which are pinned to the cam followers 611 and 612 and which have slots at their upper ends for engaging the contacts 607 and 608. Contacts 609 is connected by an insulated link 617 to a crank 613 which is pivoted to shaft 614 and which has a contact arm 621 engageable with a cam projection 622 mounted to housing 565 by screw studs 623.

Carriage escapement and card punching

The carriage 201 is normally driven by an escapement mechanism which will be described. As pointed out in the description "Card Carrying" the carriage is driven under control of the program card by carriage drive pinion 203. The carriage escapement is actuated by the main drive from shaft 700 (Figs. 3, 6, 16 and 19) through three cams; 701, 702, and 703. Cam 701 is a true cam and 702 is its complement, whereas cam 703 accomplishes a separate motion of the ecapement dog that will be set forth. A pair of oscillating plates 704 (Figs. 19 and 19c) pivoted on shaft 705 carried by the main frame have roller cam followers 701' and 702' engageable with the cams 701 and 702, respectively. Pivoted to the main frame at 706 is a rocker arm 707 tensioned by spring 708 carrying a cam follower 703' engageable with cam 703. Pivoted to rocker arm 707 is a link 709 which extends between plates 704 and terminates in a slot 710.

An escapement dog 711 (see Fig. 19) is pivoted to plates 704 at 712 and terminates in a downwardly extending crank arm having a pin 713 engaged in slot 710. Mounted to a bracket 715 carried by the main frame is an escapement release magnet 714 as shown in Figs. 19, 19c and 19d. An armature 716 is pivoted to bracket 715 at 717 and terminates in an arm 718. Armature 716 is biased to this open or upward position by a spring 719 in which position arm 718 is out of engagement with dog 711. When escapement release magnet 714 is energized as will be described in the operation of the electrical circuits, arm 718 moves downwardly, engaging dog 711 and keeping it out of engagement with escapement rack 206. A spring 720 tensions dog 711 into engagement with rack 206. While cams 701 and 702 cause dog 711 to be oscillated by virtue of the oscillation of plate 704, an additional rocking motion is interjected to insure that the dog 711 will properly engage and disengage from escapement racks 206. Cam 703 accomplishes this by means of cam follower 703', rocker arm 707, and link 709, which mechanism serves to rotate dog 711 about pivot 712 at the proper time intervals.

The card punch is operated from shaft 700. At each end of shaft 700 as shown in Fig. 16 there are identical true cams 721 and complementary cams 722. Engageable with these cams are cam followers 721' and 722' which are carried on rocking beams 723 pivoted to shaft 724 carried by the main frame. Each of these beams is pivoted at 725 to an upwardly extending punch lever 726 which is reciprocably mounted in the card punch housing 727. An interposer bail 728 extends between levers 726, being connected thereto by studs 729. The interposer bail 728 operates with a conventional punch of the type shown and described in the above identified application Serial No. 708,163, now Patent No. 2,524,127 granted October 3, 1950. This punch unit is shown in Figs. 16, 16a, 16b and 16c. The punch unit 730 includes twelve individual punches 731, the die 732, and the stripper 733. The twelve punches are aligned so that they all punch within a single column of the card being punched. Pivoted to each punch at 734 is an interposer 735 tensioned by spring 736. The end of each of these interposers is formed to lock beneath the interposer bail 728 when its particular punch is to be operated and to be free of this bail in the position shown in Fig. 16a when its particular punch 731 is not to be operated. Latches 737 are slidably housed between wall 738 of the punch guard and a cover plate 739 fastened to the punch frame by studs 740. A roller 741 is provided for each latch 737 to minimize friction during motion of the latches. The latches 737 are actuated by individual punch magnets 742 by means of pull wires 743 connected to magnet armatures 744 and to latches 737. Figure 16 shows a latch 737 in position to keep interposer 735 out of engagement with interposer bail 728. In this position interposer 735 bears against interposer contact 745 maintaining it in open position. When a particular punch is to be operated its magnet 742 attracts its armature 744 and causes pull wire 743 to draw its latch 737 to the right as shown in Fig. 16. This permits the interposer 735 of that particular punch to lock beneath the interposer bail 728 so that on downward motion of the interposer bail, the interposer 735 so locked will transmit motion downwardly to its punch 731, to punch a hole in the card carried in the bed plate 746.

In the normal operation of the machine of the present invention it is possible to set up data to be punched in the succeeding column while data is being punched in one column. This in effect provides a one-column storage feature for the punch unit 730. This storage is effected as follows: As the interposer bail starts its downward motion to punch data into a particular column of the card, the same or additional punch magnets may be energized either by impulse from the storage unit or from the card sensing units. Once bail 728 has started its downward motion, any interposer 735 that is thereafter released by virtue of its punch magnet 742 being energized will not lock under the interposer bail 728 but will contact the left-hand vertical side of the interposer bail, as shown in Fig. 16a, so that upon return of the interposer bail to its uppermost position, that interposer will then lock under the interposer bail and for the next punching cycle (which will of course be in the next column of the card) the punch controlled by that interposer will be operated.

It has been shown that the carriage escapement and the punch unit are operated from the same shaft 700. It is understood that punching occurs only when the carriage is at rest, therefore, the carriage must not move during the punching cycle. The relation of the escapement cams and the punch cams is such that as the punches 731 are actually punching through a card, the escapement dog 711 is out of engagement with the escapement rack 206. When the dog 711 clears, oscillating plates 704 are rocked by their cams 701 and 702 to carry the dog to the left as shown in Fig. 19 and after a short dwell, cam 703 through its linkage above set forth, rocks dog 711 back into engagement with escapement rack 206. Spring member 720, of course, rocks dog 711 clockwise and assures that the dog will engage the next forward tooth in escapement rack 206. At this instant punches 731 are being returned upwardly by virtue of the sets of cams 721 and 722 and by the time cams 701 and 702 are rocking plate 704 to the right to advance the carriage the punches 731 are in their home or withdrawn position and are ready for the next punching cycle which will begin when the carriage has been stopped by virtue of a dwell in cams 701 and 702. The escapement release magnet 714 permits dog 711 to be disengaged from escapement rack 206 independently of the cam driven escape mechanism. For example, under control of the program card, escape magnet 714 may be energized so that latch 718 withdraws dog 711 and for a controlled interval the carriage may be driven by carriage pinion 203. This will be further explained in the description of the operation of the electrical circuits.

*Card sensing*

As pointed out above, the machine of the present invention carries up to four cards, normally the detail card D, gang card G, code card C, and program card P. There is a data sensing station for the cards G, C and P so that appropriate data from one or more of these cards can be sensed and either punch data in the detail card or control certain functions of the machine. Having reference to Fig. 1, the sensing station is located just to the left of the code card aperture 300 under the panel designated 800. Having reference to Figs. 3 and 4, the program card sensing unit is designated as 801 (Fig. 4) and the gang card sensing unit is indicated generally as 802 (Fig. 3). This superposed relationship of the gang and code card sensing units is shown clearly in Fig. 26. Immediately below unit 802 is the code card sensing unit 803. These sensing units are identical to each other and are similar to the type shown in the above identified application Serial No. 766,559, now Patent No. 2,490,360 granted December 6, 1949. Fig. 26 shows the gang and code card units 802 and 803. These units are identical and the code card sensing unit will be described in detail, prime numerals being used to designate corresponding parts in the gang sensing unit 802. The code card unit 803 includes a magnet 804 and an armature 805 pivoted to the housing of the sensing unit at 806. The unit contains twelve of these armatures 805 and to each armature is connected a pin 807 normally in retracted position, as shown. A spring 808 is fixed to each pin 807 urging armatures 805 and 805' away from cores 814 and 814', and twelve pins of each unit are in line and correspond to the twelve data lines in each column of the card to be sensed. Coupled to the upper end of pin 807 is a tightly wound spring 823 which has joined to its opposite end a sensing pin 824 so that pin 807 and sensing pin 824 act as a single unit.

The upper face 809 of the code card sensing unit 803 has an aperture through which projects a code card lever 810 carried on a switch contact 811 while the upper face 809' of the gang card sensing unit 802 has an aperture through which projects a gang card lever 812 carried on a switch contact arm 813'. These contacts are normally open when no card is passing through the sensing units. However, when cards so pass through the sensing units, levers 810 and 812 are depressed by contact with the card surfaces and close their respective switch contacts for a purpose set forth in the description of the electrical circuit.

With the card carriage at rest, magnets 804 and 804' are energized causing the pins or fingers to project upwardly against the cards. If a sensing finger 824 (or 824') encounters a hole in the card, it projects therethrough and its armature 805 (or 805') contacts the core 814 (or 814') of the magnet 804 (or 804'), closing an electrical circuit for that particular sensing finger, which circuit controls certain electrical functions that will be set forth in the description of the full electrical circuit. If a sensing pin 824 encounters no hole, the sensing pin will strike the card thus preventing its armature 805 from contacting the core 814, hence no circuit is made for that armature.

The program card sensing unit 801 operates in the same manner, having a program card lever contact 815 (Fig. 4) projecting through the housing of the sensing unit to detect the presence of a program card and the sensing fingers of the program unit operate to close a controlling circuit at any time a hole is encountered in the column of the program card being sensed. Program card sensing unit also carries a skip-stop sensing contact 816 (Fig. 4) mounted in a bracket 817 pivoted to the side of the sensing unit 801 by the stud 819. As shown in Fig. 4, contact 816 is raised out of engagement with the bed plate 818, being latched in this position by engagement of arm 820 with a spring latch 821 mounted to the housing of sensing unit 801 by a bracket 822. Brush 816 is thus held above bed plate 818 to allow for free passage of the program card P on the return of the carriage. When the carriage has been fully returned, insulated pin 825 mounted to the carriage strikes latch 821 allowing arm 820 to drop brush 816 against program card P.

The skip-stop function is normally controlled by a twelve hole of the program card and when a twelve hole is encountered contact 816 contacts bed plate 818 through the hole thus closing a circuit to terminate a skip operation. As the program card P moves with the carriage past its 80th column the insulated cam 826 mounted on the carriage (Fig. 23) contacts pin 827 (Fig. 4) on arm 820, lifting brush 816 and relatching arm 820 on spring latch 821.

*Card stacking and collating*

The card stacker is driven by a shaft 850 constantly rotating counterclockwise (Figs. 10 and 14) to which is keyed a toothed wheel 851. Idling on a bushing carried by shaft 850 is a cam plate 852 to which is pivoted a dog 853 urged counterclockwise by housed spring 854. Dog 853 also engages with a latching pawl 855 pivoted to the main frame at 856, terminating in the armature 857 of stacker magnet 858. When magnet 858 is deenergized, armature 857 is held against pin 859 by a tension spring 860. Clockwise rotation of dog 853 is limited by pin 861 carried on cam plate 852. The drop edge of cam plate 852 is engaged by a pawl 862 pivoted to the main frame by pin 863. Pawl 862 has an integral crank lever 864 abutting against stacker cam contact 865. Cam plate 852 carries a camming stud 866. A bell crank 867, pivoted to the main frame at 868 has a crank arm 869 extending downwardly into engagement with stud 866. A tension spring 870 extends between lever 864 and crank arm 869 to keep pawl 862 against cam plate 852.

A second cam 871 is secured to cam plate 852 and actuates cam followers 872 carried on link 873 pivoted to rocker arm 874 by pin 875. Rocker arm 874 oscillates about shaft 876 to which is pivoted a lever arm 877 tensioned by spring 878 anchored to rocker arm 874 at 879. Shaft 876 extends into the stacker bed, as shown in Figs. 17 and 17a.

Lever arm 877 has a shoe member 892 which bears against stop member 893 keyed to shaft 894 to which is secured the selector knob 886. The selector knob can be manually set to separately stack (the condition for which it is set in Fig. 14) or collate the detail and code cards. When the operator wishes to collate the cards, he turns knob 886 to the "collate" position and stop 893 is rotated away from shoe 892, permitting lever arm 877 to drop upon the stud member 895 carried on rocker arm 874. This will cause shaft 876 to be rotated clockwise through a small arc to adjust the stacker mechanism for collating the code and detail cards in the manner to be set forth later.

A spring detent 896 mounted to the main frame at 897 bears against a square section 898 carried by shaft 894 to maintain shaft 894 in the proper position as indicated by the selector knob 886.

In order that the pawl 855 may be disengaged manually from dog 853, a manual release button 899 is provided. This button is fastened to a push rod 900 which engages with hole 901 in pawl 855.

An adjustable stop member 880 is mounted to crank 867 to limit the clockwise travel of rocker arm 874. Pivoted to crank 867 is a link 881 which is pivoted at its upper end to rocker arm 882 keyed to rock-shaft 883 having a crank 884 fixed to its forward or left end. Crank 884 has roller contact 885 which is intended to engage the end of pusher bar 222 of the card carriage to release the gang and code cards carried thereby.

When stacker magnet 858 is energized, armature 857 is attracted, moving integral pawl 855 out of engagement with dog 853, which is then forced into engagement with rotating teeth 851 by spring 854. Cams 852 and 871 will be driven counterclockwise. Camming stud 866 lifts crank arm 869, rotating crank 867 about 868, pulling link 881 downwardly thus rotating rock shaft 883 through rocker arm 882. This rotates crank 884 so that roller contact 885 will engage the end of carriage pusher bar 222 to free the detail and code cards from the card carriage. Counterclockwise rotation of rocker arm 874 also causes stud 895 to strike lever arm 877, driving it counterclockwise and causing shaft 876 to be rotated counterclockwise for the purpose to be set forth.

Links 245 and 251 which operate the kicker arms 248 and 255 are rocked by abutments 257 and 258 to force the kicker arms 248 into slot 226 to eject code card C, and kicker arms 255 into slot 205' to eject detail card D.

Rotation of cam 871 causes cam followers 872 to move link 873 downwardly, rotating rocker arm 874 and shaft 876 so that the code and detail cards may be stacked.

As keeper pawl 862 follows rotating cam 852 it rises, so that just before one complete rotation of the cam, crank lever 864 has closed stacker cam contact 865, deenergizing stacker magnet 858 and permitting latching pawl to engage dog 853. This frees cams 852 and 871 from rotating shaft 850 and they are stopped by keeper pawl 862.

Figure 10:
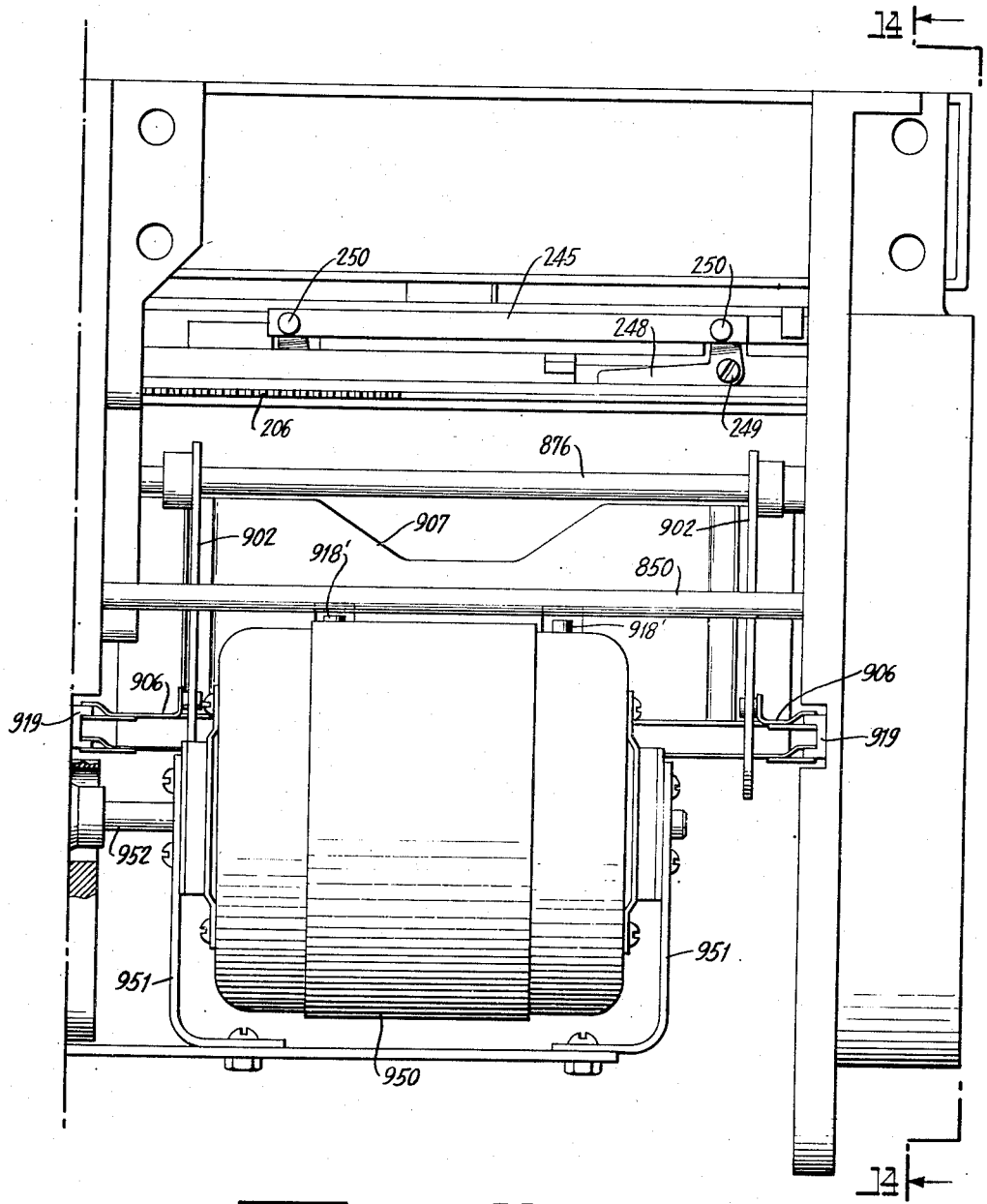
Fig. 10 is a plan view of the drive motor and of the card stacker unit projected from below.

The ejected detail card D and code card C are separately stacked or collated as directed by the position of the stacking and collating knob 886 as set by the operator. With the selector knob 886 set for separate stacking of code and detail cards, the detail cards D and the code cards C will be stacked as shown in Figs. 17 and 17a. Figs. 4, 7 and 10 also show parts of the stacker compartment.

The cards enter the stacker through narrow slots 887 and 888 carried in the main housing just after the gang and code card sensing stations. The detail cards (which have passed through the gang sensing station) enter through slot 887 and the code cards enter through slot 888. A gate 889 is hinged vertically by hinges 890. Gate 889 covers slot 888 and temporarily supports the code cards that have been previously stacked.

It will be noted from Figs. 17 and 17a that a code card entering slot 888 will strike gate 889, forcing it to pivot and permit the latest code card to be stacked behind the others. Detail card D entering through slot 887 will be carried directly into the stacker behind previously stacked detail cards, which are supported vertically by the knife edged plates 903 mounted on the sides of the stacker compartment. The bottom edge of the stacked cards D rests on stacker base plate 905. Both cards are retained in the carriage until they are completely within the stacker, at which point they are ejected as above set forth.

Shaft 876 traverses the stacker and has attached thereto two forked levers 902 which engage trunnions 904 struck up from the stacker plate 906 which is slidable back and forth on rails 919 (Figs. 4 and 10) carried by the main frame engaged by channels formed in the margins of plate 906. The divided base plate 905 is in turn slidably mounted in the stacker compartment on lower edges of rails 919 and is connected at its forward end with a drawer pull 917 to which is secured the stacker compartment front wall 918. Upstanding stop members 918' are mounted on divided plate 905 to limit the forward travel of plate 905. Stacker plate 906 has an integral, upstanding pusher plate 907 which separates the code and detail card compartments for separate stacking of these cards and which also acts to push the latest stacked detail card forward, bending it past the knife edges 903 into position behind the previously stacked detail cards.

A partition member 908 acts as a backstop for the stacked code cards C. This member is fastened to the main frame at 909 and has a horizontally extending section 910 that clears above the plane of a leaf spring 911 mounted on the gate 889. A camming arm 916 is mounted upon the edge of stacker plate 906 to engage with leaf spring 911 as will be described. Stop members 918' can be advanced up to the back side of pusher plate 907 through apertures 920 formed in the partition member 909.

A flat spring 912 having an upturned forward edge 913 is secured to the main frame by pillars 914 having screw studs 915 for fastening spring 912 thereto. Spring 912 extends parallel to divided plate 905 and the upturned edge 913 is cammed downwardly when pusher plate 907 stacks a detail card D, and thereafter edge 913 supports the detail card D in the stacker along with knife edges 903.

When the selector knob 886 is set for separate stacking of code cards C and detail cards D, these cards will enter the stacker as shown in Figs. 17 and 17a. After gate 889 has been cammed open by an entering card C, and entering card D stands loosely ahead of the pusher plate 907, shaft 876 rotates counterclockwise, advancing the stacker plate 906 and pusher plate 907 to spring the last card D past knife edges 903 into the forward section of the stacker. Camming arm 916 strikes spring 911, restoring gate 889 to its closed position supporting the latest code card C along with the other cards C, and the upturned edge 913 of spring 912 snaps behind the last card D, as shown in Fig. 17. As each card D is thus stacked, front wall 918, pull 917 and plates 905 are moved to the right to accommodate the latest card D. Code cards may be separately stacked until the first card C has been advanced to the back of pusher plate 907.

When cards C and D are to be collated, the operator turns selector knob to the "collate" position. It has been seen that this causes lever arm 877 to turn clockwise (Fig. 14), thus shaft 876, as viewed in Fig. 17a, will be rotated clockwise, causing forked levers 902 to retract stacker plate 906 so that the upstanding pusher plate 907 takes a position to the left of slot 888 as viewed in Fig. 17a. Cards C and D entering the stacker through slots 888 and 887, respectively, will then both be pushed forward together by pusher plate 907 and stacked together to the right of knife edges 903, the code card being stacked behind the detail card.

*Machine driving*

The driving mechanism for the several units of the machine set forth above is shown in Figs. 3, 6, 7, 8, 9, 10, 15, 15a, 15b and 19.

The motor 950, mounted to the main frame by brackets 951, runs continuously during operation of the machine. Its shaft 952 is directly connected through flexible couplings 953 to a stub shaft 954 journaled within the gear box 955 mounted to the main frame by brackets 956. Shaft 954 carries a worm gear 957 meshing with a wheel 958 keyed to a driven shaft 959 journaled in gear box 955 by bearings 960. Shaft 959 terminates at its lower end in a spur gear 961 and at its other end it carries a worm gear 962 meshing with wheel 963 keyed to a countershaft 964 journaled in gear box 955 and terminating in sleeve couplings 965 and 966. Coupling 965 is connected with shaft 11 which drives the detail card feed unit, while coupling 966 is connected to shaft 850 which drives the card stacker unit.

Spur gear 961 meshes with a spur gear 967 keyed to punch clutch shaft 968. This shaft also carries a pinion 969 which meshes with a spur gear 970 keyed to shaft 971 which drives the code card feed and aligner mechanism.

Shaft 971 carries a spur gear 972 and a pinion 973. Gear 972 meshes with a spur gear 974 journaled on shaft 975 and fixed to gear hub 976 carrying a plate 977. Pinion 973 meshes with a reversing gear 978 which drives a spur gear 979 which, like gear 974, is journaled on shaft 975 and has mounted to its hub 980 a plate 981. It will be seen therefore that gears 974 and 979 revolve about shaft 975 in opposite directions. The following mechanism is a reversing clutch for coupling one or the other of these gears to shaft 975. Plate 977 carries two upstanding pins 982 on which are mounted a series of rings 983 interleaved with discs 984 splined to shaft 975. Screw studs 985 prevent displacement of rings 983 from pins 982. Plate 981 also carries two pins 982' on which are mounted rings 983' interleaved with discs 984' splined to shaft 975.

As shown in Fig. 3, a forward-reverse drive magnet unit 996 is mounted to the wall of gear box 955 by means of a bracket 997 and includes a forward drive magnet 998 and a reverse drive magnet 999. An armature 1000, pivoted at 1001 to gear box 955, extends into the air gap between the magnets 998 and 999 and has bifurcated arms 1002 carrying at their extremities roller bearings 1003 which ride between the outermost discs 984 and 984' of the clutch stacks. Plates 977 and 981 are constantly driven in opposite directions, as above set forth. When forward drive magnet 998 is energized, armature 1000 will be attracted downwardly so that bifurcated arms 1002 press roller bearings 1003 upwardly, causing rings 983' and discs 984' to be frictionally engaged, coupling shaft 975 and gear 979 so that gear 989 rotates carriage drive shaft 991 clockwise, as shown in Fig. 15b.

When reverse drive magnet 999 is energized, armature 1000 will be attracted upwardly, forcing roller bearings 1003 to frictionally engage rings 983 and discs 984, coupling shaft 975 and gear 988 together and thus rotating carriage drive shaft 991 counterclockwise through gears 988 and 989.

Shaft 975 terminates at its upper end in bearings 986 mounted in gear box 955 and at its lower end in bearings 987 mounted in gear box 955. Keyed to shaft 975 is a spur gear 988 which drives gear 989. Carriage drive shaft 991 is coupled to gear 989 and shaft 990 through an overload protective clutch 992, secured to gear 989 splined to shaft 991. Shaft 968 drives the punch clutch 1004 which is controlled by the punch clutch magnet 1005.

As shown in Fig. 15, shaft 968 is hollow and terminates in an annular plate 1006 to which are riveted two pins 1007. On pins 1007 are mounted a stack of rings 1008 interleaved with a stack of rings 1009 mounted on two pins 1010 mounted on a yoke member 1011 carried by a sleeve 1012 journaled on shaft 968. Arms 1013 of yoke 1011 project upwardly through apertures in a latching plate 1014 keyed to a solenoid plunger 1019 and connect to a coupling 1015 carried by punch and carriage escapement cam shaft 700. Pins 1007 carry collars 1016 to retain rings 1008 thereon and pins 1010 have fixed thereto a cover plate 1017 to retain rings 1009 thereon. Latching plate 1014 has mounted thereon two depending pins 1018 which contact the stack of rings 1008 and 1009. Solenoid plunger 1019 is slidable in hollow shaft 968 which is of non-magnetic material and is biased upwardly by spring 1020 which bears against an adjusting screw 1021 threaded into shaft 968. Solenoid plunger 1019 carries an oil wick 1022 which feeds oil into the clutch assembly through port 1023.

Latching plate 1014 functions to lock shaft 700 from further rotation after the punch cam clutch is deenergized. For this purpose there are notches formed on its peripheral edge which are engageable with teeth 1025 formed in the fixed latching ring 1026 mounted in the housing of the clutch 1004 by screw studs 1027. These teeth and notches are engaged when magnet 1005 is deenergized, but upon energization of magnet 1005, solenoid plunger 1019 is drawn downwardly, carrying latch plate 1014 out of engagement with teeth 1025 and forcing pins 1010 to frictionally couple the rings 1008 and 1009 so that the motion of rings 1008 is transmitted to shaft 700 through rings 1009, pins 1013, yoke 1011, latch plate 1014 and coupling 1015.

The punch and carriage drive cam shaft 700 also carries a series of circuit breaker cams 1028 which are best shown in Figs. 16 and 16a. There is a circuit breaker 1029 provided for operation by each cam. The circuit breakers shown are similar to those disclosed in the patent to Cunningham, No. 2,384,802 dated September 18, 1945 and assigned to the assignee of the present invention. These circuit breakers are mounted on a bar 1030 fixed to the main frame of the machine and each circuit breaker operates a contact 1031 through a pusher rod 1032 of insulating material which is moved to open and close its contacts 1031 by means of a cam follower 1033. The circuit breakers are timed by the cams 1028 to operate on the electrical circuits of the machine at predetermined intervals.

Figure 44A:
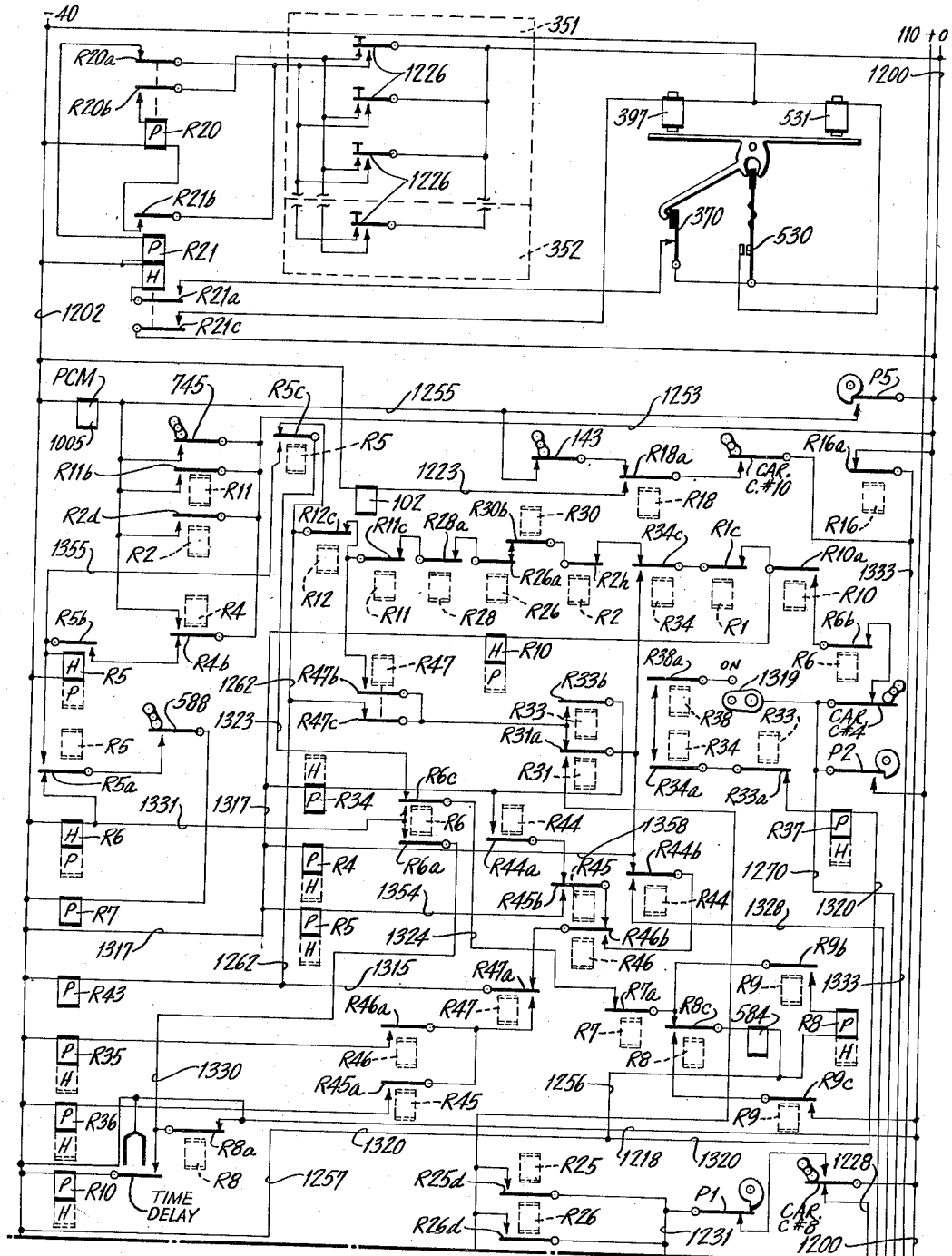
Figure 44B:
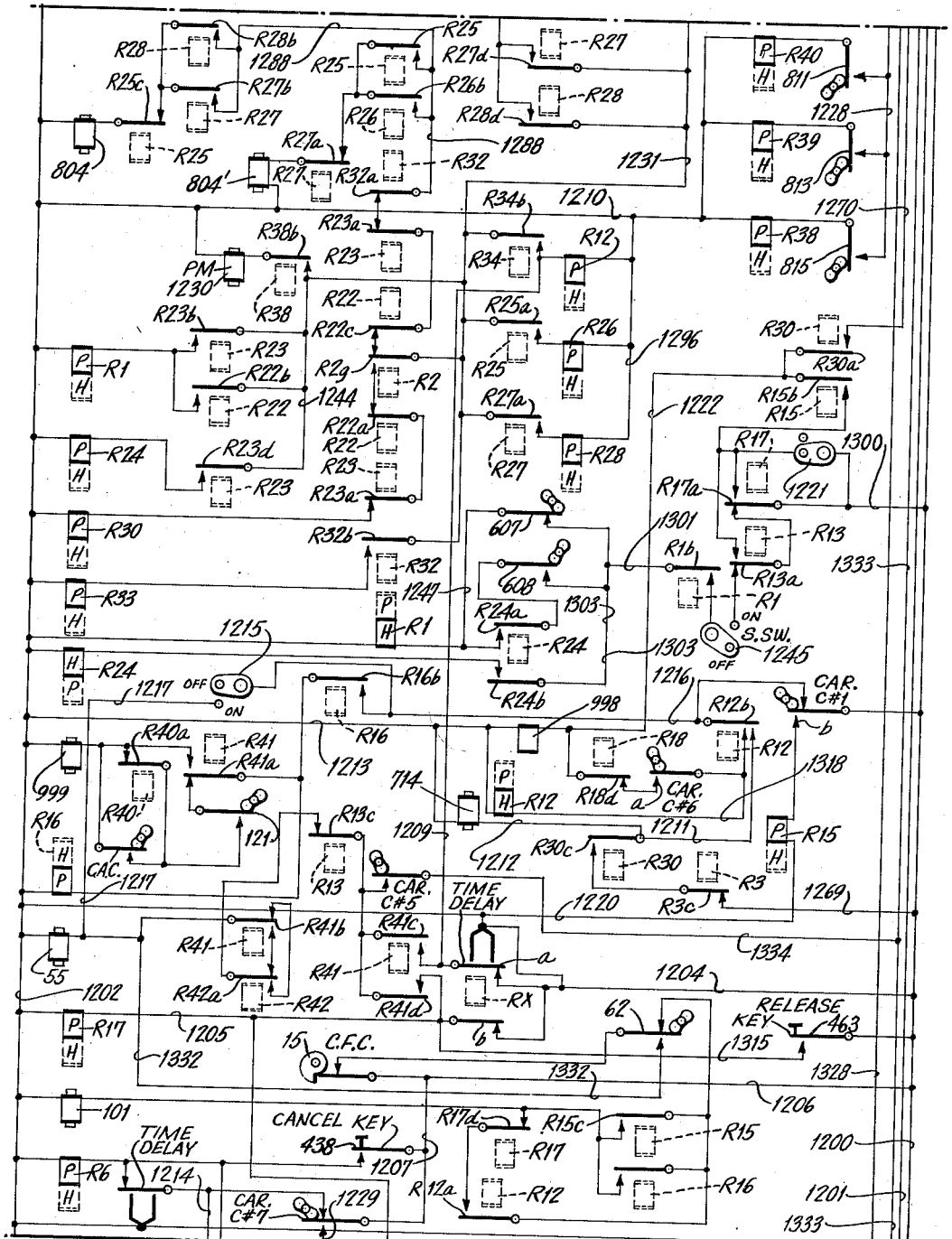
Figure 44I:
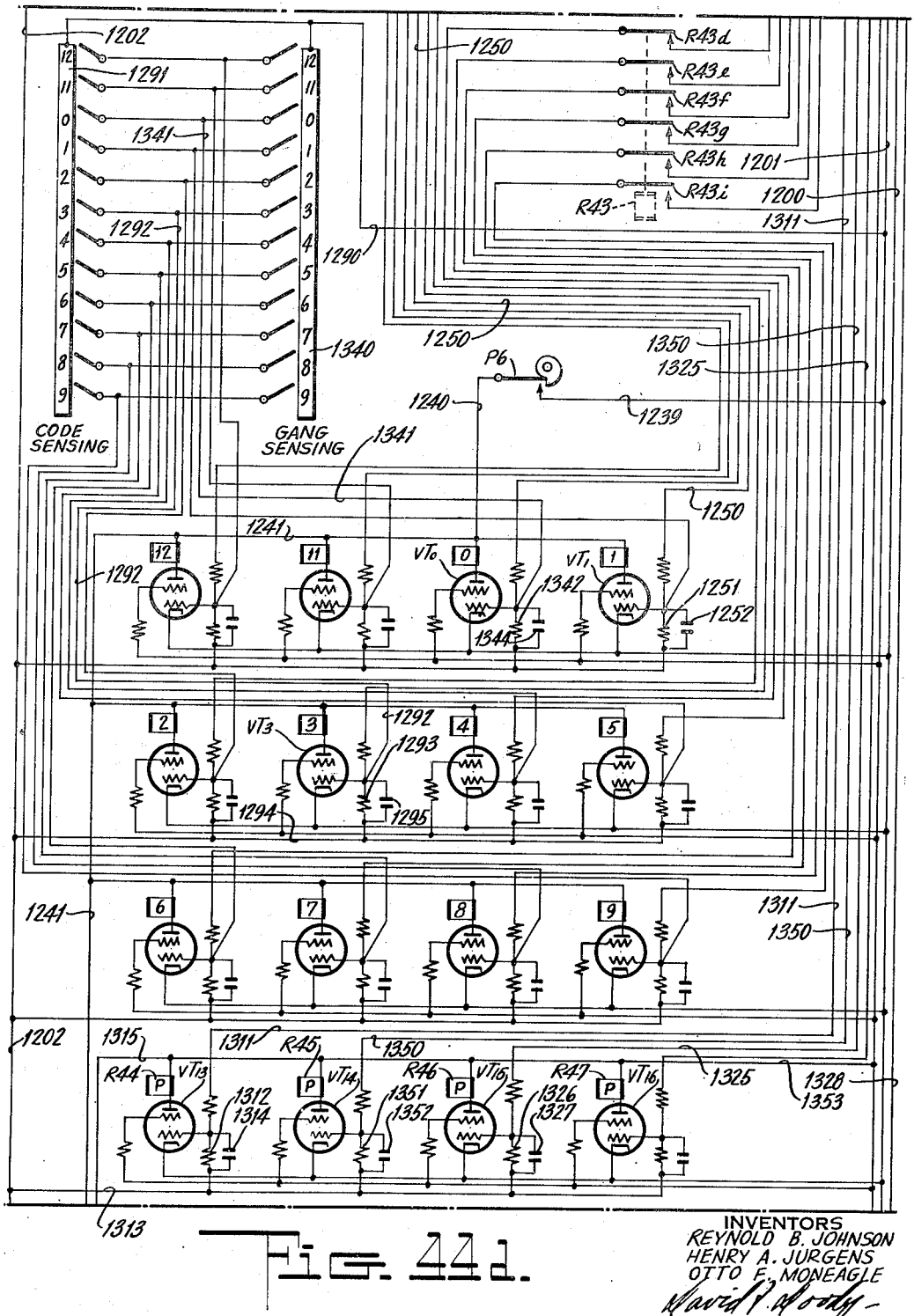

In Figs. 44 to 44d, these contacts 1031 are identifiable as being the cam contacts P1 to P6 which, under the control of cams 1028 make and break in accordance with the timing chart shown in Fig. 42.

*Typical program*

Before explaining the operation of the electrical circuits of the machine of the present invention, reference is made to Fig. 41 which shows a typical program to be followed in the operation of the machine.

The conventional card has Columns 1 to 80 inclusive, in which data can be punched and from which punched-data, data can be sensed. For the purpose of the present invention, arbitrary Columns A and B have been introduced ahead of Column 1 since one of the features of the present invention is that data to be punched into the detail card can be sensed from other cards one and two columns ahead of the detail card. Fig. 41 shows a detail card D (Card I), a code Card C (Card II) and a program card P (Card III) vertically aligned so that Column 1 of Card P is aligned with Column B of Card C and Column A of Card D. The cards are not physically aligned in the machine in this order, as will be understood from a study of the section devoted to "Card Carrying" but Figs. 41 and 41a illustrate the pre-sensing of the program, code and gang cards.

In the description of the card punching mechanism it has been shown how a one-column delay is effected in the punching cycle.

An additional column delay is obtained by using electronic delay circuits which will later be set forth.

Referring to Fig. 41, it will be noted that toward the right-hand side of the program card (Card III) are listed the functions controlling a normal card punching program. For example, a 12-hole indicates the skip-stop function and will always appear in the last column of a field to be skipped. An 11-hole designates a skip-start function and will always appear in the first column of a field to be skipped. The 0-hole designates the autospace function and will always appear in the first column to be autospaced. The 1-hole designates the numeric storage function and will always appear in the first column of a numeric field. The alphabet storage function is designated by the 2-hole and will always appear in the first column of an alphabet storage field.

The release function is designated by the 3-hole and will always appear punched in the next column following the last punched hole. The minor gang function is controlled by the 4-hole and will always appear in the first column of a minor gang field.

The intermediate gang function is designated by the 5-hole and will always appear in the first column of an intermediate gang field.

The major gang function is designated by the 6-hole and will always appear in the first column of a major gang field.

The code function is designated by the 7-hole and will always appear in the first column of a code field.

Of course, the fields designated in the illustration need not always occur in a particular pattern or program and when they do occur their sequence need not resemble that shown in the illustration. For example, a major gang field may be by itself and ahead of the intermediate gang field, and of course the program can extend over more or less columns than shown in the illustration selected.

It will be noted that reference is made to numeric storage and alphabet storage fields and in the program illustrated in Fig. 41 there is designated a numeric storage field. Electrically these fields are all the same but in the art the nomenclature represents distinctions that prove advantageous in the operation of the machine.

Fig. 41 shows the pattern for the first detail card through the machine. When the first detail card is being run, the program card and code card are also being carried but there is no gang card. The first detail card, after punching becomes the gang card and since the gang card carries the data punched from the code card, the code card is dropped after the first detail card has been punched. Fig. 41a represents the alignment of the cards for the second and succeeding detail cards through the machine. In Fig. 41a, Card II is the same as Card I in Fig. 41.

Figs. 41 and 41a illustrate a particular program that may be accomplished by the machine of the present invention. In Fig. 41, I is the detail card into which is to be punched data from the keyboard through the storage unit and directly from the code card (Card II). The program is at all times under the direct control of the program card (Card III), the punched holes of which indicate the manner and the sequences in which data is to be punched into the detail card.

In the first operation, that is when the code card and the program cards are in place in the carriage, there is no gang card since the first detail card has yet to be punched. After the first detail card has been punched as exemplified by Card I in Fig. 41 it becomes a gang card and is carried in the card carriage as set forth in the description of the machine. The second detail card to be punched will therefore be under control of not only the program card, but the gang card which contains the data punched in the first operation from the code card.

The description of the circuits contains an explanation of how the second and succeeding detail cards through the machine are controlled.

The several fields to be punched are designated on Card I in Fig. 41 by the letters A, B, C, D, E, F, G H, and J. Fields A through H for convenience have been made five columns each and field J extends for the remainder of the card, that is from Columns 41 to 80.

Fields A and B are numerical storage fields, the start of which is indicated in Columns 1 and 6 of the program card by a 1-hole. These fields are punched by the operator from the keyboard through the data storage unit.

Field C is an intermediate gang field, the start of which is signaled by a 5-hole in Column 11 of the program card.

Field D is a major gang field, the start of which is signaled by a 6-hole in Column 16 of the program card.

Field E is a skip field, the start of which is signaled by an 11-hole in Column 21 of the program card and the end of which is signaled by a 12-hole in Column 25 of the program card.

Field F is a code field, the start of which is signaled by a 7-hole in Column 26 of the program card. The data to be punched in this field is sensed from the code card and punched automatically into the detail card.

Field G is an alphabetical storage field, the start of which is signaled by a 2-hole in Column 31 of the program card. During this field the punched data is keyed by the operator into the storage unit from which it is punched into the detail card.

Field H is a minor gang field, the start of which is signaled by a 4-hole in Column 36 of the program card. The data to be punched into the detail card in this field is likewise punched from the storage unit from data keyed in by the operator.

Field J is a release field and marks the point past which no further data is to be punched into the detail card. The start of this field is signaled by a 3-hole in Column 41 of the program card which releases the carriage so that no further punching is effected and the carriage is free to move into the stacker position.

In the following description, the operation of the electrical circuits of the machine to accomplish the program or pattern set forth in Figs. 41 and 41a will be fully described.

*Operation of the electrical circuits*

Three main D. C. lines, 1200, 1201 and 1202 are provided for energizing the circuits. By way of example, these lines may be set at 0, plus 110 and minus 40 volts, respectively.

*Detail card feed*

A stack of Cards D is placed in the hopper 10 and the weight of the cards (and card keeper) causes the card feed hopper contact 80 to close. In order to bring the first card into the aligner bed it is necessary to manually feed a card through three feed cycles.

When the main switch is closed the following sequence occurs:

With card feed hopper contact 80 (Fig. 44c) closed, relay R42 picks up. A circuit (Fig. 44b) is made from line 1200 by way of lead 1204, through normally closed contact b of time delay relay RX, lead 1205, pickup coil of R17 to line 1202, causing R17 to pick up.

A hold circuit for relay R17 (Fig. 44b) is established, unless the carriage is in the stacker position, from one line 1200, lead 1205, through normally closed carriage contact No. 7, lead 1229 through normally open contact R17b (Fig. 44c) and hold coil of R17 to line 1202.

A parallel hold circuit is established for R17 relay when the carriage is in the stacker position and carriage contact No. 7 is broken as follows:

From line 1200 and lead 1208, through the "off" contact of card cancel switch No. 1, through normally closed contact R18d and normally open contact R17b, then through the hold coil of R17 to line 1202.

If the carriage is not in stacker position the following circuit is established to drive it to that position.

From line 1200 and lead 1204, through normally closed contact a of relay RX and lead 1209 to pickup coil of R12 (Fig. 44b) to line 1202 by way of lead 1210. A hold circuit for R12 is established as follows:

From line 1200 through normally closed carriage contact No. 1, through normally open R12b contacts and lead 1318 through the hold coil of R12 and lead 1213 to line 1202.

The escapement release magnet 714 is now energized to disengage the escapement dog from the carriage (Fig. 44b). The circuit is made from line 1200 through normally closed carriage contact No. 1, normally closed contacts R12b, leads 1211 and 1212, through the escapement release magnet coil 714 and lead 1213 to line 1202. The forward drive magnet 999 is energized through a circuit from line 1200 through normally closed carriage contact No. 1, contacts R12b through carriage contact No. 6, through normally closed contact R18d, through the coil of forward drive magnet 999 and lead 1213 to line 1202.

When the carriage is driven into the stacker, carriage contact No. 6 is opened, breaking the circuit through the forward drive magnet 999.

When the carriage reaches the stacker position, carriage contact No. 7 (Fig. 44b) is closed to line 1200 through lead 1206, completing a circuit with the stacker magnet 858 as follows:

Through carriage contact No. 7 and lead 1214, through normally closed contact R18c (Fig. 44c) through the coil of the stacker magnet 858 to line 1202. This will start a stacking operation. Shortly after the stacking cycle is initiated a circuit is completed from line 1200 through stacker cam contact 865 and pickup coil R18 to line 1202. This opens contact R18c (Fig. 44c) to prevent a continuation of stacker cycles. A hold circuit for R18 is established from line 1200, aligner closed contact 272, and normally open contact R18b, through the hold coil of R18 to line 1202.

To bring the first card into the aligner bed, three card feeding cycles must be completed and these are accomplished by manually pressing the card feed switch 1215 (Fig. 44b) for three cycles. The card feed circuit is then established from line 1200, through card carriage contact No. 1, and by way of lead 1216 through manually closed card feed switch 1215, lead 1217, and card feed magnet 55, to line 1202.

When a key is operated to store data, a circuit is established permitting the carriage to return and also permitting the detail card aligning cycle to be completed as will be set forth.

*Carriage return and detail card alignment*

In order to free the carriage from the stacker position it is necessary to operate a data storage cycle by depressing a key.

As the first data key operation or read-in is made, the hold circuit for R8 is broken as will be described later.

When R8 returns to normal R10 relay is picked up by a circuit from line 1200, lead 1218 (Fig. 44a) through normally closed contact R8a, through time delay switch and pickup coil of R10 to line 1202.

When the relay R10 energizes a second stacking cycle occurs (in order to release the card carriage) as follows:

From line 1200 (Fig. 44b), lead 1206, through normally closed carriage contact No. 7, through lead 1214 and normally closed contact R16c (Fig. 44c), through normally closed contact R10c and through the stacker magnet 858 to line 1202.

Shortly after the start of the second stacker cycle the following circuit is established to prevent further operation of the card stacker:

Line 1200 (Fig. 44c) through stacker cam contact 865, through contact R17c, to pickup winding of relay R16 to line 1202. This operation opens normally closed contact R16c which opens the circuit to the stacker magnet 858.

Up to now the card flipper arms 112 have been held in raised position but a circuit is now established to permit the flippers to move downwardly against the card in the aligner bed. This circuit extends from line 1200 (Fig. 44b), lead 1206 through card feed cam 15 through card feed magnet contact 62, through normally open contact R12a and normally closed contact R17d, through the flipper magnet 101 to line 1202.

Operation of flipper arms 112 downwardly against the card in the aligner bed causes the card to close the aligner bed contact 121 and to transfer these points and a circuit is completed through the reverse drive magnet 999 to line 1202 as follows:

From line 1200 (Fig. 44b) through carriage contact No. 1 and lead 1216, through normally open contact R16b, through normally closed contact R41a, through the aligner bed contact 121, through normally closed contact R40a and through the reverse drive magnet 999 to line 1202.

When the card carriage has been moved completely to its reverse drive position, the energizing circuit is broken by the opening of carriage contact No. 1. At the same time that the carriage contact No. 1 is opened the hold circuits for relays R16 and R12 and the escapement release magnet are broken.

When carriage contact No. 1 transfers, it establishes a circuit to pick up relay R15. This circuit goes from line 1200 through normally open contact of carriage contact No. 1, through R15 pickup coil to line 1202 by way of lead 1220. A hold circuit is maintained from line 1200, carriage contact No. 2, (Fig. 44c), through normally open contact R15a and hold coil of R15 to line 1202.

A circuit is established from line 1200 through the transcript side of the dual transcript switch 1221 (Fig. 44b), normally open contact R15b, lead 1222, forward drive magnet 998 and lead 1213 to line 1202. This will drive the carriage to the aligner position.

At the aligner position, carriage contact No. 10 (Fig. 44a) is closed, completing a circuit from line 1200, normally closed contact R16a, through carriage contact No. 10, through normally open contact R18a, lead 1223, through aligner magnet 102 to line 1202. When the aligner is holding the card in the aligner position, aligner closed contact 272 (Fig. 44c) is opened, opening the hold circuit for relay R18 through R18b which opens as R18 is deenergized. Contact R18a then opens to deenergize the aligner magnet 102 (Fig. 44a).

To release the carriage from the aligner position, a circuit is completed from line 1200, normally open contact R16a, through carriage contact No. 10, normally closed contact R18a, aligner open contact 143 and punch clutch magnet 1005 to line 1202. This will cause the carriage to be advanced by the forward drive until stopped by the escapement dog engaging at the Column A position which is two columns ahead of Column 1.

Carriage contact No. 10 breaks as soon as the carriage moves out of the aligner position due to the energization of the forward drive magnet 998. However, carriage contact No. 10 makes again two columns ahead of Column 1 and remains made until the carriage spaces into Column 1 and the above punch clutch circuit is repeated for Columns A and B.

When the carriage reaches Column A, carriage contact No. 2 opens, breaking the circuit through the hold coil of R15. When relay R15 is deenergized, contact R15b is opened, releasing the forward drive magnet 998. The detail card is now in position to be punched in Column 1.

Storage read-in

Depressing a key in either the numeric or alphabetic keyboard sets up a circuit as follows:

From line 1200 (Fig. 44a), through the key contacts 1226, through normally closed contact R20a and through pickup coil of R21 to line 1202. This also establishes a hold circuit from line 1200 through bail contact 370, through normally open contact R21a and the hold coil of relay R21 to line 1202. Contact R21c is held closed by this circuit and places the keyboard bail solenoid 397 across lines 1200 and 1202, attracting the armature of keyboard bail solenoid 397 and closing the read-in contact 530. Mechanically, the keyboard bail solenoid 397 will close prior to the read-in contact 530. Closing of the read-in contact 530 also closes a circuit placing the storage read-in solenoid 531 in circuit across lines 1200 and 1202.

When the storage read-in solenoid 531 is operated, the bail contact 370 is opened thus breaking the hold circuit for relay R21, including contacts R21a and R21c.

When the storage read-in solenoid 531 reaches its full throw, the read-in contact 530 is opened, deenergizing the storage read-in solenoid 531.

To prevent multiple entries when one key is depressed, a pickup circuit is established through R20 (Fig. 44a) as follows:

From line 1200, through one of the keyboard contacts 1226 and normally open contact R21b, through pickup coil of relay R20 to line 1202.

A hold circuit for relay R20 is established as follows:

From line 1200 through the keyboard contacts 1226 to normally open contacts R20b, pickup coil of R20 to line 1202. As long as this circuit is established contact R20a is held open, thus preventing pickup coil of R21 from operating and preventing contact R21b from being closed. This circuit will remain in this condition until the keyboard contacts 1226 have been released.

Program card sensing

As the carriage returns to its extreme reverse direction, the presence of a program card in the program card bed actuates the program card lever contact 815 causing closure of said contact.

Carriage contact No. 8 now makes and a circuit is established to pick up relay R38 as follows:

Line 1200 (Fig. 44a) through normally closed carriage contact No. 8, lead 1228 (Fig. 44b) through normally open program card lever contact 815, through pickup coil of relay R38 to line 1202 by way of lead 1210.

A hold circuit for relay R38 (Fig. 44c) is established from line 1200 (Fig. 44b), leads 1206 and 1207, through carriage contact No. 7, lead 1229 and normally open contact R38c (Fig. 44c) through the hold coil of relay R38 to line 1202.

During the first autospace cycle over Column A of the detail card, as explained under "Carriage Return and Detail Card Alignment", the key cams are caused to function and the program sensing magnet 1230 receives an impulse through cam contact P-1 as follows (program card is being sensed in Column 1):

Line 1200 (Fig. 44a) through normally open carriage contact No. 8 through cam contact P-1, lead 1231, through normally open contact R38b (Fig. 44b) and through program magnet coil 1230 to line 1202. This circuit is repeated to cause the program magnet 1230 to receive an impulse every time cam contact P-1 closes for each punch or autospace cycle as long as the carriage contact No. 8 remains closed and there is a program card in position in the carriage.

The program magnet 1230 being energized magnetically drives the No. 1 feeler finger of the program sensing unit through the No. 1 hole in the program card (indicating an autospace) closing its contact. The following circuit is then completed:

From line 1201 (Fig. 44e) and lead 1232, to common contact 1259, through the program sensing contact No. 1 and leads 1233 and 1234 through the limiting resistor 1235 to the control grid of vacuum tube V1 and an RC circuit 1236 and lead 1237 to line 1202.

Although the control grid of vacuum tube V1 is now driven positive, cam contact P6 (Fig. 44d) which controls the plate circuit of this tube, is open and the tube does not conduct. Cam contact P6 is connected to line 1201 by lead 1239 and to the plate circuit of tube V1 by means of leads 1240 and 1241 through the pickup coil of relay R22 (Fig. 44e).

The only action taking place by the completion of the above circuit, as long as P6 is open, is to charge the condenser 1238 in parallel with the grid resistor. This charge will remain on the condenser for a considerable length of time after the program contact No. 1 is opened, thus as it discharges slowly through the grid resistor it will hold the control grid positive into the next autospace cycle. Cam contact P6 then closes to complete the plate circuit of V1.

Upon closing of cam contact P6, the plate of the tube V1 is connected to line 1201 by the circuit just outlined, making the tube conductive due to the positive charge on the grid. Thus relay R22 is picked up and establishes a hold circuit for relay R22 from line 1200 through cam contact P3 and by way of leads 1242 and 1243 through normally open contact R22d, through the cold coil of R22 to line 1202.

Storage read-out

Read-out from the storage unit is controlled by relay R1. When R1 is energized read-out from the storage unit is prevented.

In the autospace cycle over Column B, R1 is picked up by the following circuit:

From line 1200 (Fig. 44a), through carriage contact No. 8, cam contact P1, leads 1231 and 1244, normally open contact R22b, pickup coil of relay R1 (Fig. 44b) to line 1202. A hold circuit for relay R1 is then set up as follows:

From line 1200 (Fig. 44a), through normally closed contact R17a and normally closed contact R13a, through storage switch 1245 "on" contact, normally open contact R1b, normally closed storage 10-column contact 607, lead 1247 and the hold coil of R1 to line 1202.

Data entry continues into the storage unit until ten columns have been traversed, at which time the storage 10-column contact 607 opens and thus opens the circuit to relay R1 which drops out. When contact R1c returns to normal, read-out through the storage unit occurs as follows:

Line 1200 (Fig. 44a), through cam contact P2, through normally closed carriage contact No. 4, through normally closed contact R6b, through normally open contact R10a, through normally closed contact R1c, through normally closed contact R34c, through normally closed contact R2h, through normally closed contact R30b, through normally closed contact R26a, through normally closed contact R28a, through normally closed contact R11c, through normally closed contact R12c, and lead 1262 through pickup coil R43 to line 1202.

Assuming that data for Column 1 has been read in, then relay R43 will pick up in order to initiate a read-out cycle from the storage unit as follows:

From line 1201 (Fig. 44c), into the common contact 1248 of the storage unit, through contact No. 1 and lead 1249, through normally open contact R43a into control grid of tube VT1 (Fig. 44d) by way of lead 1250, through grid RC circuit 1251 to line 1202. This will drive the grid positive and the charge will be maintained on the grid condenser 1252 for a considerable period of time. Cam contact P6 is closed for this interval and the tube VT1 discharges through the coil of punch magnet No. 1 in the plate circuit, thus energizing its card punch magnet. This causes the punch magnet to unlatch its corresponding punch interposer and in turn closes the interposer contact, completing a circuit to the punch clutch magnet as follows:

From line 1200, lead 1253, through the interposer contact 745 (Fig. 44a) through punch clutch magnet 1005 to line 1202.

The above circuit initiates the pickup of the punch clutch magnet 1005, but in order to complete a full punch clutch cycle, a parallel circuit is provided through cam contact P5 which holds the clutch energized for its full distance. This hold circuit is as follows:

From line 1200, through cam contact P5 and lead 1255, through the punch clutch magnet 1005 to line 1202.

At the same time that a circuit was established to pick up relay R43, a parallel circuit was completed to the storage escape magnet 584 in order to escape the read-out mechanism of the storage unit into the next column. This circuit is as follows:

Line 1200, through cam contact P2, through carriage contact No. 4, through normally closed contact R6b, through normally open contact R10a, through normally closed contact R1c, through normally closed contact R2h, through normally closed contact R30b, through normally closed contact R26a, through normally closed contact R28a, through normally closed contact R11c, through normally closed contact R12c, through normally closed contact R5c, and by way of lead 1323, through normally closed contact R6c, through normally closed contact R7a, through normally closed contact R8c, through the coil of the storage escape magnet 584 to line 1202 by way of leads 1256 and 1257. The actual escapement of the storage read-out mechanism to the next column occurs when cam contact P2 breaks thus opening this circuit.

The above sequence of operations to pick up the storage escape magnet 584 and relay R43 continues for five punch cycles or until five columns have been read and punched from the storage unit, at which time the program sensing unit will sense the presence of a No. 1 hole in Column 6 of the program card, indicating the start of a new numeric field. If there are less than ten columns of data keyed into the storage unit at this time, relay R1 will pick up and hold as in the foregoing description until ten or more columns are again stored in the storage unit. Since this is the first detail card passing through the machine there is no gang card being carried and the gang card lever contact 813 has not been actuated, therefore relay R39 remains in its normal position.

Intermediate gang field punching

Following fields A and B (both numeric storage fields) of the program outlined in Fig. 41, there occurs field C, an intermediate gang control field (Columns 11 to 15). As Column 9 of the detail card is being punched from storage, the program card is being sensed in Column 11. The program sensing unit detects the presence of a 5-hole in the program card, indicating an intermediate gang field, and the following circuits are completed:

Line 1201 (Fig. 44e), and lead 1232 to program sensing common contact 1259, through contact No. 5, to lead 1258, then through normally closed contact R36d, through normally closed contact R35c, through normally closed R39a to and through leads 1260 and 1234 to the control grid of vacuum tube V1 and the RC circuit 1236, including the charging condenser 1238 and then by way of lead 1237 to line 1202.

When cam contact P6 (Fig. 44d) closes, the plate of V1 is connected to line 1201 through leads 1241, 1240 and 1239. The tube becomes conductive and current flows through the pickup coil of relay R22, establishing a hold circuit for R22 from line 1200 (Fig. 44e), through cam contact P3 and by way of leads 1242 and 1243 through normally open contact R22d, through the hold coil of R22 to line 1202.

It can be seen now that the same circuits which were actuated for the first two numeric storage fields will repeat themselves again, therefore the information to be punched in the intermediate gang field, Columns 11 to 15, will actually be taken from data keyed into the storage unit.

Field D which follows the intermediate gang field is a five column major gang field (Columns 16 to 20). During the punching of Column 14 of the intermediate gang field, a 6-hole is sensed by the program unit in Column 16 of the program card, causing the following circuits to be actuated:

From line 1201 and program sensing common contact 1259, program contact No. 6, lead 1263, normally closed contact R36c, normally closed contact R35c, normally closed contact R39a, and by way of leads 1260 and 1234 to the control grid of vacuum tube V1, thence through RC circuit 1236, and lead 1237 to line 1202. The pickup and hold circuits for relay R22 will be set up as above outlined upon closure of cam contact P6.

Again, the major gang field will be punched from data keyed in to the storage unit.

Major gang field punching

Two types of skip operation are possible. The automatic skip, which is controlled by a start-skip hole sensed in the program card, and a manual skip which is controlled from the keyboard through the storage unit. In both cases the skip-stop signal comes from the program card. The skip field which appears as Field E (Columns 21 to 25) in the program outlined in Fig. 41, exemplifies the automatic skip. Manual skipping will be illustrated later.

As Column 10, which is the second to last column of the major gang field, is being punched, the program sensing unit senses the presence of an 11-hole punched in Column 12 of the program card, setting up the following circuits:

From line 1201 (Fig. 44e) and lead 1232, through the program sensing common contact 1259, from contact No. 11 and leads 1266 and 1328 to the control grid of vacuum tube V11 and RC circuit 1267 including charging the condenser 1268 to line 1202 by way of lead 1237.

Cam contact P6 (Fig. 44d) is open, so that V11 does not conduct. Condenser 1268 is charged, however, and holds its charge for some time. Tube V11 becomes conductive upon the closure of cam contact P6, connecting the plate of V11 to line 1200 through leads 1240, 1241 and relay R2 which then picks up.

The hold circuit for relay R2 is established through cam contact P3 as follows:

Line 1200 through cam contact P3, through normally open contact R2b, through the hold coil of relay R2 to line 1202.

As Column 20, which is the last column of the major gang field, is being punched, a circuit is established for picking up relay R30 as follows:

Line 1200 (Fig. 44a) through normally open carriage contact No. 8, through cam contact P1, lead 1231, through normally open contact R2g (Fig. 44b) through normally closed contact R22a through normally closed contact R23a, and pickup coil R30 to line 1202.

The hold circuit for R30 is as follows:

Line 1200 (Fig. 44e) through cam contact P4, normally open contact R30f, through hold coil of relay R30 to line 1202. In order to cause the carriage to move over the skip field, Columns 21 through 25, it is necessary to energize both the escapement release magnet 714 and the forward drive magnet 998. The escapement release magnet 714 is picked up as follows:

From line 1200 (Fig. 44b) and lead 1269 through normally closed contact R3c, normally open contact R30c, through the coil of release magnet 714 to line 1202 by way of lead 1213.

The forward drive magnet energization circuit is as follows:

Line 1200 (Fig. 44a) through cam contact P2, lead 1270 (Figs. 44a and 44b), through normally open contact R30a, lead 1222, through forward drive magnet 998 to line 1202 by way of lead 1213.

With the release magnet and forward drive magnet energized, the carriage will be advanced until a skip-stop hole is sensed by the program card.

As Column 20, which is the last column of the major gang field is punched, all interposers are open, hence the punch is latched up and will not operate through the skip field.

The normally closed contact R30b in series with the storage escape magnet 584 and relay R43 opens, preventing any further information being read out of the storage unit.

The skip-stop contact 816 is mounted on the side of the program sensing unit and is mechanically constructed so that a 12-hole in the program card will cause it to close. While the skip-stop hole always appears in the last column to be skipped, the portion of the skip-stop contact 816 is such that when it closes, the carriage has at least two more columns to space over to complete the skip field. (The program card being sensed two columns ahead of the detail card being punched.) The closure of the skip-stop contact 816 causes both the forward drive magnet 998 and release magnet 714 to return to normal, therefore it is necessary that the machine go through several autospace cycles in order to position itself in the first column of a punched field following a skip.

A skip-stop 12-hole appears in Column 25 of the program card and causes the skip-stop contact 816 to close, initiating the following circuits:

From line 1200 (Fig. 44e) through normally open contact R38d, through skip-stop contact 816 and by way of lead 1272 into the input of V12 and through the RC circuit 1273 to line 1202 by way of lead 1237. Condenser 1274 is charged, making the control grid positive and upon closing of the skip-stop 816, tube V12 conducts and energizes pickup coil R3 in its plate circuit without delay since the plate or output of V12 is connected to line 1201 through leads 1241 and 1240 (Fig. 44d), cam contact P6 and lead 1239.

The normally closed contact R3c is now open to deenergize the release magnet circuit and allow the carriage escapement dog to engage the escapement rack, stopping further motion of the carriage.

In order to cause the necessary autospace cycles to take place to space the carriage out the remainder of the skip field, the following circuit is completed:

Line 1200 through normally closed contact R33c (Fig. 44c), lead 1275, normally closed contact R1a, lead 1276, normally open contact R30e, normally open contact R3b, through pickup coil of relay R11 to line 1202, through leads 1277 and 1278.

A hold circuit is also established for relay R11 as follows:

From line 1200 lead 1279, normally closed contact R33c, normally closed contact R1a, normally closed contact R2a, normally closed contact R26c, normally closed contact R28c, lead 1286, normally open contact R11a, hold coil of R11 and leads 1277 and 1278 to line 1202.

The energization of relay R11 closes the contact R11b completing the circuit to the punch clutch magnet 1005 (Fig. 44a) to cause card spacing as follows:

From line 1200 and lead 1253, through normally open contact R11b, through the punch clutch magnet 1005 to line 1202.

Shortly after the start of the first autospace cycle, cam contact P4 breaks, deenergizing relay R30 and opening the hold circuit through R30f.

As contact R30a returns to normal the circuit of the forward drive magnet 998 is opened.

During the autospace cycles the contact R11c opens the circuits to both the storage escape magnet 584 and relay R43 to prevent reading out of the storage unit during this operation.

The autospace cycles will conutinue until signaled otherwise from a hole sensed in the program card. In the specimen card shown, this signal is a 7-hole in Column 26 which signals the beginning of a code field. It is also possible for the autospace cycle to be stopped by a hole representing any other data such as numeric storage field, alphabetic storage field, release signal, minor gang field, intermediate gang field, or major gang field.

*Code field punching*

It is assumed tmat a code card has been manually inserted into the code card station and that this card has been picked up and is being advanced in the card carriage along with the program and detail cards. In accordance with the program outlined in Fig. 41, the code card presents one code field F to be programmed into the detail card.

The presence of a code card will cause the code card lever 810 to close its contact 811, completing the following circuit to pick up relay R40:

From line 1200 (Fig. 44a) through normally closed carriage contact No. 8, lead 1228, through code card lever contact 811 (Fig. 44b), lead 1210, through pickup coil of relay R40 to line 1202.

A hold circuit is provided for relay R40 as follows:

From line 1200 (Fig. 44b), leads 1206, 1207 through normally open carriage contact No. 7, leads 1229 and 1231, through normally open contact R40b (Fig. 44c), through hold coil of relay R40 to line 1202.

As the carriage autospaces over Column 24 of the detail card, the program sensing unit senses the presence of a code signal 7-hole in the program card and completes a circuit to pick up relay R27 which is in the plate circuit of vacuum tube V7 as follows:

From line 1201 (Fig. 44e), and lead 1232 to common program sensing contact 1259, sensing contact No. 7 through normally open contact R40c, to the control grid of tube V7 and RC circuit 1282 to line 1202 through lead 1284. Condenser 1283 is charged and maintains its charge for some time. Cam contact P6 is now closed, hence the output of V7 is connected to line 1201 through leads 1285, 1241, 1240, cam contact P6 and lead 1239.

The grid of V7 being positive, the tube conducts, energizing pickup coil of relay R27 and causes the following hold circuit to be set up:

Line 1200 through cam contact P3, lead 1242, through normally open contacts R27e, through the hold coil of relay R27 and through leads 1286 and 1237 to line 1202.

Relay R27 will remain energized half-way through the next cycle. During the next to last autospace cycle, Column 26 of the code card is sensed and set up in the punch interposers as follows:

Line 1200 through carriage contact No. 8, through cam contact P1, lead 1231, through normally closed contact R2g, (Fig. 44b), through normally closed contact R22c, through normally closed contact R23a, through normally closed contact R32, lead 1288 through normally closed contact R27b, through normally open contact R25c, through the coil of the code sensing magnet 804 to line 1202.

Assuming that the code sensing unit senses a 3-hole in the field, under control of code card C a circuit is completed as follows to actuate the punch magnet:

From line 1200 (Fig. 44d) and lead 1290 to common code sensing contact 1291, through No. 3 sensing contact and lead 1292 into the input of tube VT3 and RC circuit 1293 and lead 1294 to line 1202. Condenser 1295 is charged and maintains its charge for some time. Cam contact P6 is closed to line 1201 and punch magnet No. 3 in the plate circuit of the tube VT3 is energized since the grid of the tube VT3 is positive and the tube becomes conductive. Energization of punch magnet No. 3 releases the interposer of the gang punch for punching a 3-hole in the next punching cycle. Following the pickup of relay R27, cam contact P3 makes, establishing a circuit to pick up relay R28 (Fig. 44b) as follows:

Line 1200 normally closed carriage contact No. 8, cam contact P1, lead 1231, normally open contact R27a, pickup coil of relay R28 and leads 1296 and 1210 to line 1202.

A hold circuit is provided for relay R28 as follows:

Line 1200 (Fig. 44c), normally closed contact R33c, normally closed contact R1a, lead 1276 through normally closed contact R30e, through normally closed contact R26d, through normally open contact R28e, through the hold coil of relay R28 to line 1202 by way of lead 1278.

For punching the remaining holes of the code card field, the code sensing magnet circuit is completed through contact R28b, which parallels the contact R27b in the circuit described. The contact R28a opens the circuit to the storage escape magnet 584 and relay R43 to prevent reading out from storage during the punching of a code field. The contact R28c opens the hold circuit of relay R11 causing it to return to normal and thus opening the circuit to the punch clutch magnet 1005 through the contact R11b which has caused autospacing over the last columns of the skip field.

*Alphabetical storage field punching*

The next field following the code field in Fig. 41 is a five-column alphabetical storage field G to be punched in Columns 31 through 35 of the detail card. During the punching of Column 29 in the code field of the detail card, the program sensing unit has sensed the presence of a 2-hole in Column 31 of the program card, setting up the following circuits:

From line 1201 (Fig. 44e), and lead 1232 to the common sensing contact 1259 and sensing contact No. 2 and lead 1297 to the input of vacuum tube V2 and the RC circuit 1298 and lead 1284 to line 1202. Condenser 1299 is charged and maintains its charge for some time. Pickup coil of relay R23 which is in the plate circuit of tube V2 is energized since it is connected to line 1201 by leads 1285, 1241, 1240, cam contact P6 and lead 1239. Since cam contact P6 is closed, tube V2 becomes conductive causing R23 to pick up.

A hold circuit is established through cam contact P3 to hold relay R23 as follows:

From line 1200, cam contact P3, leads 1242 and 1243, through normally open contact R23e, the hold coil of relay R23, line 1202. As the last column (Column 30) of the code field is punched into the detail card, a circuit is established through cam contact P1 to pick up relay R1 as follows:

From line 1200 through carriage contact No. 8, cam contact P1, leads 1231 and 1244 through normally open contact R22b (Fig. 44b), through pickup coil of the relay R1 to line 1202.

The energization of relay R1 actuates the contact R1a (Fig. 44c) opening the hold circuit to relay R28 thus dropping this relay out and preventing further code punching.

For transferring hold circuit of relay R1 from the 10-column contact 607 to the 30-column contact 608 there is inserted in parallel with the relay R1 pickup coil a pickup relay R24 which is under the control of relay R23 and placed in parallel with relay R1 by closure of contact R23d.

Relay R1 is now held up through the storage 30-column contact 608 by the following circuit:

From line 1200 (Fig. 44b) through lead 1300 and normally closed contact R17a, normally closed contact R13a, "on" position of storage switch 1245 through normally open contact R1b, lead 1301 through storage 30-column contact 608, normally open contact R24a, through the hold coil of relay R1 to line 1202. A parallel hold circuit is provided for relay R24 as follows:

From line 1200 and lead 1300 through normally closed contact R17a, normally closed contact R13a, "on" position of storage switch 1245, normally open contact R1b, lead 1303, normally open contact R24b, hold coil of relay R24 to line 1202.

Numeric data may be punched within the alpha storage field. The circuits are identical to those used in the previously described numeric storage field.

*Minor gang field punching*

Since the alphabetic storage field illustrated is only five columns wide, the operator will continue keying into the storage unit the five columns of information for this field and the succeeding five columns for the minor gang field, and upon completion of this entry the operator will strike the release key 354. Striking the release key will manually close release key contact 463 completing a circuit to pick up R17 as follows:

From line 1200 (Fig. 44b) through release key contact 463, leads 1315 and 1205, through pickup coil of relay R17 to line. A hold circuit is provided for relay R17 as follows:

From line 1200 (Fig. 44b), leads 1206 and 1207, carriage contact No. 7, lead 1229, normally open contact R17b and through hold coil of relay R17 to line 1202. Upon energization of relay R17 the contact R17a opens the hold circuit to relay R1 which has been preventing the storage read-out from functioning. Closure of contact R1c allows the circuit to the storage escapement magnet 584 and relay R43 to be completed, starting the read-out of information for punching in the alpha field, Columns 31 to 35. Punching in this field will continue until Column 34. The presence of a minor gang 4-hole is sensed in the program card initiating the minor gang field and setting up the following circuits:

From line 1201 and lead 1232 through common program sensing contact 1259, through contact No. 4, through normally closed contact R36a, through normally closed contact R35b, normally closed contact R35c, normally closed contact R39a, and leads 1260 and 1234, to the control grid of vacuum tube V1 and the parallel RC circuit 1236 and lead 1237 to line 1202. Cam contact P6 is closed and thus with the tube V1 conductive the pickup coil of relay R22 will be across the line and energized as set forth above. A hold circuit for relay R22 is established as follows:

From line 1200 through cam contact P3, leads 1242 and 1243, through normally open contact R22d, through the hold coil of relay R22 to line 1202. As Column 35, which is the last alpha storage column, is being punched, relay R1 picks up through the closure of cam contact P1 and contact R22d as previously described.

However, since the hold circuit for relay R1 is now open by virtue of contact R17a being actuated, relay R1 will hold only during the operation of the make of cam contact P1. As cam contact P1 breaks and drops relay R1 back to normal, the circuit set up for storage punching through contact R1c to the storage escape magnet 584 and relay R23 will again be made, allowing the storage read-out to continue punching into the detail card. This read-out will continue for the next five columns of the minor gang field. During the punching of Column 39, which is the second to last minor gang field column, the program sensing unit detects the presence of a 3-hole in Column 41 of the program card signaling the start of release field J and setting up the following circuit:

From line 1201 and lead 1232 through the common program sensing contact 1259, through contact No. 3, and lead 1305 to the input of V3 and the parallel RC circuit 1306, to line 1202 by way of lead 1204. Condenser 1307 is charged and maintains its charge for some time. Cam contact P6 is closed and the grid of V3 is maintained positive by virtue of the charge on condenser 1302 and the tube conducts and energizes the pickup coil of relay R32 in its plate circuit, since R32 is connected to line by leads 1285, 1241, 1240, cam contact P6 and lead 1239. A hold circuit for relay R32 is established as follows:

From line 1200, through cam contact P3, leads 1242 and 1308, through normally open contact R32b, through the hold coil of relay R32 and by way of lead 1287 to line 1202.

On the next cycle for the next column of the minor gang field, Column 40, relay R33 will be picked up when cam contact P1 makes the circuit as follows:

Line 1200 through normally open carriage contact No. 8 (Fig. 44a), cam contact P1, lead 1231, normally open contact R32b (Fig. 44b), pickup coil of relay R33 to line 1202.

*Carriage release*

When the release key 463 (Fig. 44b) is operated, it also causes to be read into the storage unit, a signal representing storage release. This signal is stored in the storage ball column representing the 13 digit.

After reading out the last character to be punched into the detail card (which in this case occurs in Column 40) the storage unit spaces in its normal manner into a position to read out the stored release signal. As the carriage now holds the detail card for punching in Column 41, this release signal will be read out by the following circuit:

From line 1200 (Fig. 44c) and lead 1309 through the storage contact segment 1310 through contact No. 13, lead 1311 to the control grid of vacuum tube VT13 and parallel RC circuit 1312 and lead 1313 to line 1202. Condenser 1314 is charged and maintains its charge for some time. This connects the tube directly to line 1201 through lead 1353 and since it is conductive due to the positive signal on the grid, pickup coil R44 in the plate circuit is energized. Relay R44 has no hold coil, but when energized relay R44 will set up the following circuit through cam contact P2 to pick up relay R34 as follows:

Line 1200 (Fig. 44a), through cam contact P2, through normally closed carriage contact No. 4, through normally closed contact R6b, through normally open contact R10a, through normally closed contact R1c, through normally closed contact R34c, through normally closed contact R2h, through normally closed contact R30b, through normally closed contact R26a, through normally closed contact R28a, through normally closed contact R11c, through normally closed contact R12c, leads 1262 and 1315, through normally closed contact R47a, through normally closed contact R46b, through normally closed contact R45b, through normally open contact R44a, through pickup coil of relay R34 to line 1202 through lead 1317.

To cause the carriage to be driven into the stacker position, it is necessary to energize both the forward drive magnet 998, and the release magnet 714. Both of these magnets are under control of relay R12 which is picked up as follows:

Line 1200 through normally open carriage contact No. 8, cam contact P1, lead 1231 through normally open contact R34b, pickup coil of relay R12 and lead 1210 to line 1202.

A hold circuit for relay R12 is established as follows:

Line 1200 (Fig. 44b), normally closed carriage contact No. 1, through normally open contact R12b, lead 1318 through hold coil of relay R12 to line 1202 by way of lead 1213.

The forward drive maget 998 and the release magnet 714 are picked up through relay R12 in the same manner as was set forth earlier in the description of the carriage release.

*Manual skip*

Manual skipping is initiated by depressing the skip key 355 (Fig. 35) on the manual keyboard 351, which reads into the storage unit a skip-start signal. As the storage unit escapes off the last punched column, the No. 13 and No. 15 contacts in the storage unit will be closed by the skip-start signal stored therein. This sets up a circuit to pick up coding relay R44 (which circuit has already been described) and R46 (Fig. 44d) as follows:

From line 1200 (Fig. 44c), and lead 1309 to storage contact segment 1310 through contact No. 15 and lead 1325 to the control grid and RC circuit 1326 of vacuum tube VT15, thence through lead 1313 to line 1202. Condenser 1327 is charged and maintains this charge for some time. Pickup coil R46 which is in the plate circuit of VT15 is directly connected to line 1201 by lead 1353.

When relay R44 is energized, a circuit is completed through cam contact P2 to pick up relay R34. This circuit has been set forth above. When pickup coil R46 is energized, a circuit is set up to pick up relay R2 which is in the plate circuit of the vacuum tube V11 (Fig. 44e). This circuit is as follows:

From line 1200 (Fig. 44a), through cam contact P2, through carriage contact No. 4, through normally closed contact R6b, through normally open contact R10a, through normally closed contact R1c, through normally open contact R34c, through normally closed contact R2h, through normally closed contact R30b, through normally closed contact R26a, through normally closed contact R28a, through normally closed contact R11c, through normally closed contact R12c, leads 1262 and 1315, through normally closed contact R47a, through normally open contact R46b, through normally open contact R44b, leads 1328 and 1234 to the control grid of vacuum tube V11, the RC circuit 1267 and lead 1237 to line 1202. A hold circuit for relay R2 is completed as follows:

Line 1200, through cam contact P3, lead 1242, normally open contact R2b, through the hold coil of relay R2, to line 1202. Relay R2 controls the storage skip-start in the same manner as it controls the program skip-start which was outlined above.

Synchro check

If it is desired to check to see that the proper number of columns have been key punched into the detail card, a synchro check switch 1319 (Fig. 44a) is provided, which, when thrown to the "on" position will perform this function. A signal will be indicated to the operator at the time of release of the card as to whether too few or too many key strokes were entered.

As an example, we may assume that the operator has keyed one column too few. Relay R34 will have been picked up in this case one column too soon and a circuit will be completed when cam contact P2 makes, as follows:

Line 1200 through cam contact P2, through synchro check switch 1319 in the "on" position, through normally open contact R38a, through normally open contact R34a, through normally closed contact R33a, through pickup coil of relay R37 and leads 1320 and 1257 to line 1202.

A hold circuit for relay R37 is established as follows:

Line 1200, through card clearing switch No. 2 (Fig. 44c), through normally open contact R37b, through hold coil of relay R37, to line 1202.

Picking up of relay R37 does not prevent the carriage from releasing, however it does prevent carriage return operations even though additional data remain in the storage unit. This is accomplished by a parallel circuit preventing the drop out of relay R17 which controls the carriage return. This parallel circuit is as follows:

Line 1200, lead 1208, through card clear switch No. 1, through normally open R37a, through normally open R17b, through hold coil of relay R17 to line 1202. In order to release the carriage, read in and punch the next detail card, any information remaining in the storage unit must be cleared out and R37 must return to normal. This is accomplished by manually operating the card cancel switch which opens the hold circuit to relay R37 returning it to normal. The parallel hold circuit to R17, through the normally closed contact R10b continues until the storage unit has cleared to its home position at which time contact R10b returns to normal, breaking this circuit. Operating card cancel switch No. 2 also provides a pickup circuit to relay R6 to cause storage cancelling. The circuit is as follows:

Line 1200, lead 1208, through normally "on" position card cancel switch No. 2, pickup coil of R6 to line 1202. Picking up of relay R6 will initiate storage cancellation as previously described.

Error correction

The present machine has provision for correcting errors made by the operator while keying data into the storage unit, before read-out of the stored data is initiated. This is done by cancelling the data stored in the unit and rekeying correct data into the unit.

The keyboard 351 carries a clearing or cancelling key 357 shown in Fig. 35. As stated earlier in the description of the machine of the present invention, this key and the field control key 362 are the only keys which do not read into a storage unit. The manual closing of cancel key 357 picks up relay R6 by means of the following circuit:

From line 1200 (Fig. 44b), lead 1206 to cancel key contact 458 through pickup coil of relay R6 to line 1202. A hold circuit for relay R6 is established as follows:

From line 1200 (Fig. 44a), lead 1218 through normally closed contact R8a, lead 1330, through normally open contact R6a, lead 1331, through hold coil of relay R6 to line 1202.

After establishment of this circuit the storage escapement magnet 584 is energized by the following circuit:

Line 1200, lead 1218 through normally closed contact R8a, lead 1330, through normally open contact R6a, through normally open contacts R6c, lead 1324, through normally closed contact R7a, through normally closed contact R8c, through the storage escapement magnet 584 and leads 1256 and 1257 to line 1202. As the storage escapement magnet is energized it mechanically closes the storage escapement contact 588 to pick up relay R7 by the following circuit:

Line 1200, lead 1218 through normally closed contact R8a, lead 1330 to normally open contact R6a, lead 1331 through normally closed contact R5a, through storage escapement contact 588 and the pickup coil of relay R7 to line 1202.

The circuit to the storage escapement magnet 584 is broken when contact R7a opens, allowing the read-out mechanism to escape one column. As long as data remains in the storage unit, pulsing of the storage escapement magnet 584 will continue and after the storage escapement magnet 584 returns to normal the circuit for relay R7 will be broken by the opening of the storage escapement contact 588. Contact R7a then closes to complete the circuit to the storage escapement magnet 584 to advance the storage read-out mechanism one column closer to its home position.

When the read-out mechanism reaches the last stored column, the storage last column contact 609 will close a circuit to pick up relay R9. This circuit is as follows:

From line 1200, (Fig. 44e), storage last column contacts 609, pickup coil of relay R9 to line 1202. As a pulse occurs to escape the read-out mechanism out of the last column, contact R9b closes to establish a circuit for picking up relay R8 as follows:

Line 1200, lead 1218 through normally closed contact R8a, lead 1330, through normally open contact R6a, through normally open contact R6c, lead 1324, through normally closed contact R7a, through normally open contact R9b, through pickup coil of relay R8, and through leads 1256 and 1257 to line 1202.

The storage escapement magnet is held energized after escaping from the last column since mechanically it is not able to move into a home position and therefore it will remain energized by the presence of the last ball in the read-out of the storage unit. The circuit by which the storage escapement magnet is so held is as follows:

Line 1200 (Fig. 44a), through normally open contact R9c, through normally open contact R8c, through the storage escapement magnet 534 and leads 1256 and 1257 to line 1202.

When the column of data is read in, the read-out mechanism will be carried to Column 2 because the storage escapement magnet is energized, causing the hold circuits to relays R6 and R9 to be broken. This allows the storage escapement magnet to be deenergized and the read-out mechanism will escape back into Column 1 and remain there until the start of a normal read-out cycle.

*Punching from the gang and code cards, second card through*

The three relays R38, R39 and R40 are under control of their respective program card lever contact 815, gang card lever contact 815, code card lever contact 811, and will have their respective hold circuits broken when carriage contact No. 7 transfers.

When the carriage has reached the stacker position after punching the first detail card according to the keyed in data of the program outlined in Fig. 41, the code card is released from the carriage and kicked into the stacker. Code card lever contact 811 then opens, opening the pickup circuit to relay R40 and the relay returns to normal.

The first detail card is now moved into the gang card position of the carriage, therefore gang card lever contact 811 closes and completes a circuit to complete relay R39 as follows:

Line 1200, through normally closed carriage contact No. 8, lead 1228 through gang card lever contact 813, pickup coil of relay R39, and through lead 1210 to line 1202. Upon return of the carriage a hold circuit for relay R39 is established as follows:

Line 1200, leads 1206, 1207, normally open carriage contact No. 7, lead 1229, normally open contact R39b (Fig. 44c), hold coil of relay R39 to line 1202.

Fields A and B of the typical program of Figs. 41 and 41a, are storage fields and will contain data keyed in by the operator, however, when a program card P is sensed in Column 11 a 5-hole, marking the start of an intermediate gang field, is encountered and the following circuit is established to pick up relay R25.

From line 1200, lead 1232, common program sensing contact 1259, through No. 5 contact, lead 1258, through normally closed contact R36d, through normally open contact R39a, to the input of vacuum tube V5 and through the RC circuit 1238 and lead 1284 to line 1202. Condenser 1239 is charged and maintains its charge for some time. The tube V5 becomes conductive by virtue of its connection to line 1201, by way of leads 1285, 1241, 1240, cam contact P6 and lead 1239.

A hold circuit is established for R25 as follows:

From line 1200, through cam contact P3, leads 1242 and 1243, normally open contact R25e, through the hold coil of R25 to line 1202. This hold circuit will continue until the middle of the next punch cycle. During the first part of the next punch cycle, the following pickup circuit is completed:

Line 1200, normally open carriage contact No. 6, cam contact P1, lead 1231, through normally open contact R25a (Fig. 44b) through pickup coil of R26, leads 1296 and 1210 to line 1202.

A hold circuit for relay R26 is established as follows:

Line 1200 (Fig. 44c), through normally closed contact R33c, lead 1275, through normally closed contact R1a, lead 1276, through normally closed contact R30e, through normally open contact R26d, through hold coil of relay R26 and lead 1278 to line 1202.

Contact R26a, which is locked in the storage read-out circuit, will open as Column 10 is punched to prevent further read-out from the storage unit during gang punching.

As the tenth or last column of storage field is being punched the following circuits are established when cam contact P1 makes:

From line 1200, through normally open carriage contact No. 8, through cam contact P1, lead 1231, through normally closed contact R2g, through normally closed contact R22c, through normally closed contact R23a through normally closed contact R32a, lead 1288, through normally open contact R26b, through normally closed contact R27a, through the coil of the gang sensing magnet 804' and lead 1210 to line 1202.

Energizing the gang sensing magnet 804' sets up the first column of the gang punched information. Fig. 41a shows a 0-hole (Column 11 of the gang card, Card II) as being the first hole encountered in the first column of the gang punch field. The punch magnets are set up by the following circuit:

Line 1200, lead 1290, through the gang sensing common contact 1340, the zero sensing contact, lead 1341, to the input of a vacuum tube VT0 and the RC circuit 1342, and lead 1343, to line 1202. Condenser 1344 is charged and maintains its charge for some time.

For punching in columns subsequent to Column 1, a parallel circuit for energizing the gang sensing magnet 804' is set up. This circuit is the same as that just described above, except that contact R25b is now open and the circuit is completed by the parallel normally open contact R26b, which is now closed. This energizes the gang magnet 804' when cam contact P1 closes.

The gang sensing circuits above described were set up for an intermediate gang field. For major and minor gang fields, the same circuits are set up but through different sensing contacts. For example, the circuits for a major gang field will be completed through a 6-hole as follows:

Line 1201, lead 1232, program sensing common contact 1259, contact No. 6, lead 1263, normally closed contact R36c, normally open contact R39a, lead 1345, to the input of vacuum tube V5 and to line 1202 by lead 1284.

This will pick up relay R25 and all the other circuits associated therewith as explained above. The next field that is treated differently from the first card through is indicated as a code field in the program card. This is a 7-hole and on the second card through, even though it is indicated as a code field, it will be treated as a gang field and will be sensed by the gang sensing unit in a manner similar to that just described.

When the program card reaches a column containing the 7-hole indicating the code field, the following circuit is established to pick up relay R25:

Line 1201, lead 1232, porgram sensing common contact 1259, contact No. 7, lead 1346, through normally closed contact R40c, through normally open contact R39a, lead 1345 to the input of vacuum tube V5. The above described circuits associated with relay R25 are then set up.

*Automatic card feed*

As the card carriage moves from align position to Column A, carriage contact No. 5 closes momentarily. At this time a circuit is completed to pick up the card feed magnet 55 as follows:

Line 1200 (Fig. 44a), normally closed contact R16a, lead 1333, lead 1334 (Fig. 44b), through carriage contact No. 5, through normally closed contact R13c, lead 1335, through normally closed contact R42a, through normally open contact R41b, through the coil of card feed magnet 55 to line 1202.

A hold circuit is established for the card feed magnet 55 as follows:

From line 1200, lead 1206 through card feed cam contact No. 15, through normally open card feed magnet contact 62, lead 1332, through the coil of the card feed magnet 55 to line 1202.

Toward the latter part of the card feed cycle the card feed cam contact is transferred as set forth above in the description of the card feed section of the machine.

*Dual card handling*

A dual card is one which contains provision for writing on the surface of the card the data to be punched into the card. In setting up to punch a dual card, the card is held stationary in the aligner bed while the operator keys in the information read from the face of the card which is to be punched into the card.

To accomplish this, the operator throws the dual-transcript switch 1221 to the dual side. This switch breaks the circuit to the forward drive magnet 998 so that when the carriage returns to the extreme right-hand side of the machine it will remain in that position and will not be driven into the align position. As long as the carriage remains in that position, data may be read into the storage unit but no data can be read out.

The last signal placed into the storage unit by the operator will be the release signal and since the release key operates a contact and completes a circuit to pick up R17 as previously described, a parallel circuit will be established around the dual-transcript switch, permitting the forward drive magnet to be energized as in normal transcript punching. The circuit is as follows:

From line 1200 (Fig. 44b), lead 1300, normally open contact R17a, normally open contact R15b, lead 1222, through the forward drive magnet 998 and lead 1213, to line 1202.

Subsequent operations will be the same as in transcript punching except when a storage field is indicated by a hole in the program card. With contact R17a up, the hold circuit to relay R1 is broken, thus there cannot be inserted the 10 or 30 column delay normally occurring in storage unit and all data keyed in for that particular card will be punched out.

If during the entry of dual card data an error is made, two types of error correction are possible. If the cancel key 357 is depressed, all stored data will be wiped out and rekeying of the entire data for the card will be necessary. It may not be desirable to wipe out all the keyed-in information, particularly where the error occurs in the latter part of the data. A second type of error correction is then advisable.

Depressing the field key 362 will close contact 416 permitting the dual card to punch out of the storage unit up to the field containing the error. At this time, if the cancel key 357 is depressed, only the field containing the error will be wiped out. When the field key 362 closes the following circuits are set up:

From line 1200 (Fig. 44e), through field key contact 416 (Fig. 44e), through normally closed contact R14b, through the pickup coil of relay R13 to line 1202. A hold circuit for relay R13 is established as follows:

From line 1200 (Fig. 44c), through carriage contact No. 2, lead 1336, through normally open contact R13b, through the hold coil of relay R13 and lead 1337 to line 1202.

Following the pickup of relay R13, a parallel circuit is established to pick up relay R14 as follows:

Line 1200, through field key contact 416, through normally open contact R14b, through normally open contact R13d, through the pickup coil of relay R14, to line 1202. A hold circuit for relay R14 is made as follows:

From line 1200, through carriage contact No. 2, lead 1336, through normally open contact R14a, through the hold coil of relay R14 to line 1202.

Relays R13 and R14 will hold as long as carriage contact No. 2 remains closed, therefore they will hold until the card carriage reaches Column A. Contact R13a establishes a circuit to the forward drive magnet 998 to cause the carriage to be moved into the aligning position and then from the aligning position to Column A. The circuit for picking up the forward drive magnet is as follows:

Line 1200 (Fig. 44b), through lead 1300, through normally closed contact R17a, through normally open contact R13a, through normally closed contact R15b, lead 1222 through forward drive magnet 998 and lead 1213 to line 1202.

It will be necessary to strike the field key each time that a storage field is encountered in the program card up to the field containing the error. The opening of contact R13a breaks the hold circuit to relay R1 which is the storage control relay. However, since contact R13a operates only momentarily, this circuit will have to be opened each time a new storage field is encountered, causing the pickup of relay R1.

In transcript punching the field key contact may be used for the same purpose as set forth in dual card punching; that is, where data for certain fields have been entered into the storage unit prior to the entry of an error in a particular field, the fields not in error may be punched out before the cancel key is depressed. The field key contact and associated circuits operate the same in transcript punching as they do in dual card punching except that it is not necessary that the circuit to the forward drive magnet be closed by contact R13a.

*Multi-punching*

Multi-punching is the punching of two or more holes in the same column of a numerical field. When the operator wishes to employ multi-punching, he first depresses the multi-punch key 356 and then enters the desired data and thereafter strikes the space key 361.

Operation of multi-punch key 356 reads into the storage unit a ball so that contact No. 14 of the storage unit will close and pick up code relay R45 (Fig. 44d).

The circuit for energizing relay R45 is as follows:

Line 1200 through the storage unit common contact 1310, through contact No. 14 and lead 1350 into the input of vacuum tube VT14 and the RC circuit 1351 and lead 1313 to line 1202.

Condenser 1352 is charged and maintains its charge for some time. The output of vacuum tube VT14 is connected to line 1201 by means of lead 1352 therefore the tube becomes conductive, causing code relay R45 to be energized and pick up relay R5 through the following circuit:

Line 1200 (Fig. 44a), through cam contact P2, through carriage contact No. 4, through normally closed contact R6b, through normally open contact R10a, through normally closed contact R1c, through normally closed contact R34c, through normally closed contact R2h, through normally closed contact R30b, through normally closed contact R26a, through normally closed contact R28a, through normally closed contact R11c, through normally closed contact R12c, leads 1262 and 1315, through normally closed contact R47a, through normally closed contact R46b, through normally open contact R45b, lead 1354, through the pickup coil of relay R5 and lead 1317 to line 1202.

A hold circuit for relay R5 is then established as follows:

Line 1200 and lead 1253, through normally closed contact R4b, through normally open contact R5b, through the hold coil of relay R5 to line 1202.

The storage escapement magnet 584 is then pulsed to cause it to space over the two or more stored signals which are to be punched in the same column. The storage escapement magnet is picked up by the following circuit:

From line 1200, lead 1253, through normally closed contact R4b, through normally open contact R5b, lead 1355, normally open contact R5c, lead 1323, through normally closed contact R6c, lead 1324, through normally closed contact R7a, through normally closed contact R8c, through the coil of the storage escapement magnet 584 and leads 1256 and 1257 to line 1202.

As the storage escapement magnet closes, it mechanically closes the storage escape contact 588 and a circuit is then completed to pick up R7 as follows:

From line 1200 and lead 1253, through normally closed contact R4b, through normally open contact R5b, through normally open contact R5a, through the storage escapement contact 588, through pickup coil of relay R7 to line 1202.

As relay R7 picks up, contact R7a is opened thus opening the above established circuit to the storage escapement magnet 584 which causes it to deenergize. As the storage escapement magnet 584 deenergizes it opens the storage escapement contact 588 allowing relay R7 to return to normal. This operation continues until the space signal is reached. When the space signal is encountered by the storage unit, contact No. 15 of the storage unit is closed, picking up the code relay R46 through the following circuit:

Line 1200, lead 1309, through storage unit common contact 1310, contact No. 15, lead 1325 to the input of vacuum tube VT15 and RC circuit 1326 and by way of lead 1313 to line 1202. The output of vacuum tube V15 is connected to line 1201 by means of lead 1353 hence code relay R46 will be energized and will establish the following circuit to pick up relay R4:

Line 1200 (Fig. 44a), through cam contact P2, through carriage contact No. 4, through normally closed contact R6b, through normally open contact R10a, through normally closed contact R1c, through normally closed contact R34c, through normally closed contact R2h, through normally closed contact R30b, through normally closed contact R26a, through normally closed contact R28a, through normally closed contact R11c, through normally closed contact R12c, leads 1262 and 1315, through normally closed contact R47a, normally open contact R46b, through normally closed contact R44b, lead 1358 through the pickup coil of relay R4 and lead 1317 to line 1202. Contact R4b will then be opened and drop out relay R5.

While the storage escapement magnet 584 is autospacing over the stored multi-punched positions, the corresponding contacts in the storage unit will close, causing their corresponding punch magnets to be energized. Energizing the punch magnets will unlatch the corresponding punch interposers and close their interposer contacts but the circuit to the punch clutch magnet 1005 will not be completed since relay R5 is open and thus contact R5b which controls the punch clutch magnet will open. However, when relay R4 is energized, normally open contact R4b will be transferred, completing a circuit to the punch clutch magnet 1005 from line 1200 through lead 1253, normally open contact R4b, through the punch clutch magnet 1005 to line 1202.

*Minor, intermediate and major gang change*

In the above explanation of the program shown in Figs. 41 and 41a, the circuits were explained for controlling the intermediate, major and minor gang fields under control of the program card. In the operation of the present machine it is possible for the operator to key in data into one or more of these gang fields which is different from the data punched in previous cards controlled by the same program card. A gang punched field designated as such by the proper hole in the program card may be changed by first striking the proper gang change key on the mechanical keyboard, prior to keying in any of the data for that particular card, and thereafter the gang change data may be keyed into the new gang field or fields in its proper sequence.

The keyboard 351 has three keys, 358, 359 and 360 which control minor, intermediate and major gang changes, respectively. These keys are arranged to operate as follows:

The minor gang change key 358 controls changes only in the minor gang fields; the intermediate gang change key 359 controls changes in both the minor and intermediate gang fields; while the major gang change key 360 controls changes in all three fields.

Assuming that a change is desired in an intermediate gang field, the first data entry into the storage unit will be from intermediate gang change key 359 and the other data to be punched from the keyboard can be entered thereafter in both the minor and intermediate gang fields if desired.

Signalling an intermediate gang change from key 359 will cause a 14 and a 16 ball to be stored in the storage unit. When the read-out contacts encountering these balls close, code relays R45 and R47 are picked up as has been described above and the following circuit is completed to pick up relay R36:

From line 1200 (Fig. 44a), through cam contact P2, through carriage contact No. 4, through normally closed contact R6b, through normally open contact R10a, through normally closed contact R1c, through normally closed contact R34c, through normally closed contact R2h, through normally closed contact R30b, through normally closed contact R26a, through normally closed contact R28c, through normally closed contact R11c, through normally open contact R47b, through normally open contact R47c, lead 1315 through normally open contact R47a, through normally open contact R45a, through pickup coil of R36 to line 1202. While the circuit for picking up relay R36 is closed, relay R12 is energized because the change signal occurs during the carriage release. A hold circuit for relay R36 is established as follows:

Line 1200 (Fig. 44c), through normally closed contact R34d, through normally open contact R36b, through the hold coil of relay R36 to line 1202. Therefore once relay R36 is picked up it will remain energized for the entire card cycle or until the next storage release signal breaks its hold circuit by opening contact R34d.

If a minor gang 4-hole is encountered in the program card, instead of relay R25 being picked up the signal picks up relay R22 by the following circuit:

From line 1201 and lead 1232 to the program sensing common contact 1259 through contact No. 4, normally open contact R36a, leads 1260 and 1234 to the input of vacuum tube V1 and lead 1237 to line 1202. The picking up of relay R22 causes the gang field to be treated as though it were a storage field and the old gang data will be cleared and the newly keyed data will be entered.

The same circuit is set up if an intermediate gang 5-hole is encountered in the program card. The circuit for picking up R22 will then be as follows:

Line 1201, lead 1232, program sensing common contact 1259, contact No. 5, lead 1258, through normally open contact R36d, and leads 1260 and 1234 to the input of vacuum tube V1 and lead 1237 to line 1202.

By the use of the relays R35 and R36, the three gang signals, minor, intermediate and major, are directed to pick up relay R22, depending upon the type of gang field change indicated.

While the pickup circuit of R36 is being made, the storage escapement magnet 584 is pulsed to advance the read-out mechanism one position. The storage escapement magnet is picked up as follows:

Line 1200 (Fig. 44a), through cam contact P2, through the carriage contact No. 4, through normally closed contact R6b, through normally open contact R10a, through normally closed contact R1c, through normally closed contact R34c, through normally closed contact R2h, through normally closed contact R30b, through normally closed contact R26a, through normally closed contact R28a, through normally closed contact R11c, through normally open contact R47b, through normally open contact R47c, lead 1262 through normally closed contact R5c, lead 1323, through normally closed contact R6c, lead 1324 through normally closed contact R7a, through normally closed contact R8c, through storage escapement magnet 584 and leads 1256 and 1257 to line 1202.

It is necessary to go through an autospace cycle of the punch to cause cam contact P2 to break the circuit to the storage escapement magnet 584. This is accomplished by completing a circuit to pick up relay R4 as follows:

Line 1200, through cam contact P2, through carriage contact No. 4, through normally closed contact R6b, through normally open contact R10a, through normally closed contact R1c, through normally closed contact R34c, through normally closed contact R2h, through normally closed contact R30b, through normally closed contact R26a, through normally closed contact R28a, through normally closed contact R11c, through normally open contact R47b, through normally closed contact R31a, lead 1358 through the pickup coil of relay R4 and lead 1317 to line 1202.

In the foregoing description of the novel machine of the present invention, only one physical embodiment has been described. It will be understood that many changes may be made thereto without exceeding the scope of the present invention. Further, while the electric circuits as shown have been described in the main with reference to a particular card punching program, it will be understood by those skilled in the art that other programs, quite different from the example chosen, may be accomplished and that many changes in the circuits illustrated may be made without exceeding the scope of the present invention. It is intended therefore that the invention be limited only as indicated by the scope of the following claims.

What is claimed is:

1. A card punching machine having a keyboard, a data storage unit and a gang punch, a card carriage having a means for simultaneously carrying a detail card to be punched, a code card and a program card having separate controls for data to be punched into the detail card, separate means for feeding and aligning said detail card and said code card, means for separately sensing said code and said program cards, delay means interposed between said sensing means and said gang punch and controlling said gang punch to effect delayed punching of the detail card, means for entering to be punched data into said storage unit from said keyboard, circuit means for keying data through said gang punch, means including said carriage for advancing said detail card into a gang card position after said detail card has been gang punched and a unit for sensing the data recorded in said detail card and gang punch operating circuit means for gang punching a subsequent detail card in accordance with data sensed by said last named sensing unit.

2. A card punching machine having a keyboard, a data storage unit and a gang punch, a card carriage, means for feeding and aligning into said card carriage a detail card to be punched, separate means for feeding and aligning a code card into said card carriage, said carriage having means for gripping and carrying said cards, manually operable means for insertion and alignment of a program card into said carriage and means operated thereby for securing said program card in said carriage, means for separately sensing said code and program cards, delay means interposed between said sensing means and said gang punch and controlling said punch to effect delayed punching of the detail card, means for entering to be punched data into said storage unit from said keyboard, circuit means for keying data through said gang punch, means including said carriage for advancing said detail card into a gang card position after said detail card has passed through the gang punch, and a unit for sensing the data recorded in said detail card, and gang punch operating means for gang punching a subsequent detail card in accordance with data sensed by said last named sensing unit.

3. A card punching machine having a composite keyboard, a data storage unit and a gang punch, said composite keyboard including a numeric keyboard section having character levers actuating storage read-in members and an alphabetic keyboard section mechanically interlocked with said numeric section, a card carriage having a means for simultaneously carrying a detail card to be punched, a code card and a program card having separate controls for data to be punched into the detail card, separate means for feeding and aligning said detail card and said code cards, means for separately sensing said code and program cards, delay means interposed between said sensing means and said gang punch and controlling said gang punch to effect delayed punching of the detail card, means for entering to be punched data into said storage unit from said keyboard, circuit means for keying data through said gang punch, means including said carriage for advancing said detail card into a gang card position after said detail card has been gang punched and a unit for sensing the data recorded in said detail card and gang punch operating circuit means for gang punching a subsequent detail card in accordance with data sensed by said last named sensing unit.

4. In a card punching machine having a keyboard, a data storage unit, a card carriage and a carriage escapement mechanism, a card punch unit, said card carriage having means for securing and carrying three pattern cards and a record card to be punched, separate sensing mechanisms for each of said pattern cards, electrical circuits between said sensing mechanisms and said punch unit, electrical delay means interposed in the circuit between one of said sensing mechanisms and said punch unit and mechanical delay means interposed between the other of said sensing mechanisms and said punch unit, whereby data sensed from said pattern cards will operate said punch unit after predetermined delay intervals.

5. In a card punching machine having a keyboard, a data storage unit, a card carriage and a carriage escapement mechanism, a card punch unit, said card carriage having means for securing and carrying a plurality of different pattern cards and a record card to be punched selectively by data from said keyboard, said data storage unit and said pattern cards, separate sensing mechanisms for each of said pattern cards, electrical circuits between said sensing mechanisms and said punch unit, electrical delay means interposed in the circuit between one of said sensing mechanisms and said punch unit and mechanical delay means associated with said punch unit and interposed between the other of said sensing mechanisms and said punch unit, whereby data sensed from said pattern cards during a single punch cycle will be punched after operation of said carriage escapement mechanism through subsequent cycles of said punch unit.

6. In a card punching machine having a keyboard, a card carriage and a carriage escapement mechanism, a card punch unit, said card carriage having means for securing and carrying a plurality of pattern cards and a record card to be punched, separate sensing mechanisms for each of said pattern cards, electrical circuits between said sensing mechanisms and said punch unit, electrical delay means interposed in the circuit between one of said sensing mechanisms and said punch unit and mechanical delay means interposed between the other of said sensing mechanisms and said punch unit, whereby data sensed from said pattern cards will operate said punch unit after predetermined delay intervals.

7. In a card punching machine having a keyboard, a card carriage and a carriage escapement mechanism, a card punch unit, said card carriage having means for securing and carrying a plurality of pattern cards and a record card to be punched in accordance with data carried on said pattern cards and from said keyboard, separate sensing mechanisms for each of said pattern cards, electrical circuits between said sensing mechanisms and said punch unit to control the operation of said punch unit, electrical delay means interposed in the circuit between one of said sensing mechanisms and said punch unit and mechanical delay means interposed between the other of said sensing mechanisms and said punch unit, whereby data sensed from said pattern cards will operate said punch unit after predetermined delay intervals.

8. In a card punching machine having a card carriage, a carriage escapement mechanism and a card punch unit, said card carriage having means for securing and carrying a plurality of pattern cards and a record card to be punched, separate sensing mechanisms for said pattern cards, electrical punch control circuits between said sensing mechanisms and said punch unit, delay means interposed between said sensing mechanisms and said punch unit, means for operating said carriage escapement mechanism during the delay imposed, and means controlled by said punch unit for subsequently punching the delayed data into said record card.

9. In a card punching machine having a card carriage, a carriage escapement mechanism and a card punch unit, said card carriage having means for securing and carrying three pattern cards and a record card to be punched, separate sensing mechanisms for said pattern cards, electrical circuits between said sensing mechanisms and said punch unit, electrical delay means interposed in the circuit between one of said sensing mechanisms and said punch unit and mechanical delay means interposed between the other of said sensing mechanisms and said punch unit, whereby data simultaneously sensed from said pattern cards will operate said punch unit after predetermined and different delay intervals and after said carriage escapement mechanism has advanced said record card to new positions for punching by said punch unit.

10. In a card punching machine of the type having a card feeding mechanism and a card-advancing carriage; a card aligning mechanism comprising a bedplate for receiving a substantially rectangular card to be aligned, a first pair of aligning arms positioned beneath said bedplate and extending symmetrically in opposite directions, a first centrally pivoted link connected to the adjacent ends of said arms, a second pair of aligning arms positioned beneath said bedplate, said second pair of arms being spaced apart and extending parallel to each other, a third pair of aligning arms beneath said bedplate, said third pair of arms being spaced and extending parallel to each other, said second and third pairs of arms extending at right angles to said first pair of arms, said card carriage having a card receiving and card gripping slot, resiliently mounted card edge engaging stop members carried in said carriage, elongated apertures formed in said bedplate through which said fingers project above the upper surface of said bedplate, a centrally pivoted link member pivotally connected to the inner end of each of said third pair of aligning arms and to the inner end of each of said second pair of aligning arms, said third pair of arms having shoulders for engaging with said stop members of said first and second pairs of arms, a stud member mounted intermediately the ends of each of said first pair of aligning arms, a projection on each of said last mentioned links engageable with one of said stud members, spring means tensioning said first pair of aligning arms toward each other, additional spring means for tensioning each of said second pair of aligning arms toward one of said third pair of aligning arms, a motor connected to an oscillating shaft, a crank carried on said shaft coaxially with said first centrally pivoted link, a stud carried on said crank engageable with said first centrally pivoted link, spring means for retaining said crank and said link in such position that when said motor is deenergized said first, second and third pairs of aligning arms are held in their extended positions against the action of their said spring means and when said motor is energized, said crank will oscillate against the action of its said spring means, permitting said pairs of links to be drawn by their said spring means into their retracted positions, whereby said fingers and shoulders move into card aligning position so that a card may be properly aligned within said card carriage.

11. In a card punching machine of the type having a card feeding mechanism and a card-advancing carriage; a card aligning mechanism comprising a bedplate for receiving a substantially rectangular card to be aligned, a first pair of aligning arms positioned beneath said bedplate and extending symmetrically in opposite directions, an oscillating link connected to the adjacent ends of said arms, a second pair of aligning arms positioned beneath said bedplate, said second pair of arms being spaced apart and extending parallel to each other, a third pair of aligning arms beneath said bedplate, said third pair of arms being spaced apart and extending parallel to each other, said card carriage having a card receiving and card gripping slot, resiliently mounted card edge engaging stop members carried in said carriage, upturned card edge engaging fingers formed on the free ends of said first and second pairs of arms, shoulders formed on the outer edges of said third pair of arms engageable with said stop members, a centrally pivoted link member pivotally connected to the inner end of each of said third pair of aligning arms and to the inner end of each of said second pair of aligning arms, a stud member mounted intermediately the ends of each of said first pair of aligning arms, a projection on each of said last mentioned links engageable with one of said stud members, spring means tensioning said first pair of aligning arms toward each other, additional spring means for tensioning each of said second pair of aligning arms toward one of said third pair of aligning arms, an oscillating motor driven shaft, a crank carried on said shaft coaxially with said first centrally pivoted link, a stud carried on said crank engageable with said oscillating link so that operation of said crank by said motor driven shaft will permit said pairs of links to be drawn by their said spring means into their retracted positions, advancing said fingers and shoulders into card aligning position so that a card may be properly aligned within said card carriage.

12. In a card punching machine of the type having a card feeding mechanism and a card advancing carriage, said carriage having a card edge receiving and card gripping slot, card-edge stop members positioned within said carriage slot, a card aligning mechanism comprising a card bedplate positioned generally co-planar with said carriage slot, said carriage being movable with respect to said bedplate, coordinate card aligning arms mounted beneath said bedplate and having a common actuating motor, card edge positioning fingers carried by said aligning arms and means controlling said common actuating motor to actuate the alignment of a card within said carriage slot by said coordinate aligning arms.

13. In a card punching machine of the type having a card feeding mechanism and a card advancing carriage, said carriage having a card edge receiving slot and card gripping members within said slot normally spring pressed to engage a card, a latch mounted to said carriage and holding said card gripping members out of engagement with a card edge prior to alignment, card-edge stop members positioned within said carriage slot, a card aligning mechanism comprising a card bedplate positioned generally co-planar with said carriage slot, coordinate card aligning arms beneath said bedplate and having a common actuating motor, card edge positioning fingers carried by said aligning arms, means controlling said common actuating motor to initiate the alignment of a card within said carriage slot by said coordinate aligning arms, a pivoted latch engaging member mounted to said machine adjacent said latch, and a crank member connected between said latch engaging member and said motor, said link being operated by said motor to release said latch through said latch engaging member to effect the gripping of an aligned card by said gripping members.

14. In a machine for gang punching a detail card in accordance with data recorded in several separate program cards and in accordance with keyed in data, a card carriage mounted for reciprocating travel in a machine-mounted track, said carriage comprising several card holding stations, machine mounted manifold contact members electrically connected with several operating circuits of said machine, carriage mounted cam members for selectively controlling the operation of said contact members in accordance with the position of said carriage in said track, machine-mounted drive means for driving said carriage selectively in its forward and reverse travel, an escapement rack mounted to said carriage, machine-controlled escapement drive means for selectively driving said carriage, circuit means for idling said first mentioned drive means and for energizing said escapement drive means for advancing said carriage in fixed steps, said carriage having quick-releasable locking means for gripping said detail card and program cards and for carrying said cards until they are released individually under control of said machine and card ejecting means at a minimum of two of said stations operable upon release of said locking means to eject the cards carried at those stations.

15. In a machine for gang punching a detail card in accordance with data recorded in several separate program cards and in accordance with keyed in data, a card carriage mounted for reciprocating travel in a machine-mounted track, said carriage comprising several card holding stations, machine-mounted drive means for driving said carriage selectively in its forward and reverse travel, an escapement rack mounted to said carriage, machine-controlled escapement drive means for selectively driving said carriage, circuit means for idling said first mentioned drive means and for energizing said escapement drive means for advancing said carriage in fixed steps, said carriage having quick-releasable locking means for gripping said detail card and program cards and for carrying said cards until they are released individually under control of said machine and card ejecting means at a minimum of two of said stations operable upon release of said locking means to eject the cards carried at those stations.

16. In a machine for gang punching a detail card in accordance with data recorded in several separate program cards and in accordance with keyed in data, a card carriage mounted for reciprocating travel in a machine-mounted track, said carriage comprising several card holding stations, machine-mounted drive means for driving said carriage selectively in its forward and reverse travel, an escapement rack mounted to said carriage, machine-controlled escapement drive means for selectively driving said carriage, circuit means for idling said first mentioned drive means and for energizing said escapement drive means for advancing said carriage in fixed steps, said carriage having quick-releasable locking means for gripping said detail card and program cards and for carrying said cards until they are released individually under control of said machine, said locking means including cam actuated shoes for contact with said cards, said shoes being latched into gripping engagement with said cards and machine-operated latch releasing means for releasing said shoes from card engagement.

17. In a machine for gang punching a detail card in accordance with data recorded in several separate program cards and in accordance with keyed in data, a card carriage mounted for reciprocating travel in a machine-mounted track, said carriage comprising several card holding stations, machine-mounted drive means for driving said carriage selectively in its forward and reverse travel, an escapement rack mounted to said carriage, machine-controlled escapement drive means for selectively driving said carriage, circuit means for idling said first mentioned drive means and for energizing said escapement drive means for advancing said carriage in fixed steps, said carriage having quick-releasable locking means for gripping said detail card and program cards and for carrying said cards until they are released individually under control of said machine, said locking means including cam actuated shoes for contact with said cards, said shoes being held latched during the card carrying operation of said carriage and card ejecting means actuated upon release of said cam actuated shoes to eject said cards from said carriage.

18. In a machine for gang punching a detail card in accordance with data recorded in several separate program cards and in accordance with keyed in data, a card carriage mounted for reciprocating travel in a machine-mounted track, said carriage comprising several card holding stations, machine-mounted means for driving said carriage selectively in its forward and reverse travel, said carriage having quick-releasable locking means for gripping said detail card and program cards and for carrying said cards until they are released individually under control of said machine, and machine-actuated ejecting levers carried by said carriage at certain of said stations for positively ejecting said cards upon release of said locking means.

19. In a machine for gang punching a detail card in accordance with data recorded in several separate program cards and in accordance with keyed in data, a card carriage mounted for reciprocating travel in a machine-mounted track, said carriage comprising several card holding stations, machine-mounted drive means for driving said carriage selectively in its forward and reverse travel, said carriage having quick-releasable locking means for gripping said detail and program cards and for carrying said cards, said machine carrying lock releasing means for releasing said locking means and means carried by said carriage at said card holding stations for ejecting said cards upon actuation of said lock releasing means.

20. In a card punching machine having a constantly rotating powershaft, a card feeding mechanism comprising a card receiving throat section, a pivoted card lever extending into said throat section and normally obstructing said section, friction rollers having edges projecting into said section, said rollers being arranged to contact and feed a card into said throat, said rollers being mounted on a drive shaft, clutch means interposed between said constantly rotating power shaft and said drive shaft, clutch latching means operated by the pivoting of said card lever out of its normal position in said throat to engage said power and drive shafts and rotate said rollers to feed a card into said throat section, and means for sensing the alignment of a card within said throat comprising an electrical contact, a cam mounted on said drive shaft, cam follower means pivotally mounted to engage said cam and having a contact operating arm and a flexible stop member for limiting the pivotal movement of said contact operating arm when said stop member is in its undeflected position to keep said contact operating arm spaced from said contact, and in its card-deflected position being out of engagement with said arm to permit said arm to close against said electrical contact.

21. In a card punching machine having a constantly rotating powershaft, a card feeding mechanism comprising a card receiving throat section, a pivoted card lever extending into said throat section and normally obstructing said section, friction rollers having edges projecting into said section, said rollers being arranged to contact and feed a card into said throat, said rollers being mounted on a drive shaft, clutch means interposed between said constantly rotating power shaft and said drive shaft and clutch latching means attached to and operated by the pivoting of said card lever out of its normal position in said throat to engage said power and drive shafts and rotate said rollers to feed a card into said throat section.

22. In a card punching machine having a constantly rotating powershaft, a card feeding mechanism comprising a card receiving throat section, a pivoted card lever extending into said throat section and normally obstructing said section in the absence of a card, friction rollers having edges projecting into said section, said rollers being arranged to contact and feed a card into said throat, said rollers being mounted on a drive shaft, clutch means including a disc rotatable with card drive shaft interposed between said constantly rotating power shaft and said drive shaft, a clutch control arm mounted to said card lever, clutch latching means operated by the pivoting of said card lever out of its normal position in said throat to engage said power and drive shafts and rotate said rollers to feed a card into said throat section, a cam member carried by said control arm and a cam engaging member mounted on said disc and engageable with said cam member to disengage said clutch latching member from said power shaft.

23. In a card punching machine having a constantly rotating powershaft, a card feeding mechanism comprising a card receiving throat, a pivoted card lever extending into said throat, said card lever being pivotal from a normal card obstructing position in said throat by the passage of a card through said throat to a non-obstructing position, card feeding rollers projecting into said throat, a roller drive mechanism including a drive shaft terminating adjacent said constantly rotating powershaft, said drive shaft having a disc member on which is mounted a powershaft engaging pawl member, a pawl-latching arm carried by said card lever, a cam member carried by said pawl-latching arm, a cam engaging member mounted on said disc member, spring means carried by said disc member for biasing said pawl member into engagement with said constantly rotating powershaft, said pawl member being latched out of engagement with said powershaft by said pawl latching arm when said card lever is in the card-obstructing position and being freed into engagement with said powershaft when said card lever is in its non-obstructing position, said pawl being latched out of engagement with said power shaft upon engagement of said cam member with said cam engaging member.

24. A punching machine having punches and data sensing means, means for advancing a card to be punched, means for mounting a program card in said machine, means associated with said advancing means for advancing said program card concurrently with said card to be punched past said sensing means and said punches, respectively, said program card being sensed by said sensing means to exert control over data fields of said card to be punched and means controlled by said sensing means in response to a designation in a predetermined location in a column of said program card to cause a skip-start of one or more fields to be effected on said card to be punched.

25. A punching machine having punches and data sensing means, means for advancing a card to be punched, means for mounting a program card in said machine, means associated with said card advancing means for advancing said program card concurrently with said other card past said sensing means and said punches, respectively, said program card being sensed by said sensing means to exert control over data fields of said card to be punched and means controlled by said sensing means in response to a designation in a predetermined location in a column of said program card to cause a skip-stop of one or more fields to be effected on said card to be punched.

26. A punching machine having a keyboard, a row of punches and data sensing means, a step by step detail card advancing means, means controlled by said keyboard for selectively operating said punches, means for mounting a program card in said machine, means associated with said detail card advancing means for advancing said program card concurrently with said detail card past said sensing means and said row of punches, respectively, said program card being sensed by said sensing means to exert control over said keyboard and data to be punched in said detail card, and means controlled by said sensing means in response to a designation in a predetermined location in a column of said program card to cause auto-spacing over one or more columns of said detail card.

27. A punching machine having a keyboard, a data storage unit, a punching station and data sensing means, a first card advancing means, means for mounting a program card in said machine, means associated with said first card advancing means for advancing said program card concurrently with said first card, means for operating said punching station in accordance with data fed into said storage unit from said keyboard, said program card being sensed by said sensing means to control the punching of said first card with data read into said storage unit over one or more data fields of said first card, and means controlled by said sensing means in response to a designation in a predetermined location in a column of said program card to cause said stored data to be recorded in one or more fields on said first card.

28. A punching machine having a keyboard, a punching station and data sensing means, a first card advancing means, means for mounting a program card in said machine, means associated with said first card advancing means for advancing said program card concurrently with said first card, means for operating said punching station in accordance with data from said keyboard, said program card being sensed by said sensing means to control the punching of said first card over one or more data fields of said first card, and means controlled by said sensing means in response to a designation in a predetermined location in a column of said program card to actuate said first card advancing means so that said first card is advanced thereby completely past said punching station.

29. A punching machine having a keyboard, a punching station and data sensing means, a first card advancing means, means for mounting a program card in said machine, means associated with said first card advancing means for advancing said program card concurrently with said first card, means for operating said punching station in accordance with data from said keyboard, and means controlled by said sensing means in response to a designation in a predetermined location in a column of said program card to permit said data to be punched in one or more fields on said first card.

30. A punching machine having a punching station and a first data sensing means, a first card advancing means, means for mounting a program card and a code card in said machine, means for advancing said program and code cards concurrently with said first card, a second data sensing means for sensing said code card, said program card being sensed by said first sensing means to exert control over selected data fields of said first card and means controlled by said first sensing means in response to a designation in a predetermined location in a column of said program card to cause data sensed in said second sensing means to be punched in selected fields to be punched in said first card.

31. A punching machine having a punching station and a first data sensing means, a first card advancing means, means for mounting a program card and a code card in said machine, means for advancing said program and code cards concurrently with said first card, a second data sensing means for said code card, said program card being sensed by said first sensing means to exert control over data to be punched on said first card and means controlled by said first sensing means in response to a designation in a predetermined location in a column of said program card to cause data sensed in said second sensing means to be punched on said first card in one or more data fields thereof.

32. A punching machine having a punching station and a first data sensing means, a first card advancing means, means for mounting a program card and a code card in said machine, means for advancing said program and code cards concurrently with said first card, a second data sensing means for sensing said code card, said program card being sensed by said first sensing means to exert control over selected data fields of said first card and means controlled by said first sensing means in response to a designation in a predetermined location in a column of said program card to operate said punching station in accordance with data sensed in said second sensing means whereby data from said code card may be punched on said first card.

33. A card punching machine having a card feed hopper and a card stacker, means for feeding and advancing a record card from said hopper to said stacker, means for punching data into said record card at a point in its travel between said hopper and said stacker, means to cause a code card to advance along with said record card from a station intermediate between said hopper and said stacker, said code card being sensed to effect control over the data to be punched in said record card, and selectively settable means to cause said code card to enter said stacker for merging with record cards therein stacked or to be ejected into a compartment separate from said stacked record cards.

34. A card punching machine having a card feed hopper and a card stacker, means for feeding and advancing a record card from said hopper to said stacker, means for punching data into said record card at a point in its travel between said hopper and said stacker, means for feeding a code card into said machine from a station spaced from said hopper, to cause said code card to advance along with said record card toward said stacker, means for sensing said code card to effect control over the data to be punched in said record card, and selectively settable means to cause said code card to enter said stacker for merging with record cards therein stacked or to be ejected into a compartment separate from said stacked record cards.

References Cited in the file of this patent

UNITED STATES PATENTS

| Number | Name | Date |
| --- | --- | --- |
| 1,976,618 | Lee and Daly | Oct. 9, 1934 |
| 2,032,805 | Lake | Mar. 3, 1936 |
| 2,131,914 | Carroll | Oct. 4, 1938 |
| 2,217,209 | Von Pein | Oct. 8, 1940 |
| 2,346,269 | Mills | Apr. 11, 1944 |